US008351356B2

(12) United States Patent
Nishioka et al.

(10) Patent No.: US 8,351,356 B2
(45) Date of Patent: Jan. 8, 2013

(54) DATA COMMUNICATION SYSTEM, COMMUNICATION DEVICE, AND COMMUNICATION METHOD

(75) Inventors: Shinichiro Nishioka, Osaka (JP); Hiroshi Suenaga, Osaka (JP); Tsutomu Sekibe, Kanagawa (JP); Isao Kato, Osaka (JP); Tadashi Ono, Osaka (JP); Hideyuki Yamada, Osaka (JP)

(73) Assignee: Panasonic Corporation, Osaka (JP)

(*) Notice: Subject to any disclaimer, the term of this patent is extended or adjusted under 35 U.S.C. 154(b) by 388 days.

(21) Appl. No.: 12/674,045

(22) PCT Filed: Jun. 11, 2009

(86) PCT No.: PCT/JP2009/002639
§ 371 (c)(1),
(2), (4) Date: Feb. 18, 2010

(87) PCT Pub. No.: WO2009/153944
PCT Pub. Date: Dec. 23, 2009

(65) Prior Publication Data
US 2011/0103224 A1    May 5, 2011

(30) Foreign Application Priority Data
Jun. 20, 2008    (JP) .................... 2008-161330

(51) Int. Cl.
*H04L 5/16*    (2006.01)
*H04L 5/14*    (2006.01)
*G06F 13/12*    (2006.01)
(52) U.S. Cl. ..................... 370/296; 370/276; 710/62
(58) Field of Classification Search .......... 370/276, 370/277, 296; 710/1, 62
See application file for complete search history.

(56) References Cited

U.S. PATENT DOCUMENTS

| | | | |
|---|---|---|---|
| 4,771,417 A | 9/1988 | Maxwell et al. | |
| 5,155,726 A | 10/1992 | Spinney | |
| 5,305,306 A | 4/1994 | Spinney | |
| 5,920,705 A | 7/1999 | Lyon | |
| 7,054,947 B2 | 5/2006 | Yun | |
| 8,089,907 B2 * | 1/2012 | Pannell et al. | ............ 370/282 |
| 2002/0124102 A1 | 9/2002 | Kramer | |

(Continued)

FOREIGN PATENT DOCUMENTS

EP    1 220 480    7/2002
(Continued)

OTHER PUBLICATIONS

International Search Report issued Jul. 28, 2009 in International (PCT) Application No. PCT/JP2009/002639.
(Continued)

*Primary Examiner* — Ricky Ngo
*Assistant Examiner* — Paul H Masur
(74) *Attorney, Agent, or Firm* — Wenderoth, Lind & Ponack, L.L.P.

(57) ABSTRACT

A data communication system for starting transmission and reception of target data for processing upon recognition that switching between communication modes is completed. The data communication system includes a master communication device and a slave communication device that continuously perform, at a time of switching from half-duplex communication to full-duplex communication, (i) a handshake using a directional control code indicating the switching and a preamble code indicating completion of the switching and (ii) a handshake using the preamble code and an acknowledge code indicating receipt of the preamble code, whereby each of the devices recognizes that the switching between communication modes by the opposite device is completed and starts transmission and reception of the target data.

17 Claims, 28 Drawing Sheets

U.S. PATENT DOCUMENTS

| | | | |
|---|---|---|---|
| 2002/0133631 A1 | 9/2002 | Yun | |
| 2004/0022204 A1* | 2/2004 | Trembley | 370/285 |
| 2004/0027998 A1 | 2/2004 | Palm | |
| 2004/0133717 A1 | 7/2004 | Tashiro | |
| 2005/0063322 A1 | 3/2005 | Palm | |
| 2005/0201305 A1 | 9/2005 | Shibata et al. | |
| 2006/0039399 A1 | 2/2006 | Ejima | |
| 2006/0224800 A1 | 10/2006 | Tashiro | |

FOREIGN PATENT DOCUMENTS

| | | |
|---|---|---|
| EP | 1 477 901 | 11/2004 |
| JP | 8-111761 | 4/1996 |
| JP | 2001-86104 | 3/2001 |
| JP | 2001-86185 | 3/2001 |
| JP | 2002-94600 | 3/2002 |
| JP | 2002-271445 | 9/2002 |
| JP | 2003-242470 | 8/2003 |
| JP | 2005-260361 | 9/2005 |
| JP | 2006-20224 | 1/2006 |
| JP | 2006-60403 | 3/2006 |

OTHER PUBLICATIONS

Office Action mailed May 8, 2012 in corresponding U.S. Appl. No. 12/665,079.

Office Action mailed May 31, 2012 in corresponding U.S. Appl. No. 12/676,433.

* cited by examiner

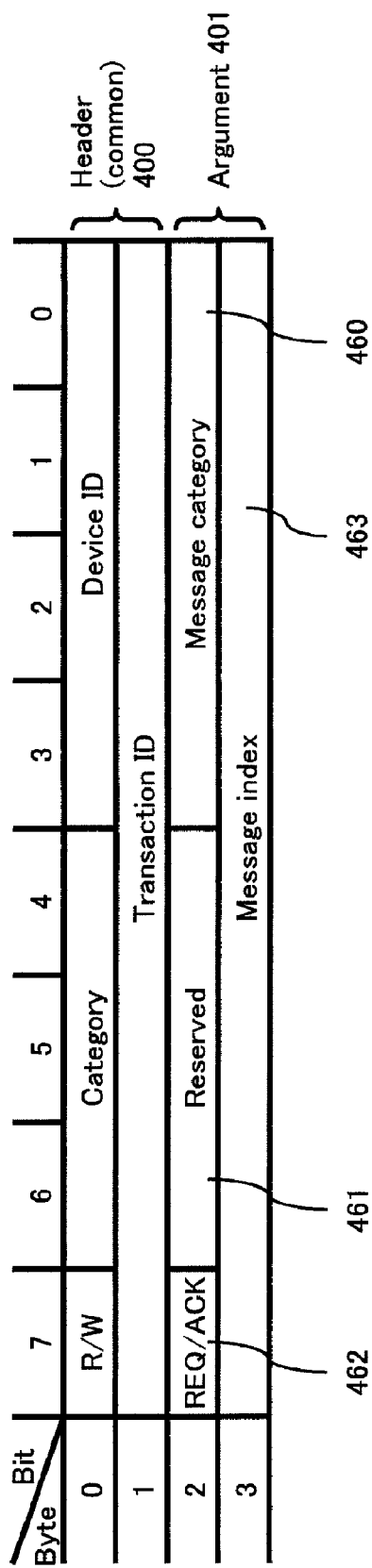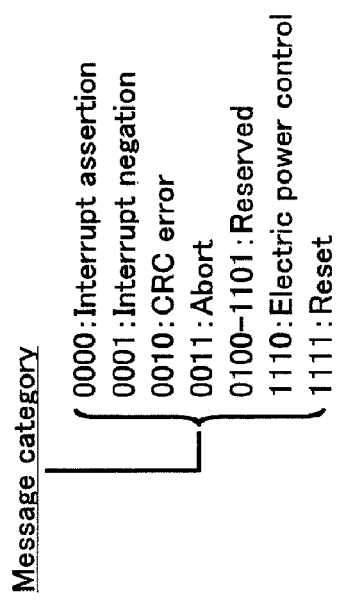
FIG.9A
FIG.9B

FIG.11

| K code | Symbol | Function | Original data (hexadecimal number) | Current RD − | Current RD + |
|---|---|---|---|---|---|
| K28.0 | DIR | DIRECTION | 1C | 0011111 0100 | 110000 1011 |
| K28.1 | − | Reserved | 3C | 0011111 1001 | 110000 0110 |
| K28.2 | BSY | BUSY | 5C | 0011111 0101 | 110000 1010 |
| K28.3 | IDL | IDLE | 7C | 0011111 0011 | 110000 1100 |
| K28.4 | − | Reserved | 9C | 0011111 0010 | 110000 1101 |
| K28.5 | PRE | PREAMBLE | BC | 0011111 1010 | 110000 0101 |
| K28.6 | − | Reserved | DC | 0011111 0110 | 110000 1001 |
| K28.7 | − | Reserved | FC | 0011111 1000 | 110000 0111 |
| K23.7 | ACK | ACKNOWLEDGE | F7 | 111010 1000 | 000101 0111 |
| K27.7 | SOP | START OF PACKET | FB | 110110 1000 | 001001 0111 |
| K29.7 | EOP | END OF PACKET | FD | 101110 1000 | 010001 0111 |
| K30.7 | − | Reserved | FE | 011110 1000 | 100001 0111 |

T200

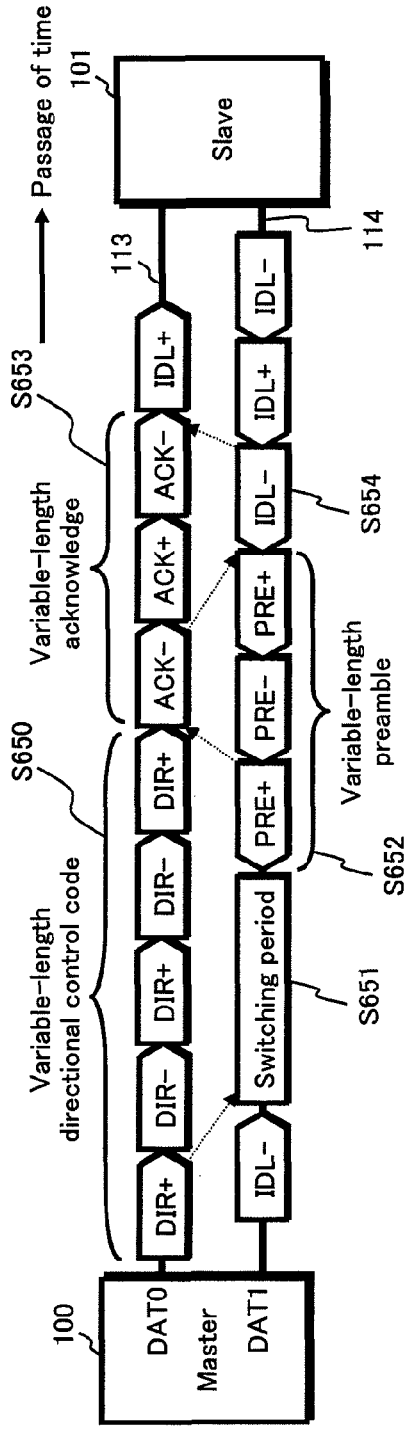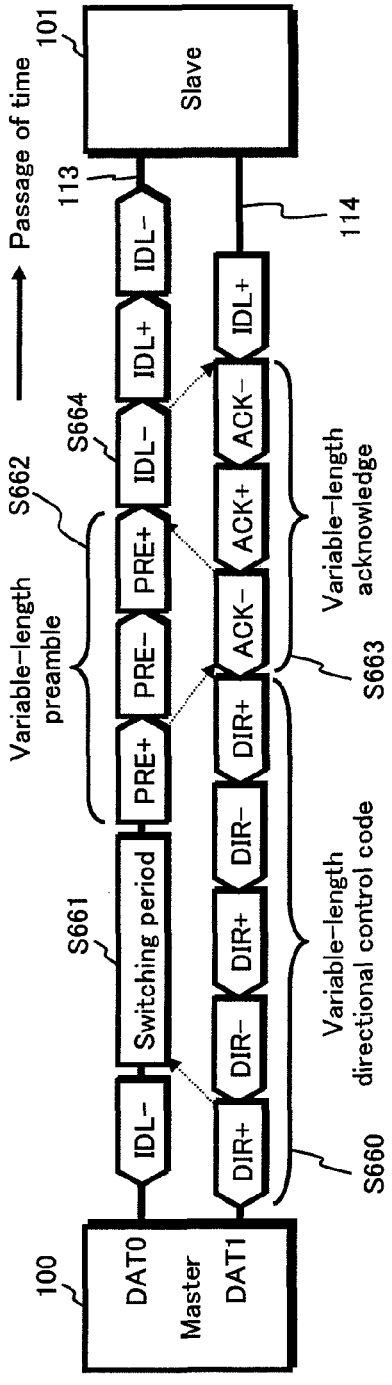

FIG.27

| K code | Symbol | Function | Original data (hexadecimal number) | Current RD − | Current RD + |
|---|---|---|---|---|---|
| K28.0 | FDX | FULL DUPLEX | 1C | 001111 0100 | 110000 1011 |
| K28.1 | HDX | HALF DUPLEX | 3C | 001111 1001 | 110000 0110 |
| K28.2 | BSY | BUSY | 5C | 001111 0101 | 110000 1010 |
| K28.3 | IDL | IDLE | 7C | 001111 0011 | 110000 1100 |
| K28.4 | — | Reserved | 9C | 001111 0010 | 110000 1101 |
| K28.5 | PRE | PREAMBLE | BC | 001111 1010 | 110000 0101 |
| K28.6 | — | Reserved | DC | 001111 0110 | 110000 1001 |
| K28.7 | — | Reserved | FC | 001111 1000 | 110000 0111 |
| K23.7 | ACK | ACKNOWLEDGE | F7 | 111010 1000 | 000101 0111 |
| K27.7 | SOP | START OF PACKET | FB | 110110 1000 | 001001 0111 |
| K29.7 | EOP | END OF PACKET | FD | 101110 1000 | 010001 0111 |
| K30.7 | — | Reserved | FE | 011110 1000 | 100001 0111 |

T201

DATA COMMUNICATION SYSTEM, COMMUNICATION DEVICE, AND COMMUNICATION METHOD

TECHNICAL FIELD

The present invention relates to a technique used in a communication system to switch between a full-duplex communication mode and a half-duplex communication mode, the communication system including a plurality of communication devices connected to each other via a plurality of channels that enable the full-duplex communication and the half-duplex communication.

BACKGROUND ART

Along with recent developments in techniques for reducing the size of semiconductors and increasing the speed thereof, the amount of data communicated between devices or LSIs in the devices tends to increase more and more. However, there are strict restrictions on the number of LSI terminals (pads) as the number affects package cost.

Communication modes used under such restrictions include the half-duplex communication mode and the full-duplex communication mode. The half-duplex communication mode requires a directional control of transmission and reception and an arbitration of a transmission right, whereas the full-duplex communication mode enables data to be transmitted and received simultaneously.

Patent literatures 1 and 2 disclose techniques for effectively transmitting and receiving data targeted for processing (hereinafter, target data), by switching between the full-duplex communication mode and the half-duplex communication mode.

For example, Patent literature 1 discloses a technique for switching the communication mode to the half-duplex communication mode when performing either transmission or reception, and to the full-duplex communication mode when performing both transmission and reception.

Patent literature 2 discloses a technique for, when switching to the half-duplex communication mode, performing (i) a directional control of transmission and reception and (ii) bit synchronization after the directional control, with use of a special control code defined by an encoding scheme such as 8b/10b.

CITATION LIST

Patent Literature

[Patent Literature 1]
Japanese Patent Application Publication No. 2002-94600
[Patent Literature 2]
Japanese Patent Application Publication No. 2005-260361

SUMMARY OF INVENTION

Technical Problem

In a conventional procedure for switching between the communication modes, transmission and reception of data starts after a lapse of a predetermined time period (fixed period) from the start of switching between the communication modes. Here, the switching between the communication modes refers to switching of the configuration of an interface unit that inputs and outputs data via the plurality of channels connected thereto, so that the interface unit is configured to only receive data via the channels, to only transmit data via the channels, or to transmit and receive data via the channels, in accordance with a communication mode to be switched to.

However, the conventional technique has the following problems. For example, the switching of a communication direction of each channel connecting the devices may be completed before the lapse of the fixed period. In this case, although a preparation for transmission and reception of data is completed, the transmission and reception does not start until after the lapse of the fixed period. This causes unnecessary latency before the lapse of the fixed period. In contrast, the switching of a communication direction of each channel may not be completed even after the lapse of the fixed period. For example, a receiving device may not have completed the switching of a communication direction of each channel and is not yet ready for receiving the target data. In this case, a transmitting device that has completed the switching of a communication direction starts transmitting the target data after the lapse of the fixed period even though the receiving device is not ready to receive the data. This causes a reception error, requiring additional communications such as a notification of the reception error and a data retransmission processing.

The aforementioned latency and additional communications occur because the transmitting device is unable to recognize that the receiving device has completed the switching of a communication direction of each channel.

The present invention has been achieved in view of the aforementioned problems, and an aim thereof is to provide a data communication system, a communication device, and a communication mode for starting transmission and reception of target data upon recognition that switching between communication modes is completed.

Solution to Problem

In order to solve the above problems, the present invention provides a data communication system including first and second devices that transmit and receive target data for processing via first and second channels connecting the first and second devices, the transmission and reception being performed by switching between full-duplex communication and half-duplex communication, wherein the first device includes: a first interface unit connected to the first and second channels; a first transmission unit operable to transmit an instruction code to the second device via the first channel when the first device is on a data transmitting end in the half-duplex communication, the instruction code indicating switching from the half-duplex communication to the full-duplex communication; a first switch control unit operable to switch a configuration of the first interface unit from a configuration for transmitting data via the second channel to a configuration for receiving data via the second channel; and a first communication control unit operable to start transmitting and receiving the target data in the full-duplex communication, after the switching by the first switch control unit is completed and a response code indicating completion of switching to the full-duplex communication is received from the second device via the second channel, the second device includes: a second interface unit connected to the first and second channels; a second switch control unit operable to switch a configuration of the second interface unit from the configuration for receiving data via the second channel to the configuration for transmitting data via the second channel, upon receipt of the instruction code from the first device via the first channel; a second transmission unit operable to transmit the response code to the first device via the second channel, upon completion of the switching by the second switch control unit; and a second communication control unit operable to start transmitting and receiving the target data in the full-duplex communication, upon transmission of the response code by the second transmission unit.

Advantageous Effects of Invention

According to the stated structure, the first and the second devices in the data communication system do not recognize the completion of the switching between the communication modes until after a lapse of a time period from the transmission and reception of the instruction code to the transmission and reception of the response code. In other words, the first and the second devices do not recognize the completion of the switching until a handshake using the instruction code and the response code is established. This prevents data communication from being erroneously started before completion of switching. Also, since the transmission and reception of data starts upon establishment of the handshake, latency between the completion of switching and the start of communication does not occur.

Here, the first transmission unit may further transmit a response reception code to the second device prior to the start of transmission and reception of the target data by the first communication control unit, the response reception code indicating receipt of the response code and a standby state for receiving the target data from the second device, the first communication control unit may start transmitting and receiving the target data upon transmission of the response reception code by the first transmission unit, and the second communication control unit may start transmitting and receiving the target data upon receipt of the response reception code.

According to the stated structure, the first and the second devices in the data communication system do not start the transmission and reception of the target data until the handshake using the instruction code and the response code and the handshake using the response code and the response reception code are both established. In other words, in the data communication system, the transmission and reception of data in the full-duplex communication starts after (i) the first device recognizes, by receipt of the response code, that the second device has received the instruction code transmitted by the first device and (ii) the second device recognizes, by receipt of the response reception code, that the first device has received the response code transmitted by the second device. This means that each of the first and the second devices recognizes that a device on an opposite end of communication has completed the switching between communication modes after the two handshakes are established, realizing a reliable start of the transmission and reception of the target data in the full-duplex communication.

Here, data communication between the first and second devices may be performed by a flow control in which (i) a transmitting device transmits a suspension code to a receiving device, the suspension code indicating suspension of data transmission and (ii) a receiving device transmits a message code to the transmitting device, the message code indicating receipt of the suspension code, the first transmission unit may transmit the suspension code prior to the instruction code, to the second device via the first channel, the second transmission unit may transmit the message code instead of the response code to the first device, upon completion of the switching by the second switching control unit, and the first communication control unit may receive, from the second device, the message code as the response code.

According to the stated structure, in a case where data communication in the data communication system is controlled by the flow control, the first device (i.e., transmitting device) transmits the suspension code to the second device (i.e., receiving device) when triggered by the instruction code, and receives the message code from the second device in response to the suspension code. In this way, the first and second devices in the data communication system start transmitting and receiving data upon completion of (i) a control with respect to the suspension code and (ii) switching between communication modes. This realizes an efficient start of the transmission and reception of the target data in the data communication with the flow control.

Here, data communication between the first and second devices may be performed by a flow control in which (i) a transmitting device transmits a suspension code to a receiving device, the suspension code indicating suspension of data transmission and (ii) a receiving device transmits a message code to the transmitting device, the message code indicating receipt of the suspension code, the first transmission unit may transmit the suspension code instead of the instruction code to the second device, in data communication in the half-duplex communication, the second switch control unit may receive the suspension code from the first device as the instruction code, the second transmission unit may transmit the message code instead of the response code to the first device, upon completion of the switching by the second switch control unit, and the first communication control unit may receive, from the second device, the message code as the response code.

According to the stated structure, in a case where data communication in the data communication system is controlled by the flow control, the first device transmits the suspension code instead of the instruction code, and the second device transmits the message code instead of the response code, in response to the suspension code. In this way, the first and second devices in the data communication system start transmitting and receiving data upon completion of (i) a control with respect to the suspension code and (ii) switching between communication modes. This realizes an efficient start of the transmission and reception of the target data in the data communication with the flow control.

Here, in the full-duplex communication, the first channel may be used to transmit data from the first device to the second device, and the second channel may be used to transmit data from the second device to the first device, the first transmission unit may transmit a transmission request code to the second device via the first channel in the full-duplex communication, the transmission request code including (i) a code indicating that the target data is to be transmitted to the second device and (ii) a code indicating that data communication is to be performed in the half-duplex communication, the second transmission unit may transmit a request reception code to the first device via the second channel upon receipt of the transmission request code via the first channel, the request reception code indicating the reception of the transmission request code, the first switch control unit may switch the configuration of the first interface unit from the configuration for receiving data via the second channel to the configuration for transmitting data via the second channel, upon receipt of the request reception code via the second channel, the second switch control unit may switch the configuration of the second interface unit from the configuration for transmitting data via the second channel to the configuration for receiving data via the second channel, upon transmission of the request reception code, and the first communication control unit may start transmitting the target data in the half-duplex communication, after a lapse of a predetermined time period from receipt of the request reception code.

According to the stated structure, the first and the second devices start switching to the half-duplex communication upon establishment of a handshake using the transmission request code and the request reception code, eliminating the risk of only one of the devices starting the switching. Also, since the switching between communication modes starts upon transmission and reception of the request reception code, both of the devices can start switching at similar timings and the second channel whose communication direction has been switched becomes available to both of the devices at similar timings.

Here, in a case where the first device transmits the transmission request code, data communication between the first and second devices may be performed by a flow control in which (i) the second device transmits a standby code to the first device, the standby code indicating that the second device is in a standby state for receiving the target data and (ii) the first device transmits a message code to the second device, the message code indicating that the standby code is received, the second transmission unit may transmit the standby code to the first device via the second channel, prior to the switching by the second switch control unit from the configuration for transmitting data via the second channel to the configuration for receiving data via the second channel, the first transmission unit may transmit, to the second device via the first channel, an instruction code indicating switching from the full-duplex communication to the half-duplex communication, after receiving the request reception code and subsequently receiving the standby code via the second channel, the first switch control unit may switch the configuration of the first interface unit from the configuration for receiving data to the configuration for transmitting data via the second channel, upon receipt of the standby code, the second switch control unit may switch the configuration of the second interface unit from the configuration for transmitting data via the second channel to the configuration for receiving data via the second channel, upon receipt of the instruction code indicating the switching from the full-duplex communication to the half-duplex communication via the first channel, the first transmission unit may transmit the message code to the second device via the first channel (i) after a lapse of the predetermined time period from receipt of the standby code and (ii) prior to the start of the transmission of the target data by the first communication control unit, and the first communication control unit may start transmitting the target data in the half-duplex communication, upon transmission of the message code by the first transmission unit.

According to the stated structure, in a case where data communication in the data communication system is controlled by the flow control, the first device transmits the instruction code upon receipt of the standby code from the second device. In a case where data is transmitted in a general flow control, the transmission and reception of data starts when a transmitting device receives a standby code from a receiving device and is ready to transmit the data. Therefore, using the transmission and reception of the standby code as a trigger for the transmission and reception of the instruction code eliminates a risk where a device on a data receiving end cannot transmit the standby code as a result of the fact that the switching to the half-duplex communication was erroneously performed prior to the transmission of the standby code.

Here, in a case where the first device transmits the transmission request code, data communication between the first and second devices may be performed by a flow control in which (i) the second device transmits a standby code to the first device, the standby code indicating that the second device is in a standby state for receiving the target data and (ii) the first device transmits a message code to the second device, the message code indicating that the standby code is received, the second transmission unit may transmit the standby code to the first device via the second channel, prior to the switching of the configuration of the second interface unit from the configuration for transmitting data via the second channel to the configuration for receiving data via the second channel, the second switch control unit may switch the configuration of the second interface unit from the configuration for transmitting data via the second channel to the configuration for receiving data via the second channel, upon transmission of the standby code by the second transmission unit, the first transmission unit may transmit the message code to the second device via the first channel (i) after receiving the request reception code and subsequently receiving the standby code via the second channel and (ii) prior to the start of the transmission of the target data by the first communication control unit, and the first communication control unit may start transmitting the target data in the half-duplex communication, upon transmission of the message code by the first transmission unit.

According to the stated structure, in a case where data communication in the data communication system is controlled by the flow control, both of the first and the second devices switch to the half-duplex communication upon transmission and reception of the standby code. In a case where data is transmitted in a general flow control, the transmission and reception of data starts when a transmitting device receives a standby code from a receiving device and is ready to transmit the data. Therefore, using the transmission and reception of the standby code as a trigger for the switching to the half-duplex communication eliminates a risk where a device on a data receiving end cannot transmit the standby code as a result of the fact that the switching to the half-duplex communication was erroneously performed prior to the transmission of the standby code.

Here, in the full-duplex communication, the first channel may be used to transmit data from the first device to the second device, and the second channel may be used to transmit data from the second device to the first device, the first transmission unit may transmit, to the second device, a reception request code via the first channel in the full-duplex communication, the reception request code including (i) a code indicating that the target data is to be received from the second device and (ii) a code indicating that data communication is to be performed in the half-duplex communication, the second transmission unit transmits a request reception code to the first device via the second channel upon receipt of the reception request code via the first channel, the request reception code indicating that the reception request code is received, the first switch control unit may switch the configuration of the first interface unit from a configuration for transmitting data via the first channel to a configuration for receiving data via the first channel, upon receipt of the request reception code via the second channel, the second switch control unit may switch the configuration of the second interface unit from the configuration for receiving data via the first channel to the configuration for transmitting data via the first channel, upon transmission of the request reception code, and the second communication control unit may start transmitting the target data in the half-duplex communication, after a lapse of a predetermined time period from the transmission of the request reception code.

According to the stated structure, the first and the second devices start switching to the half-duplex communication upon establishment of a handshake using the transmission request code and the request reception code, eliminating the risk of only one of the devices starting the switching. Also, since the switching between communication modes starts upon transmission and reception of the request reception code, both of the devices can start switching at similar timings, and the first channel whose communication direction has been switched becomes available to both of the devices at similar timings.

Here, in a case where the first device transmits the reception request code, data communication between the first and second devices may be performed by a flow control in which (i) the first device transmits a standby code to the second device, the standby code indicating that the first device is in a standby state for receiving the target data and (ii) the second device transmits a message code to the first device, the message code indicating that the standby code is received, the first transmission unit may transmit the standby code to the second device via the first channel upon receipt of the request reception code, prior to the switching of the configuration of the first interface unit from the configuration for transmitting data via the first channel to the configuration for receiving data via the first channel, the second transmission unit may transmit, to the first device via the second channel, an instruction code indicating switching from the full-duplex communication to the half-duplex communication, after transmitting the request reception code and subsequently receiving the standby code via the first channel, the first switch control unit may switch the configuration of the first interface unit from the configuration for transmitting data via the first channel to the configuration for receiving data via the first channel, after receiving the request reception code and subsequently receiving the instruction code indicating the switching from the full-duplex communication to the half-duplex communication, the second transmission unit may transmit the message code to the first device via the second channel (i) after a lapse of the predetermined time period from receipt of the standby code and (ii) prior to the start of the transmission of the target data by the second communication control unit, and the second communication control unit may start transmitting the target data in the half-duplex communication, upon transmission of the message code.

According to the stated structure, in a case where data communication in the data communication system is controlled by the flow control, the second device transmits the instruction code indicating switching to the half-duplex communication, upon receipt of the standby code from the first device. In a case where data is transmitted in a general flow control, the transmission and reception of data starts when a transmitting device receives a standby code from a receiving device and is ready to transmit the data. Therefore, using the transmission and reception of the standby code as a trigger for the transmission and reception of the instruction code eliminates a risk where a device on a data receiving end cannot transmit the standby code as a result of the fact that the switching to the half-duplex communication was erroneously performed prior to the transmission of the standby code.

Here, in a case where the first device transmits the reception request code, data communication between the first and second devices may be performed by a flow control in which (i) the first device transmits a standby code to the second device, the standby code indicating that the first device is in a standby state for receiving the target data and (ii) the second device transmits a message code to the first device, the message code indicating that the standby code is received, the first transmission unit may transmit the standby code to the second device via the first channel upon receipt of the request reception code, prior to the switching of the configuration of the first interface unit from a configuration for transmitting data via the first channel to a configuration for receiving data via the first channel, the first switch control unit may switch the configuration of the first interface unit from the configuration for transmitting data via the first channel to the configuration for receiving data via the first channel, upon transmission of the standby code by the first transmission unit, the second transmission unit may transmit the message code to the first device via the second channel (i) after transmitting the request reception code and subsequently receiving the standby code via the first channel, (ii) after a lapse of the predetermined time period from receipt of the standby code, and (iii) prior to the start of the transmission of the target data by the second communication control unit, and the second communication control unit may start transmitting the target data in the half-duplex communication, upon transmission of the message code by the second transmission unit.

According to the stated structure, in a case where data communication in the data communication system is controlled by the flow control, both of the first and the second devices switch to the half-duplex communication upon transmission and reception of the standby code. In a case where data is transmitted in a general flow control, the transmission and reception of data starts when a transmitting device receives a standby code from a receiving device and is ready to transmit the data. Therefore, using the transmission and reception of the standby code as a trigger for the switching to the half-duplex communication eliminates a risk where a device on a data receiving end cannot transmit the standby code as a result of the fact that the switching to the half-duplex communication was erroneously performed prior to the transmission of the standby code.

Here, the predetermined time period in the switching from the full-duplex communication to the half-duplex communication may be a time period required from when the second switch control unit starts switching from the half-duplex communication to the full-duplex communication to when the second device is ready to start transmitting and receiving the target data to/from the first device.

According to the stated structure, the data communication system optimizes time required for switching from the half-duplex communication to the full-duplex communication, by setting the predetermined time period to be equal to the time period required for switching from the full-duplex communication to the half-duplex communication.

Here, in a case where the first device receives the target data in the half-duplex communication, the second transmission unit may transmit an instruction code to the first device via the second channel, the instruction code indicating switching from the half-duplex communication to the full-duplex communication, the second switch control unit may switch the configuration of the second interface unit from the configuration for transmitting data via the first channel to the configuration for receiving data via the first channel, the first switch control unit may switch the configuration of the first interface unit from the configuration for receiving data via the first channel to the configuration for transmitting data via the first channel, upon receipt of the instruction code indicating the switching from the half-duplex communication to the full-duplex communication via the second channel, the first transmission unit may transmit, to the second device via the first channel, the response code indicating the completion of switching to the full-duplex communication, upon completion of the switching by the first switch control unit, the first communication control unit may start transmitting and receiving the target data in the full-duplex communication, upon transmission of the response code by the first transmission unit, and the second communication control unit may start transmitting and receiving the target data in the full-duplex communication, upon receipt of the response code from the first device via the first channel.

According to the stated structure, the first and the second devices do not recognize the completion of the switching between the communication modes until a handshake using the instruction code and the response code is established. This prevents data communication from being erroneously started before completion of switching. Also, since the transmission and reception of data starts upon establishment of the handshake, latency between the completion of switching and the start of communication does not occur.

Here, the first channel used by the first device to transmit the instruction code may be a channel used by the first device to transmit data to the second device in the full-duplex communication.

According to the stated structure, the first device in the data communication system uses the first channel to transmit, to the second device, not only the instruction code but also data in the full-duplex communication. In other words, when the communication mode is switched to the full-duplex communication mode, the instruction code is transmitted via the first channel whose communication direction does not need to be switched. This enables the first and the second devices to easily specify, as a target for switching, the second channel that is not used for the transmission of the instruction code.

Also, the present invention provides a data communication device for transmitting and receiving target data for processing via first and second channels connecting the data communication device and an other device, the transmission and reception being performed by switching between full-duplex communication and half-duplex communication, the data communication device comprising: an interface unit connected to the first and second channels; a transmission unit operable to transmit an instruction code to the other device via the first channel when the data communication device is on a data transmitting end in the half-duplex communication, the instruction code indicating switching from the half-duplex communication to the full-duplex communication; a switch control unit operable to switch a configuration of the interface unit from a configuration for transmitting data via the second channel to a configuration for receiving data via the second channel; and a communication control unit operable to start transmitting and receiving the target data in the full-duplex communication, after the switching by the switch control unit is completed and a response code indicating completion of switching to the full-duplex communication is received from the other device via the second channel.

According to the stated structure, the data communication device does not recognize the completion of the switching between the communication modes until a handshake with the other device using the instruction code and the response code is established. This prevents data communication from being erroneously started before completion of switching. Also, since the transmission and reception of data starts upon establishment of the handshake, latency between the completion of switching and the start of communication does not occur.

Here, in a case where the data communication device is on a data receiving end in the half-duplex communication, the switch control unit may switch the configuration of the interface unit from a configuration for receiving data via the first channel to a configuration for transmitting data via the first channel, upon receipt of the instruction code from the other device via the second channel, the transmission unit may transmit, to the other device via the first channel, the response code indicating completion of switching to the full-duplex communication, upon completion of the switching of the configuration of the interface unit by the switch control unit, and the communication control may start transmitting and receiving the target data in the full-duplex communication, upon transmission of the response code by the transmission unit.

According to the stated structure, even when the data communication device is on a data receiving end in the half-duplex communication, the data communication device does not recognize the completion of the switching between the communication modes until after a lapse of a time period from the transmission and reception of the instruction code to the transmission and reception of the response code. In other words, the data communication device does not recognize the completion of the switching until a handshake using the instruction code and the response code is established. This prevents data communication from being erroneously started before completion of switching. Also, since the transmission and reception of data starts upon establishment of the handshake, latency between the completion of switching and the start of communication does not occur.

Here, the other device may include first and second terminals used for data communication, the data communication device may be either a memory card or an I/O card that includes third and fourth terminals used for data communication, and that is removable from the other device, and when the data communication device is attached to the other device, the first terminal may be connected to the third terminal to create the first channel, and the second terminal may be connected to the fourth terminal to create the second channel.

According to the stated structure, it is possible to use the memory card or the I/O card as the data communication device. Therefore, when such cards are in a state of being able to recognize the completion of switching between the communication modes, they start the transmission and reception of the target data upon recognition of the completion of the switching.

BRIEF DESCRIPTION OF DRAWINGS

FIGS. 9A and 9B show one example of the data structure of a message packet;

FIG. 11 shows a K-code table T200 listing K codes;

FIG. 22A shows the flow of transmission and reception of a control code, in a case where the master 100 is on a data transmitting end and half-duplex communication is switched to full-duplex communication, and FIG. 22B shows the flow of transmission and reception of a control code, in a case where the master 100 is on a data receiving end and half-duplex communication is switched to full-duplex communication;

FIG. 27 shows one example of a K code table T201 in a case where a code (FDX) indicating the switching from half-duplex communication to full-duplex communication and a code (HDX) indicating the switching from full-duplex communication to half-duplex communication are allocated to K codes.

DESCRIPTION OF EMBODIMENT

1. Embodiment 1

The following describes a communication system 10 according to the present invention, with reference to the accompanying drawings.

1.1 Structure of Communication System 10

Figure 1:
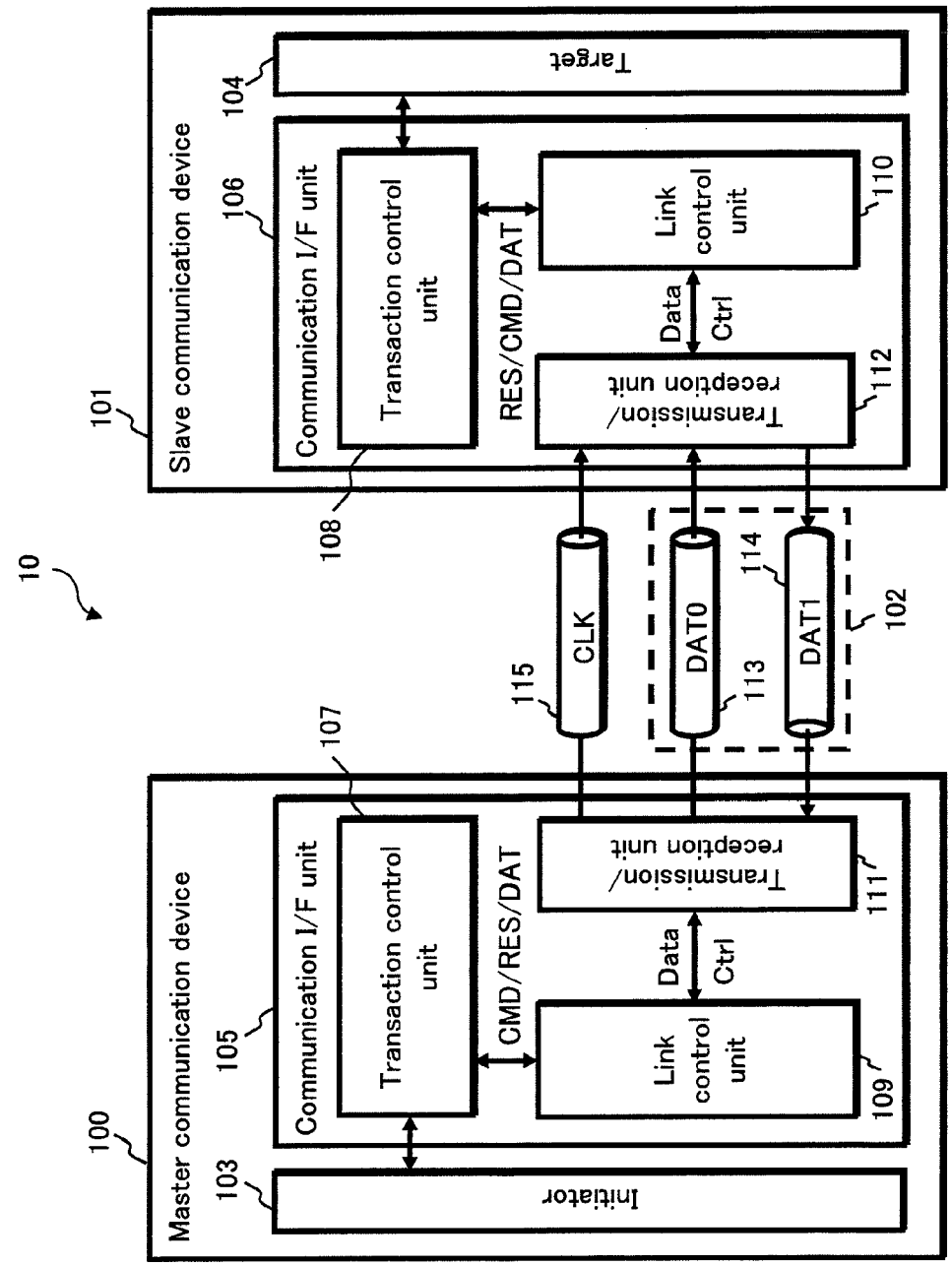
FIG. 1 is a block diagram showing the structure of a communication system 10.

FIG. 1 shows the overall structure of the communication system 10 according to Embodiment 1 of the present invention.

As shown in FIG. 1, the communication system 10 includes a master communication device 100 (hereinafter, master) and a slave communication device 101 (hereinafter, slave). The master 100 is connected to the slave 101 via a serial communication network 102 and a clock line 115.

The master 100 includes an initiator 103 and a communication interface unit 105 (hereinafter, communication I/F unit). The slave 101 includes a target 104 and a communication I/F unit 106.

The master 100 and the slave 101 use the communication I/F units 105 and 106 to communicate with the initiator 103 and the target 104, respectively. Note that transmission and reception of data targeted for processing (hereinafter, target data) in the present invention refers to communication (transmission and reception of data) performed between the initiator 103 and the target 104 with use of the communication I/F units 105 and 106.

The communication I/F unit 105 includes a transaction control unit 107, a link control unit 109, and a transmission/reception unit 111. Similarly, the communication I/F unit 106 includes a transaction control unit 108, a link control unit 110, and a transmission/reception unit 112.

The transaction control units 107 and 108 perform an overall control of communication (transaction layer) between the initiator 103 and the target 104.

The link control units 109 and 110 control a data link layer, such as an analysis of packets to be communicated, checking of transmission errors, directional control of a channel, and bit synchronization.

Each of the transmission/reception units 111 and 112 includes a transmitter circuit and a receiver circuit, and performs processing of a physical layer via the serial communication network 102.

As shown in FIG. 1, the serial communication network 102 includes serial channels including a first channel 113 (hereinafter, also referred to as DAT0 line) and a second channel 114 (hereinafter, also referred to as DAT1 line). The serial communication network 102 uses the channels to perform full-duplex communication and half-duplex communication.

In full-duplex communication, the DAT0 line 113 is placed in a downlink state where communication is directed from the master 100 to the slave 101, and the DAT1 line 114 is placed in an uplink state where communication is directed from the slave 101 to the master 100. The link control units 109 and 110 may perform control for a half-duplex communication mode in which the DAT0 line 113 and the DAT1 line 114 are both in a downlink state or in an uplink state.

1.2 Master 100

Here, a description is provided of the communication I/F unit 105 in the master 100.

As described above, the communication I/F unit 105 includes the transaction control unit 107, the link control unit 109, and the transmission/reception unit 111.

The following describes the components of the respective units included in the communication I/F unit 105.

(1) Transaction Control Unit 107

Figure 2:
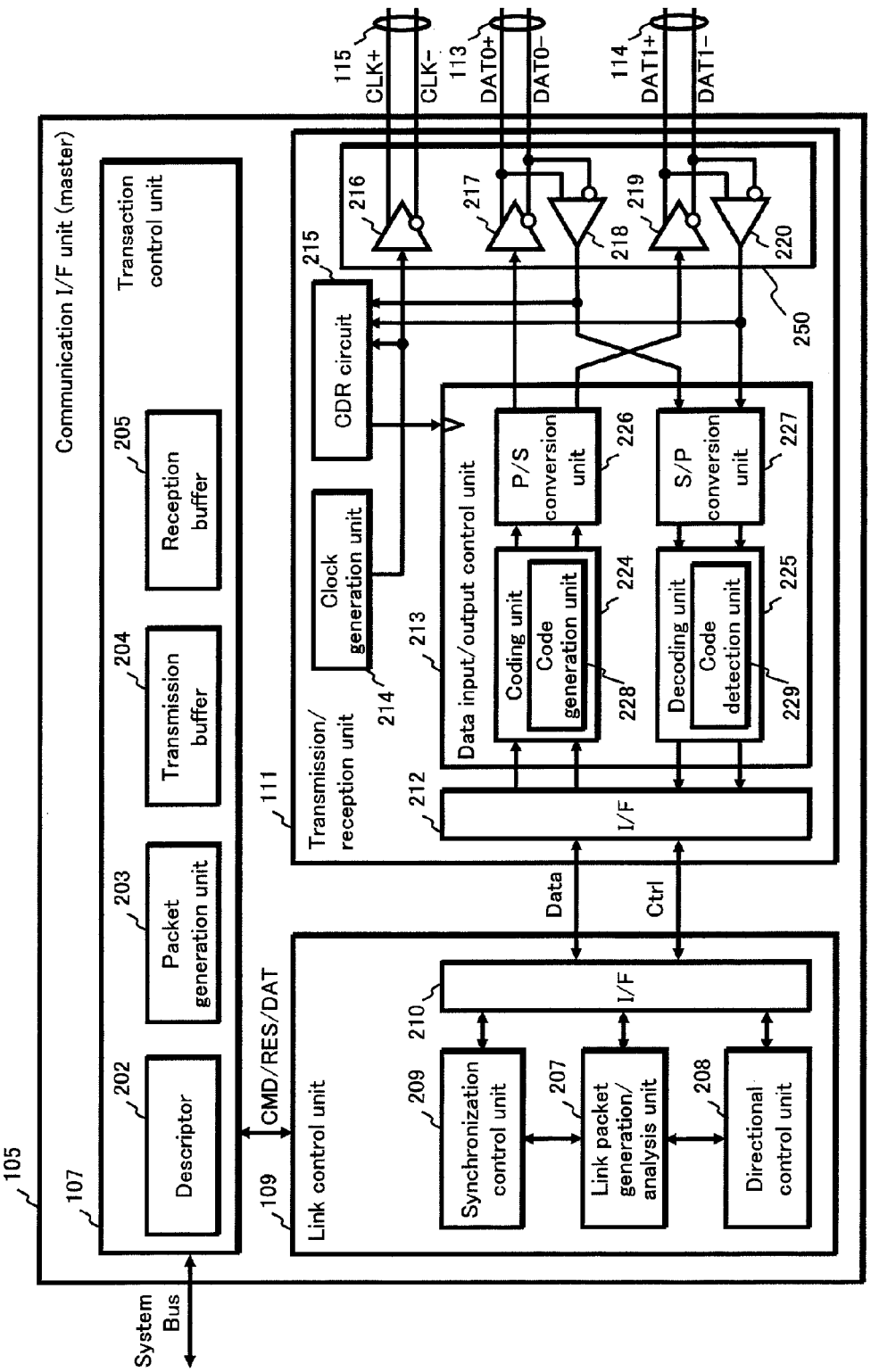
FIG. 2 is a block diagram showing the structure of a communication interface unit 105.

As shown in FIG. 2, the transaction control unit 107 includes a descriptor 202, a packet generation unit 203, a transmission buffer 204 and a reception buffer 205 that store data temporarily.

(1-1) Descriptor 202

The descriptor 202 includes a control register T100, and performs communication control from the initiator 103 by using the control register T100.

Figure 3:
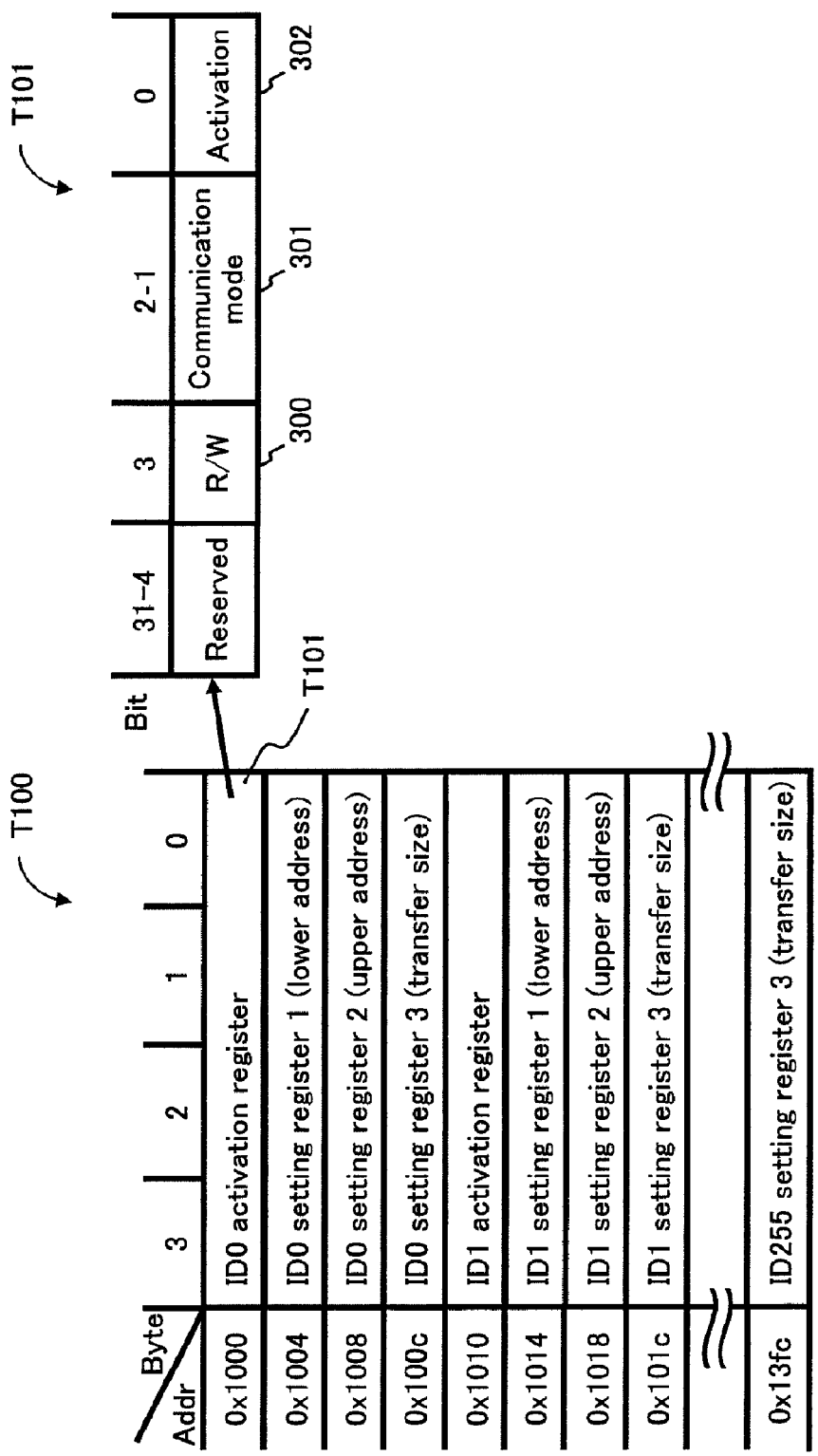
FIG. 3 shows one example of the data structure of a control register T100.

As shown in FIG. 3, the control register T100 in the descriptor 202 includes, for example, a set of an activation register and three setting registers, which is defined for each transaction. Here, the three setting registers are used to set (i) the initial address of a memory space and (ii) a transfer size, and each register is composed of four bytes.

An activation register T101 stores an R/W flag 300, a communication mode flag 301, and an activation flag 302. The R/W flag 300 is composed of one bit and indicates either reception (Read) of data or transmission (Write) of data. The communication mode flag 301 indicates whether data needs to be transmitted and received only in a full-duplex communication mode, only in a half-duplex communication mode, or either of the full-duplex and half-duplex communication modes. The activation flag 302 is used to activate communication in accordance with the settings of the R/W flag 300 and the communication mode flag 301.

Here, in the example of FIG. 3, the control register T100 stores 256 sets of registers to enable entries of a plurality of communications (transactions) from the initiator 103. The transactions are identified by transaction IDs from ID0 to ID255.

(1-2) Transmission Buffer 204 and Reception Buffer 205

The transmission buffer 204 temporarily stores data to be transmitted to the slave 101. The reception buffer 205 temporarily stores data received from the slave 101.

(1-3) Packet Generation Unit 203

The packet generation unit 203 generates a command packet and a data packet that trigger the start of communication, in accordance with the setting of the descriptor 202 and the states of the transmission buffer 204 and the reception buffer 205.

The packet generation unit 203 generates packets to be transmitted and outputs the packets to the link control unit 206. The generation and output of the packet is performed after the initiator 103 sets values necessary for registers that correspond to one of the transaction IDs in the control register T100 and a transaction corresponding to the transaction ID is activated.

The following describes packets generated by the packet generation unit 203.

(1-2-1) Common Data Structure

Figure 4A:
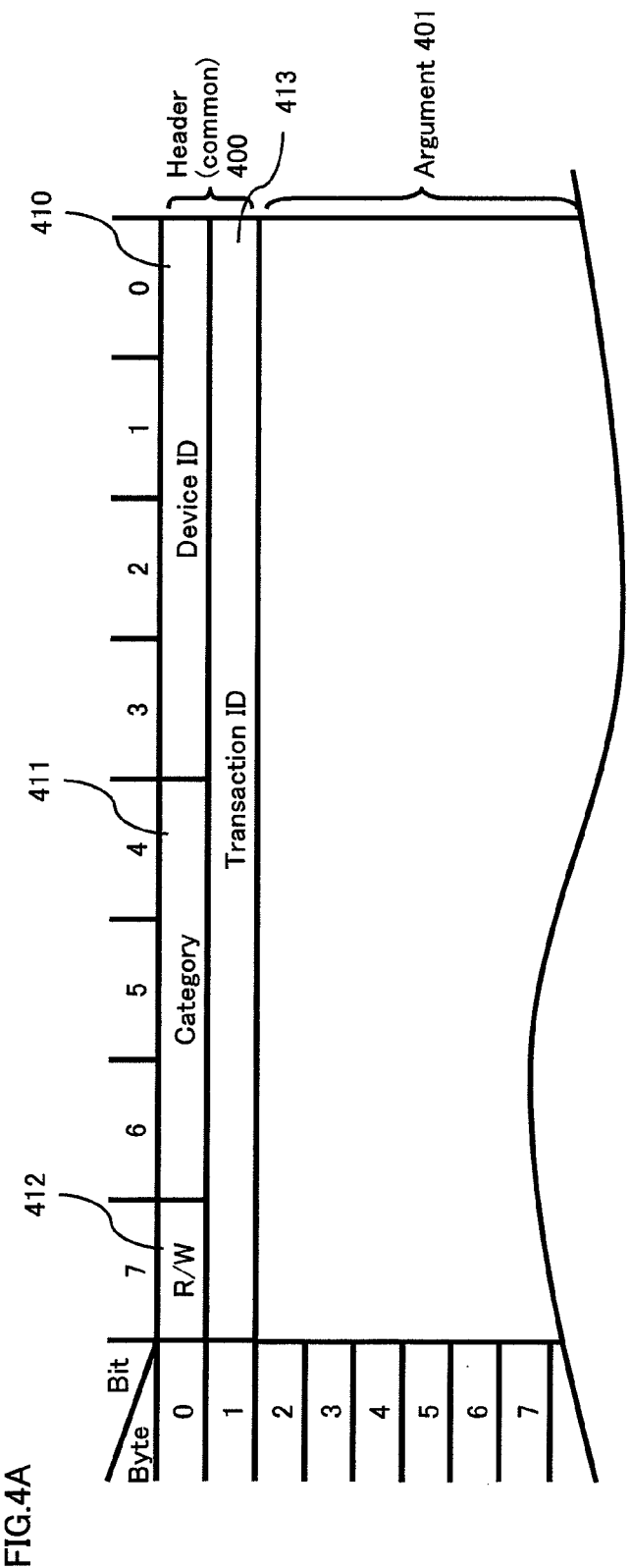
FIGS. 4A and 4B show one example of the data structure of a header portion of each packet.
Figure 4B:
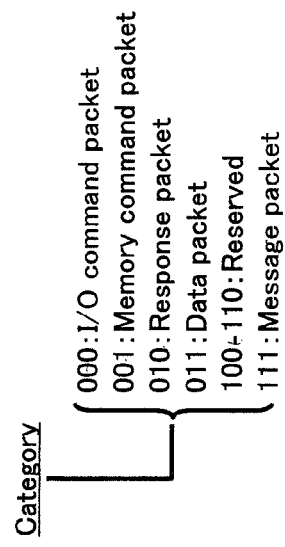

First, a description is provided of a data structure common to packets generated by the packet generation unit 203, with reference to FIGS. 4A and 4B.

Each of the packets includes at least a header (common) portion 400 and an argument portion 401. The header (common) portion 400 has a data structure common to the packets.

FIG. 4A shows one example of a data structure of the header portion 400. The header portion 400 is composed of the first two bytes of a packet, and includes a device ID 410, a category 411, an R/W 412, and a transaction ID 413.

The device ID 410 (not shown) is an identifier for identifying a slave to which a packet is transmitted, in a case where a plurality of slaves are connected to one master via a hub.

The category 411 indicates the type of a packet. FIG. 4B shows the types of packets. For example, the value "000" indicates an I/O command packet, the value "001" indicates a memory command packet, the value "010" indicates a response packet, and the value "111" indicates a message packet. Note that command types are not allocated to the values "100" through "110".

The R/W 412 indicates either reception (Read) or transmission (Write). The transaction ID 413 is used to identify a transaction activated by the initiator 103, as described above.

(1-2-2) Memory Command Packet

Figure 5A:
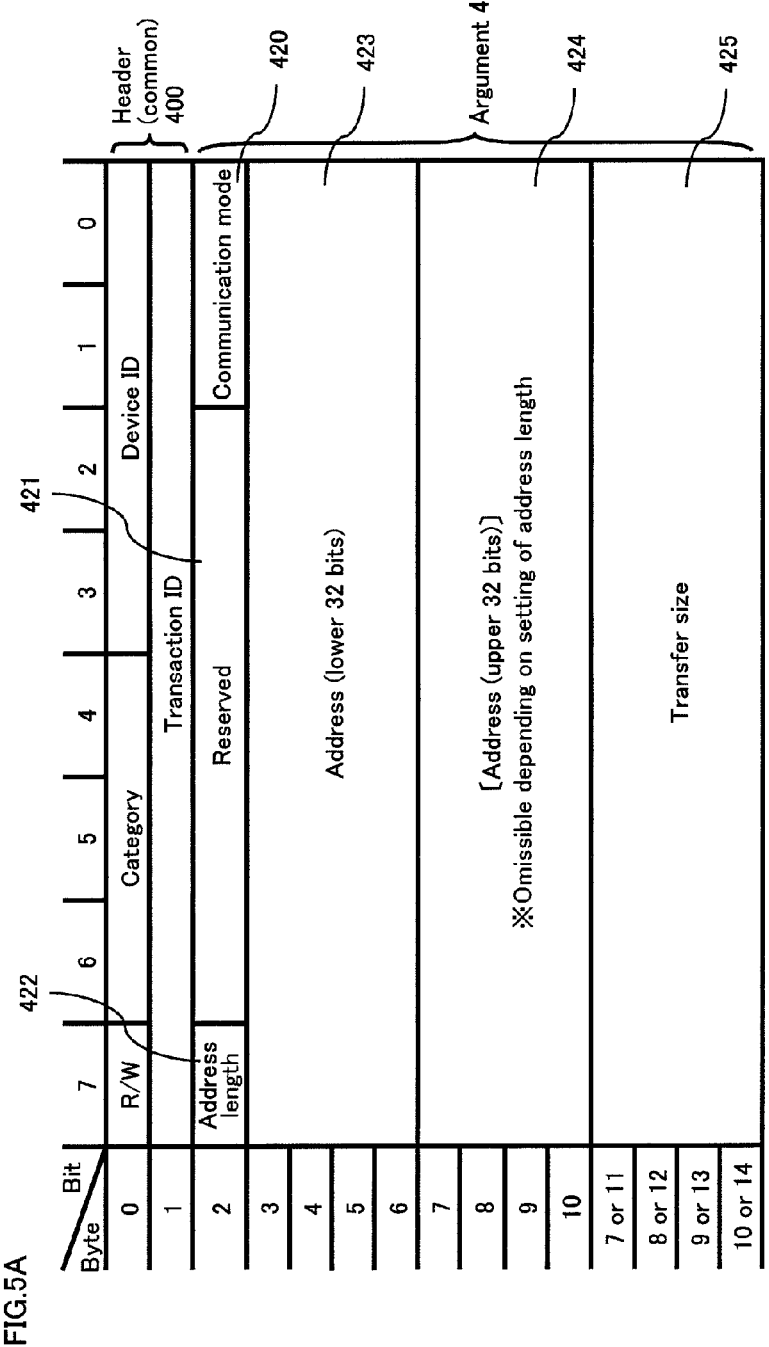
FIGS. 5A and 5B show one example of the data structure of a memory command packet.
Figure 5B:
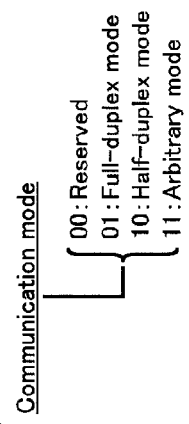

The following describes the data structure of a memory command packet, with reference to FIGS. 5A and 5B.

A memory command packet includes the header portion 400 and the argument portion 401, as shown in the section "(1-2-1) Common data structure" and FIG. 5A.

A description of the data structure of the header portion 400 is omitted here, since the description is provided in the section "(1-2-1) Common data structure". Note that the value "001" is set to the category of the header portion 400.

The argument portion 401 of a memory command packet includes a communication mode 420, reserved 421, an address (lower 32 bits) 423, and address (upper 32 bits) 424, and a transfer size 425.

The communication mode 420 indicates a communication mode during data communication. FIG. 5B shows the types of communication modes. For example, the value "01" indicates a full-duplex mode where communication is performed in full-duplex communication, the value "10" indicates a half-duplex mode where communication is performed in half-duplex communication, and the value "11" indicates an arbitrary mode where communication is performed either in full-duplex communication or in half-duplex communication. Note that a communication mode is determined in accordance with the communication performance of the master 100, the size of data to be transmitted/received, and such.

The address length 422 stores a value for identifying whether a subsequent address field is 4 bytes (32 bits) or 8 bytes (64 bits).

The addresses 423 and 424 store the initial address of data targeted for transmission and reception. Specifically, when the value stored in the address length 422 indicates 4 bytes, the address of the data is indicated with use of only the address 423. When the value stored in the address length 422 indicates 8 bytes, the lower 32 bits of the address of the data are indicated by the address 423, and the upper 32 bits of the address of the data are indicated by the address 424.

The transfer size 425 stores the size of data targeted for transmission and reception.

(1-2-3) I/O Command Packet

The following describes an I/O command packet.

An I/O command packet is used for the master 100 and the slave 101 to perform communication in I/O space that has mapped therein a control register in the descriptor 202, control registers in the initiator 103 and the target 104, and such.

Figure 6:
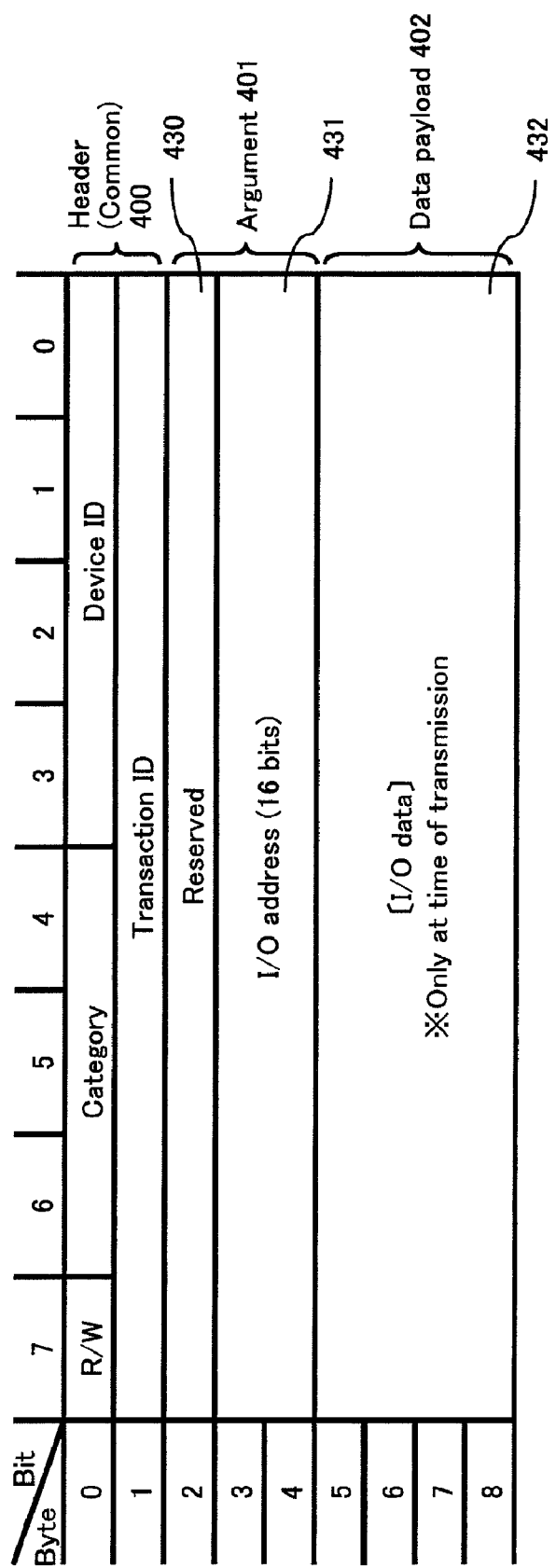
FIG. 6 shows one example of the data structure of an I/O command packet.

The I/O command packet includes a data payload 402, in addition to the header portion 400 and the argument portion 401, as shown in the section "(1-2-1) Common data structure" and FIG. 6.

A description of the data structure of the header portion 400 is omitted here, since the description is provided in the section "(1-2-1) Common data structure". Note that the value "000" is set to the category of the header portion 400.

The argument portion 401 includes an I/O address 431 indicating an address length in accordance with the I/O space, and includes reserved 430.

The data payload 402 includes I/O data that is actual communication data during data transmission.

In general, the I/O data 432 is data having a short fixed length, such as data of a control register. Therefore, in the present embodiment, the transmission and reception of an I/O command packet is always performed in the full-duplex communication mode.

(1-2-4) Data Packet

The following describes a data packet.

Figure 7:
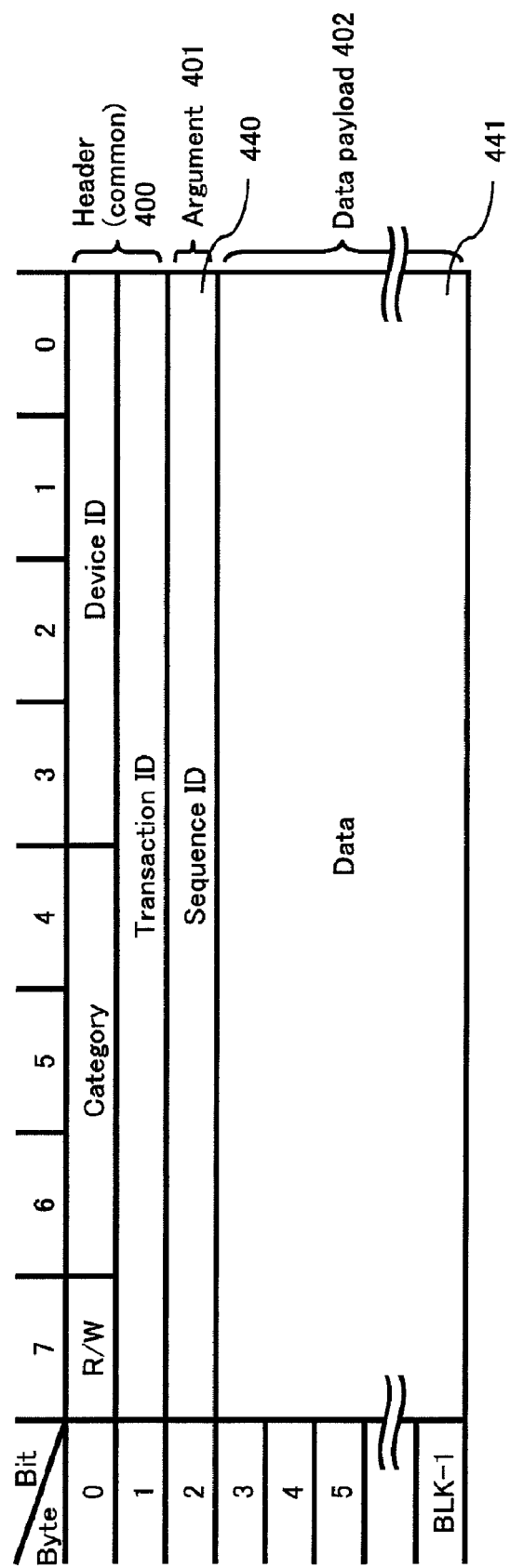
FIG. 7 shows one example of the data structure of a data packet.

FIG. 7 shows one example of the data structure of a data packet.

As shown in FIG. 7, a data packet includes the header portion 400, the argument portion 401, and the data payload 402, in the same manner as the I/O command packet.

The data packet is used for the transmission and reception of data between the master 100 and the slave 101, where the data has a transfer size set in the memory command packet. Specifically, the data having a transfer size set in the memory command packet is divided (packetized) into one or more data blocks, on a per-block-size (BLK) basis that is pre-shared between the master 100 and the slave 101 using the I/O command or the like.

A description of the data structure of the header portion 400 is omitted here, since the description is provided in the section "(1-2-1) Common data structure". Note that the value "011" is set to the category of the header portion 400.

The argument 401 includes a sequence ID 440 indicating the number of a divided data block. This enables a device on a data receiving end to recognize the ordinal position of a received data block.

The data payload 402 includes a divided data block 441 corresponding to the number of a data block shown by the sequence ID 440.

(1-2-5) Response Packet

The following describes a response packet.

A response packet is generated and issued by the transaction control unit 108 in the slave 101, in response to a packet issued by the master 100.

Figure 8:
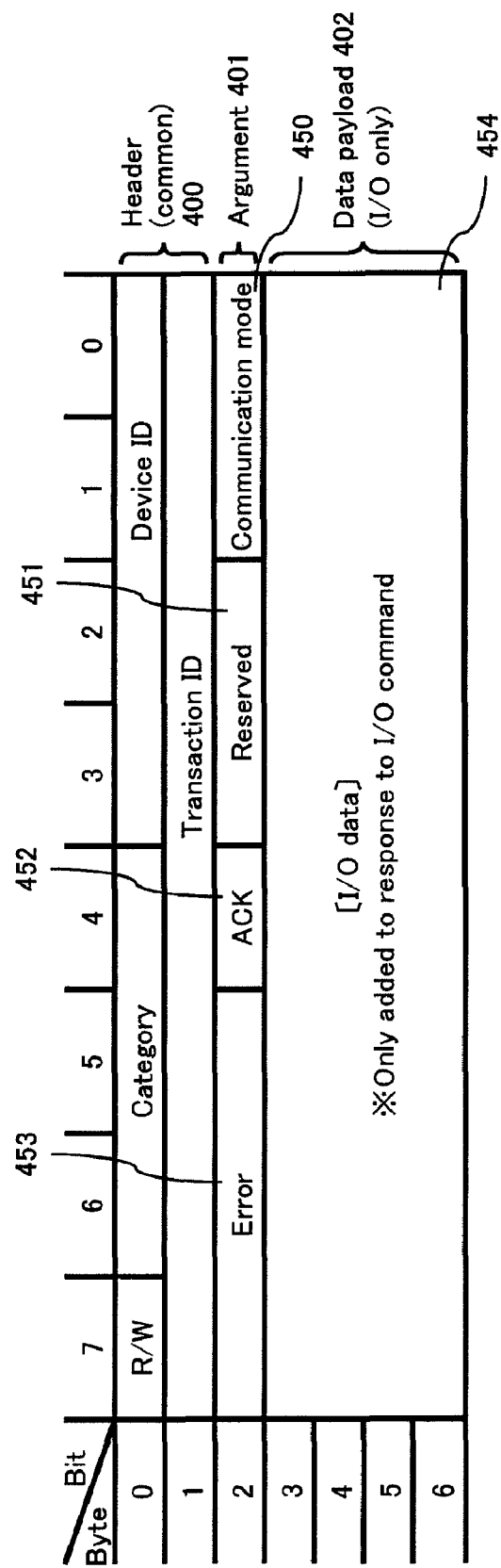
FIG. 8 shows one example of the data structure of a response packet.

FIG. 8 shows one example of the data structure of a response packet.

As shown in FIG. 8, a response packet includes the header portion 400, the argument portion 401, and the data payload 402, in the same manner as the I/O command packet.

A description of the data structure of the header portion 400 is omitted here, since the description is provided in the section "(1-2-1) Common data structure". Note that the value "010" is set to the category of the header portion 400.

The argument portion 401 includes a communication mode 450, reserved 451, an ACK bit 452, and an error code 453. The communication mode 450 indicates the same mode used in the command packet. The ACK bit 452 indicates (i) ACK when a response is possible after a command packet is successfully received and (ii) NAK when a response is impossible due to an error such as an address error or a transfer size error. The error code 453 indicates a type of error when a value indicating "NAK" is set to the ACK bit 452.

The data payload 402 has I/O data 454 added thereto at the time of responding to receipt of an I/O command packet.

(1-2-6) Message Packet

Finally, a description is provided of a message packet.

A message packet is used for communication of a sideband signal such as an interrupt via the serial communication network 102.

FIGS. 9A and 9B each show one example of the data structure of a message packet.

As shown in FIG. 9A, a response packet includes the header portion 400 and the argument portion 401.

A description of the data structure of the header portion 400 is omitted here, since the description is provided in the section "(1-2-1) Common data structure". Note that the value "111" is set to the category of the header portion 400.

The argument portion 401 includes a message category 460, reserved 461, a REQ/ACK bit 462, and a message index 463 indicating details of a message.

The message category 460 indicates the type of a message. FIG. 9B shows the types of messages. For example, the value "0000" indicates an interrupt assertion, the value "0001" indicates an interrupt negation, the value "0010" indicates a CRC error, the value "0011" indicates an abort, the value "1110" indicates electric power control, and the value "1111" indicates a reset. Note that message types are not allocated to the values "0100" through "1101".

The REQ/ACK bit 462 indicates a request (REQ) of a message or acknowledgment (ACK) with respect to a message.

Here, the interrupt assertion indicates an interrupt, and the interrupt negation indicates that the cause of an interrupt has been removed. The CRC error indicates the occurrence of a transmission error. The abort indicates the cancellation of data transfer. The electric power control instructs the reduction in electric power consumption in an idle state. The reset instructs initialization.

In the case of the interrupt assertion or the interrupt negation, a message index indicates the number of an interrupt cause register that is mapped in the I/O space. In the case of a CRC error, the message index indicates the sequence ID of a data packet in error. In the case of an abort, the message index indicates the sequence ID of a data packet whose transmission has been completed before the abort. In the case of an electric power control, the message index indicates targets for electric power control. The targets may be the transmission/reception units 111 and 112, and the link control units 109 and 110. Alternatively, the targets may include the transaction control units 107 and 108, in addition to the transmission/reception units 111 and 112 and the link control units 109 and 110.

(2) Link Control Unit 109

As shown in FIG. 2, the link control unit 109 includes a link packet generation/analysis unit 207, a directional control unit 208, a synchronization control unit 209, and an I/F unit 210.

(2-1) Link Packet Generation/Analysis Unit 207

The link packet generation/analysis unit 207 performs CRC computation on packets generated by the packet generation unit 203 in the transaction control unit 107.

Then, the link packet generation/analysis unit 207 attaches a CRC code as a footer portion to the end of each packet on which CRC computation has been performed, and thus generates link packets. The link packet generation/analysis unit 207 outputs the generated link packets to the transmission/reception unit 111.

Figure 10:
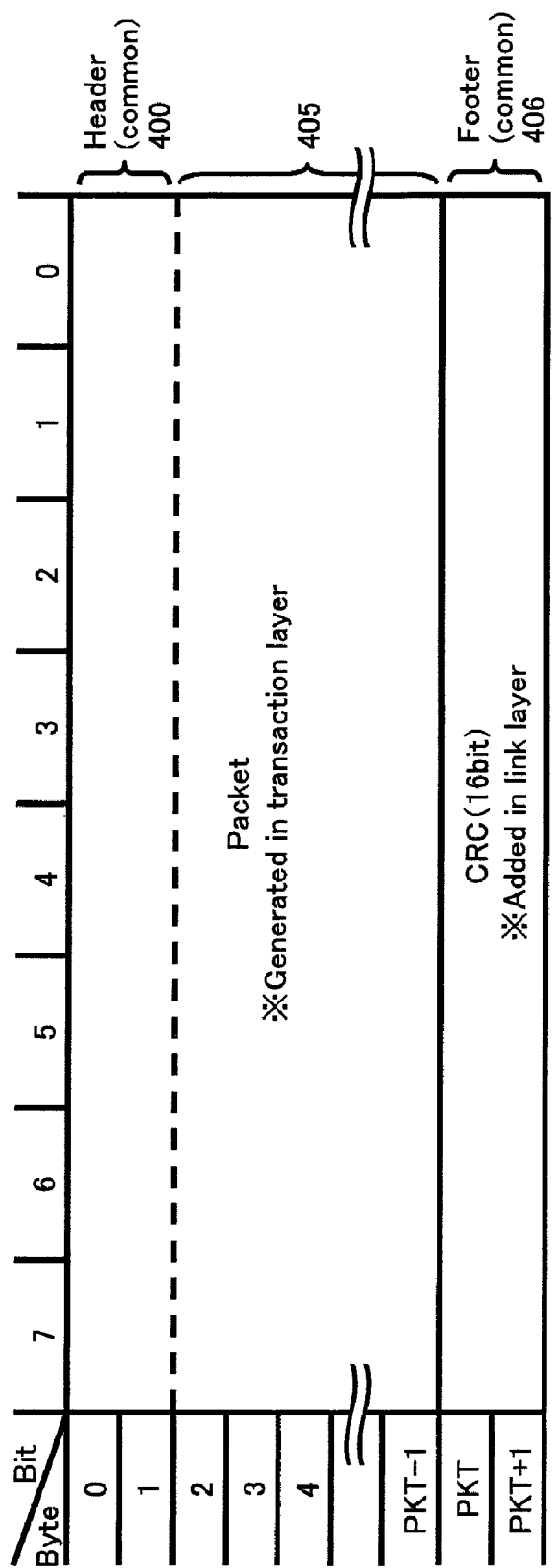
FIG. 10 shows one example of the data structure of a link packet.

FIG. 10 shows one example of the data structure of a link packet to which a footer portion is attached. Here, the size of the link packet is "PKT", and the footer portion is attached to the end of the link packet.

The link packet includes the header portion 400, a packet portion 405, and a footer portion 406.

A description of the header portion 400 is omitted here since the description is provided above.

The packet portion 405 includes either (i) the aforementioned argument portion 401 or (ii) the argument portion 401 and the data payload 402. Therefore, a description of the packet portion 405 is omitted here.

The footer portion 406 includes a CRC code (e.g., 16 bits).

The link packet generation/analysis unit 207 performs a transmission error check on a link packet input from the transmission/reception unit 111, with use of a CRC code included in the link packet. Subsequently, the link packet generation/analysis unit 207 removes the CRC code, etc. from the link packet, and outputs only the necessary portion of the link packet to the transaction control unit 107.

(2-2) Directional Control Unit 208

The directional control unit 208 performs a directional control of a channel, along with the switching of communication modes between the full-duplex communication mode and the half-duplex communication mode.

Specifically, when the master 100 is on a receiving end of target data and the directional control is performed along the switching from the full-duplex communication mode to the half-duplex communication mode, the directional control unit 208 changes the configuration of a channel I/F unit 250 that is connected to the DAT0 line 113 and the DAT1 line 114, such that the channel I/F unit 250 receives data via both DAT0 line 113 and DAT1 line 114. Also, when the master 100 is on a transmitting end of target data and the directional control is performed along the switching from the full-duplex communication mode to the half-duplex communication mode, the directional control unit 208 changes the configuration of the channel I/F unit 250 such that the channel I/F unit 250 transmits data via both DAT0 line 113 and DAT1 line 114. Further, when the directional control is performed along the switching from the half-duplex communication mode to the full-duplex communication mode, the directional control unit 208 changes the configuration of the channel I/F unit 250, such that the channel I/F unit 250 transmits data via the DAT0 line 113 and receives data via the DAT1 line 114.

Note that a description of the channel I/F unit 250 is provided below.

(2-3) Synchronization Control Unit 209

The synchronization control unit 209 generates, immediately after initialization, a synchronization code (preamble) for bit synchronization and symbol synchronization.

(2-4) I/F Unit 210

The I/F unit 210 performs input and output of data between the link control unit 109 and the transmission/reception unit 111.

(3) Transmission/Reception Unit 111

The transmission/reception unit 111 includes a data input/output control unit 213, a clock generation unit 214, a CDR (Clock Data Recovery) circuit 215, an I/F unit 212, and the channel I/F unit 250.

(3-1) Clock Generation Unit 214 and CDR Circuit 215

The clock generation circuit 214 generates a reference clock signal.

The CDR circuit 215 extracts a high-speed clock signal embedded in the data in a serial channel, by synchronizing the phase of the high-speed clock signal with that of the reference clock signal.

(3-2) Channel I/F Unit 250

The channel I/F unit 250 includes differential transmitters 216, 217, and 219, and differential receivers 218 and 220.

Each of the differential transmitters 216, 217 and 219 converts a serial signal into a differential signal, and transmits the differential signal.

The differential transmitter 216 transmits the reference clock signal via the clock line 115.

The differential transmitter 217 transmits serial data via the DAT0 line 113. The differential transmitter 219 transmits serial data via the DAT1 line 114.

Each of the differential receivers 218 and 220 converts a received differential signal into a serial signal.

The differential receiver 218 receives serial data via the DAT0 line 113. The differential receiver 220 receives serial data via the DAT1 line 114.

Specifically, in the full-duplex communication, the differential transmitter 217 and the differential receiver 220 operate effectively by being connected to the DAT0 line 113 and the DAT1 line 114, respectively. Suppose here that the master 100 transmits data and that the full-duplex communication mode is switched to the half-duplex communication mode. In this case, the directional control unit 208 controls the direction of communication such that the connection destination of the DAT1 line 114 is switched from the differential receiver 220 to the differential transmitter 219. Also, suppose that the master 100 receives data and that the full-duplex communication mode is switched to the half-duplex communication mode. In this case, the directional control unit 208 controls the direction of communication such that the connection destination of the DAT0 line 113 is switched from the differential transmitter 217 to the differential receiver 218.

The following describes specific examples of (i) switching from a differential transmitter to a differential receiver and (ii) switching from a differential receiver to a differential transmitter.

The differential transmitter 217 and the differential receiver 218 are connected to a power unit that supplies electric power, via a first switch circuit (not shown). The directional control unit 208 causes the first switch circuit to be connected to either the differential transmitter 217 or the differential receiver 218. When data is transmitted to the slave 101 via the DAT0 line 113, the directional control unit 208 causes the first switch circuit to connect to the differential transmitter 217. When data is received from the slave 101 via the DAT0 line 113, the directional control unit 208 causes the first switch circuit to connect to the differential receiver 218.

The differential transmitter 219 and the differential receiver 220 are connected to the power unit via a second switch circuit (not shown). The directional control unit 208 causes the second switch circuit to be connected to either the differential transmitter 219 or the differential receiver 220. When data is transmitted to the slave 101 via the DAT1 line 114, the directional control unit 208 causes the second switch circuit to connect to the differential transmitter 219. When data is received from the slave 101 via the DAT1 line 114, the directional control unit 208 causes the second switch circuit to connect to the differential receiver 220.

With the aforementioned control, one of the differential transmitter 217 and the differential receiver 218 is connected to the first switch circuit, and thus is supplied with electric power. As a result, the one that is connected to the first switch circuit is activated, and the other one that is not connected to the first switch circuit is not activated.

Similarly, one of the differential transmitter 219 and the differential receiver 220 is connected to the second switch circuit, and thus is supplied with electric power. As a result, the one that is connected to the second switch circuit is activated, and the other one that is not connected to the second switch circuit is deactivated.

Hereinafter, a state where a differential receiver and a differential transmitter are activated refers to a state where the differential receiver and the differential transmitter are supplied with electric power. Also, a state where a differential receiver and a differential transmitter are deactivated refers to a state where the differential receiver and the differential transmitter are not supplied with electric power.

(3-3) Data Input/Output Control Unit 213

The data input/output control unit 213 includes an coding unit 224, a decoding unit 225, a parallel/serial conversion unit (P/S conversion unit) 226, and a serial/parallel conversion unit (S/P conversion unit) 227.

(3-3-1) Coding Unit 224 and Decoding Unit 225

The coding unit 224 encodes serial data in an encoding scheme such as 8b/10b, so as to embed a high-speed clock signal in the data and transmit the resultant data having therein the high-speed clock signal.

The decoding unit 225 decodes data encoded in an encoding scheme such as 8b/10b.

In general, the 8b/10b scheme includes the definitions of control codes (K codes) that make use of the redundancy of encoding. Therefore, in the present embodiment, the coding unit 224 includes a code generation unit 228 that generates K codes in response to an instruction from the link control unit 206. Also, the decoding unit 225 includes a code detection unit 229 that detects K codes from decoded parallel data.

FIG. 11 shows one example of the allocation of the functions of K codes in the present embodiment.

A K-code table T200 includes at least one set of a K code, a symbol, a function, original data, Current RD−, and Current RD+.

A K code indicates a code. A symbol identifies a function indicated by a corresponding K code. A function indicates a function indicated by a corresponding K code. Original data indicates an instruction given by the link control unit 206. Original data corresponds to a K code. Current RD− and Current RD+ are code attributes to balance the DC (Direct Current) component of a signal by alternately transmitting (i) a code having zeros more than ones and (ii) a code having ones more than zeros.

The link control unit 206 transmits original data shown in FIG. 11 to the transmission/reception unit 111, and instructs the transmission/reception unit 111 to convert the original data into a K code. Upon receipt the original data, the code generation unit 228 of the coding unit 224 generates a K code corresponding to the original data, based on the K-code table T200. The coding unit 224 alternately transmits Current RD− and Current RD+ that correspond to the generated K code.

The code detection unit 229 detects a K code based on Current RD− and Current RD+ that are included in decoded parallel data, and specifies a function corresponding to the K code.

The use of control codes (i.e., K codes) shown in FIG. 11 is described below in operations in the present embodiment.

Figure 12:
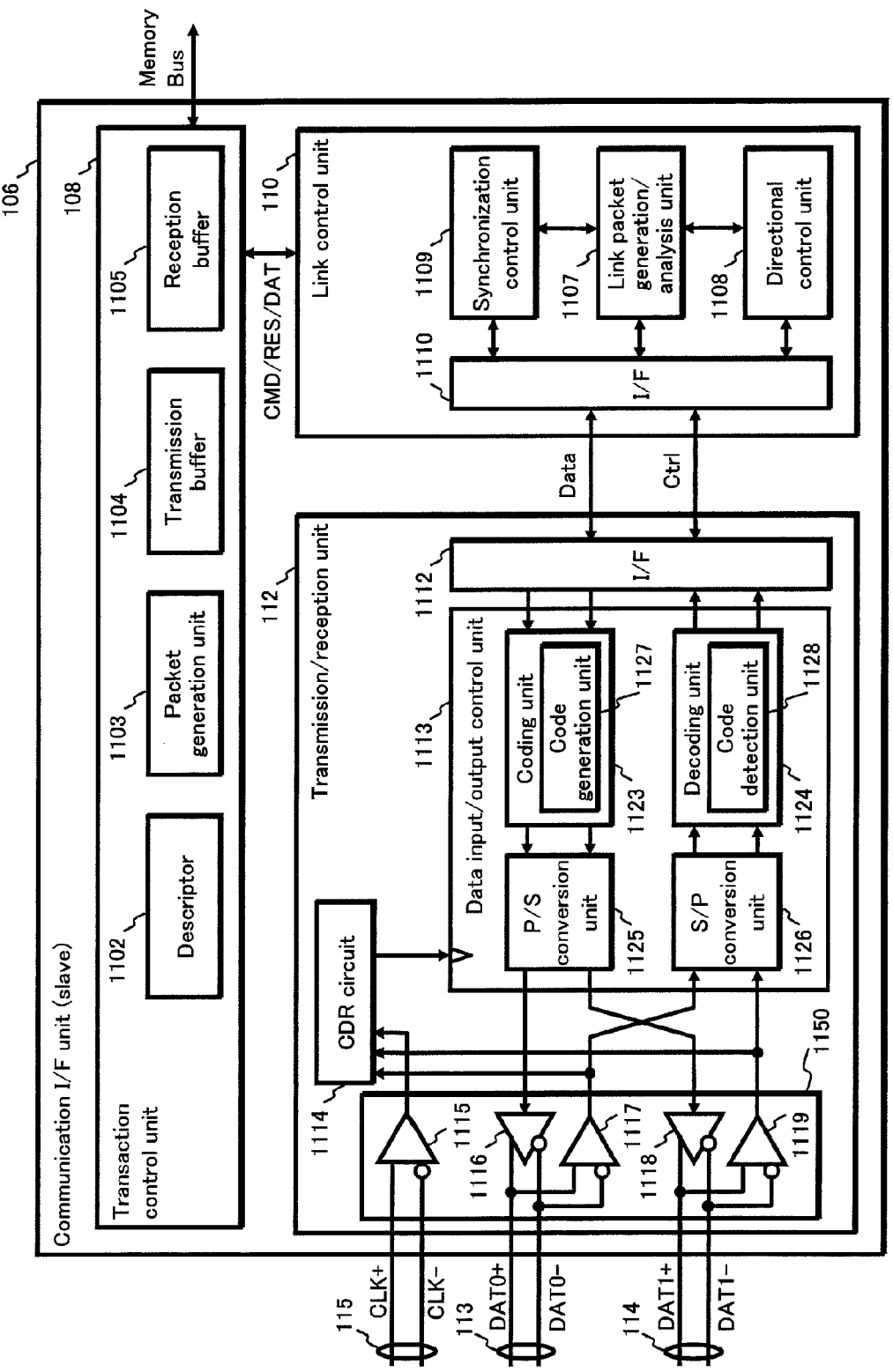
FIG. 12 is a block diagram showing the structure of a communication interface unit 106.

(3-3-2) P/S Conversion Unit 226 (1125, See FIG. 12) and S/P Conversion Unit 227 (1126, See FIG. 12)

The P/S conversion unit 226 (1125, see FIG. 12) converts encoded parallel data into serial data. The serial data is then transmitted to the slave 101 via the channel I/F unit 250.

The S/P conversion unit 227 (1126, see FIG. 12) converts serial data received from the slave 101 via the channel I/F unit 250, into encoded parallel data.

(3-4) I/F Unit 212

The I/F unit 212 performs input and output of data between the link control unit 109 and the transmission/reception unit 111.

1.3 Slave 101

The following describes the communication I/F unit 106 in the slave 101.

As shown in FIG. 12, the communication I/F unit 106 includes the transaction control unit 108, the link control unit 110, and the transmission/reception unit 112, in the same manner as the communication I/F unit 105 in the master 100.

The following describes the components of the slave 100 in detail.

As shown in FIG. 12, the transaction control unit 108 includes a descriptor 1102, a packet generation unit 1103, a transmission buffer 1104, and a reception buffer 1105. A description of these components is omitted here, since the components are the same as those of the transaction control unit 107 in the master 100.

As shown in FIG. 12, the link control unit 110 includes a link packet generation/analysis unit 1107, a directional control unit 1108, a synchronization control unit 1109, and an I/F unit 1110. A description of these components is omitted here, since the components are the same as those of the link control unit 109 in the master 100.

The transmission/reception unit 112 includes a data input/output control unit 1113, a CDR circuit 1114, an I/F unit 1112, and a channel I/F unit 1150.

A description of the data input/output control unit 1113, the CDR circuit 1114, and the I/F unit 1112 is omitted here, since these components are the same as those in the master 100.

Here, a description is provided of the structure of the channel I/F unit 1150.

The channel I/F unit 1150 includes differential receivers 1115, 1117, and 1118, and differential transmitters 1116 and 1118.

The differential receiver 1115 receives a reference clock signal transmitted from the master 100 via the clock line 115.

The differential transmitter 1116 transmits serial data via the DAT0 line 113. The differential transmitter 1118 transmits serial data via the DAT1 line 114.

The differential receiver 1117 receives serial data via the DAT0 113. The differential receiver 1119 receives serial data via the DAT1 114.

Specifically, in the full-duplex communication mode, the differential receiver 1117 and the differential transmitter 1118 are activated by being connected to the DAT0 line 113 and the DAT1 line 114, respectively. Suppose here that the master 100 transmits data (i.e., the slave 101 receives data), and that the full-duplex communication mode is switched to the half-duplex communication mode. In this case, the directional control unit 1108 controls the direction of communication such that the connection destination of the DAT1 line 114 is switched from the differential transmitter 1118 to the differential receiver 1119. Also, suppose that the master 100 receives data (i.e., the slave 101 transmits data) and that the full-duplex communication mode is switched to the half-duplex communication mode. In this case, the directional control unit 1108 controls the direction of communication such that the connection destination of the DAT0 line 113 is switched from the differential receiver 1117 to the differential transmitter 1116.

Note that switching between a differential receiver and a differential transmitter is realized by supplying or not supplying electric power from a power unit (not shown), as described in the section of the channel I/F unit 250. Therefore, a description thereof is omitted.

When the slave 101 includes the aforementioned components and, for example, the target 104 acts as a memory device, the following operations are possible. The transaction control unit 108 extracts an address and a transfer size from a command packet received from the master 100, and registers the address and the transfer size in the descriptor 1102. Subsequently, the descriptor 1102 prepares for access to the target memory device, with use of the transmission buffer 1104 and the reception buffer 1105. Upon completion of the preparation by the descriptor 1102, the packet generation unit 1103 generates a response packet, and transmits the response packet to the master 100. Then, the slave 101 switches the communication mode if necessary, and starts data communication afterwards.

1.4 Operations (1) Operations in the Communication System 10

Figure 13:
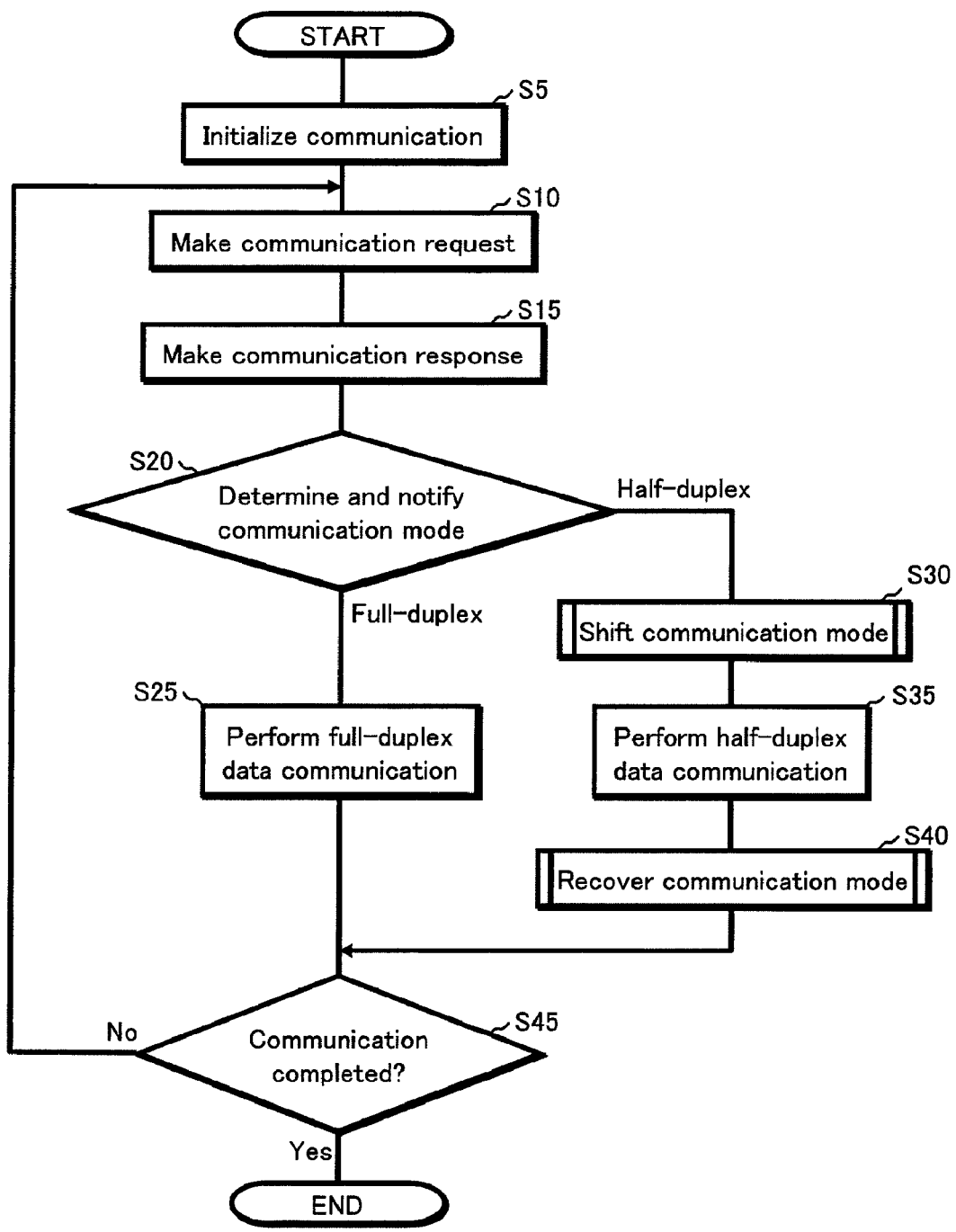
FIG. 13 is a flowchart showing a general outline of processing in the communication system 10.

The following describes overall operations in the communication system 10, with reference to the flowchart of FIG. 13.

First, in the communication system 10, communication between the master 100 and the slave 101 is initialized in a manner that the master 100 transmits/receives an I/O command to/from the slave 101 so as to share control information (e.g., the block size of a data packet) with the slave 101 (step 5). At this time, in the serial communication network 102 in the communication system 10, the DAT0 line 113 is set to a downlink from the master 100 to the slave 101, and the DAT1 line 114 is set to an uplink from the slave 101 to the master 100, thereby enabling communication in the full-duplex communication mode.

Subsequently, the master 100 makes a communication request by transmitting a command packet via the DAT0 line 113 (step S10). Upon receipt of the command packet, the slave 101 makes a communication response by transmitting a response packet via the DAT1 line 114 (step S15). In this way, a handshake using the command packet and the response packet is established between the master 100 and the slave 101. Here, each of the master 100 and the slave 101 generates a packet to be transmitted with use of the packet generation unit 203 (1103) and the link packet generation/analysis unit 207 (1107). Then, each of the master 100 and the slave 101 encodes the packet with use of the data input/output control unit 213 (1113) and transmits the packet to a device on the other end (i.e., the master 100 or the slave 101). Hereinafter, it is assumed that each of the master 100 and the slave 101 performs the aforementioned operations when transmitting a packet. Also, upon receipt of a packet from a device on the other end (i.e., the master 100 or the slave 101), each of the master 100 and the slave 101 performs a transmission error check with use of the link packet generation/analysis unit 207 (1107). After the transmission error check, the link packet generation/analysis unit 207 (1107) removes a CRC code, etc. from the received packet, and outputs only a necessary portion of the packet to the transaction control unit 107 (108). The transaction control unit 107 (108) analyses the content of the received packet, and performs processing based on a result of the analysis. Hereinafter, it is assumed that each of the master 100 and the slave 101 performs the aforementioned operations upon receipt of a packet.

The master 100 determines whether data communication is performed in the full-duplex communication mode or the half-duplex communication mode, and notifies the slave 101 of a mode that has been determined (step S20). Specifically, a communication mode is determined based on (i) the communication mode field in the argument portion of a command packet shown in FIG. 5 and (ii) the communication mode field in the argument portion of a response packet shown in FIG. 8. For example, suppose that the communication mode field of a command packet issued by the master 100 indicates either the full-duplex communication mode or the half-duplex communication mode. In this case, the master 100 determines the communication mode to be the one indicated in the communication mode field of the command packet. Also, suppose that the communication mode field of the command packet indicates an arbitrary mode. In this case, the master 100 determines the communication mode to be the one indicated in the communication mode field of a response packet issued by the slave 101. In a case where the communication mode is determined to be the half-duplex communication, the master 100 notifies the slave 101 of a directional control code (DIR) among the control codes shown in FIG. 11. In a case where the communication mode is determined to be the full-duplex communication, the master 100 notifies the slave 101 of an idle code (IDL) among the control codes. Note that in the present embodiment, the command packet and the response packet both include a communication mode field. Therefore, the communication mode shown by the command packet may be different from that shown by the response packet. Because of this reason, the master 100 needs to notify the slave 101 of the communication mode that has been determined and finalized. In the present embodiment, the master 100 transmits a directional control code when switching between communication modes is necessary, and transmits an idle code when the switching is not necessary. This enables the slave 101 to determine, based on a received control code (i.e., DIR or IDL), whether switching between communication modes is necessary, regardless of whether the communication modes in the communication mode fields are different or not.

When full-duplex communication is selected as a communication mode ("full-duplex" in step S20), data communication is performed in full-duplex communication in the communication system 10 (step S25). Subsequently, judgement is performed as to whether or not communication of target data has been completed (step S45). When it is judged that the data communication has not been completed ("No" in step S45), the processing returns to step S10. When it is judged that the data communication has been completed ("Yes" in step S45), the processing ends.

When half-duplex communication is selected as a communication mode ("half-duplex" in step S20), the master 100 and the slave 101 perform processing for switching (shifting) the communication mode from the full-duplex communication mode to the half-duplex communication mode (step S30). Upon completion of the switching from the full-duplex communication mode to the half-duplex communication mode, the master 100 and the slave 101 perform data communication in the half-duplex communication mode (step S35). When target data is transmitted in step S35, recovery processing of the communication mode, namely switching of the communication mode from the half-duplex communication mode to the full-duplex communication mode is performed in the communication system 10 (step S40). Subsequently, step S45 is performed.

(2) Notification Processing of Communication Mode

The following describes the processing steps of notifying a communication mode performed in step S20 in FIG. 13. Here, the processing steps of the master 100 are described with reference to the flowchart of FIG. 14A, and the processing steps of the slave 101 are described with reference to the flowchart of FIG. 14B.

Figure 14A:
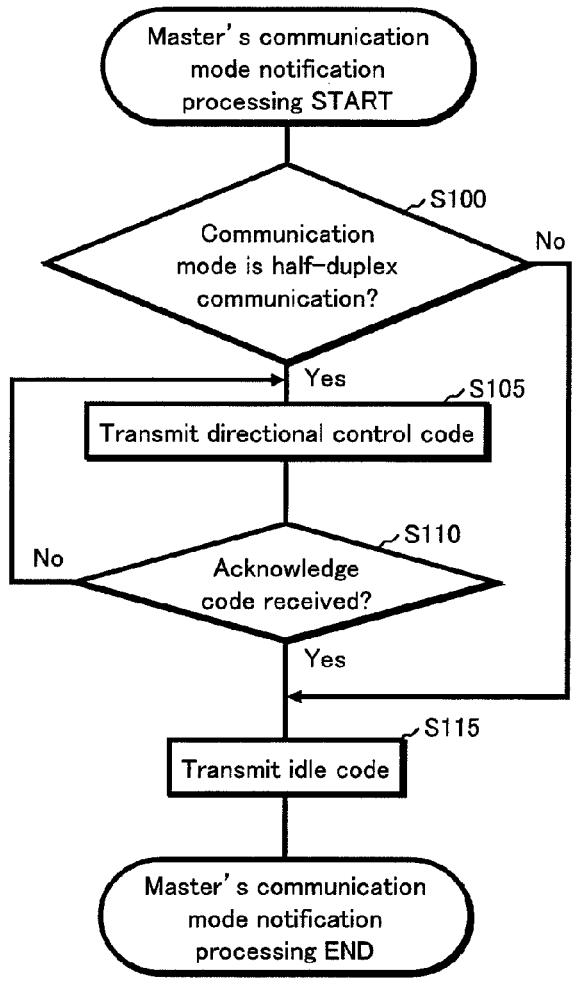
FIG. 14A is a flowchart showing communication mode notification processing performed by a master 100.

FIG. 14A is a flowchart showing the processing flow of the master 100.

The master 100 judges whether or not the determined communication mode is the half-duplex communication mode (step S100).

When judging that it is the half-duplex communication mode ("Yes" in step S100), the master 100 transmits a directional control code (DIR) to the slave 101 via the DAT0 line 113 (step S105). Then, the master 100 judges whether or not an acknowledge code (ACK) is received (step S110). When judging that an acknowledge code is received ("Yes" in step S110), the master 100 transmits an idle code (IDL) to the slave 101 via the DAT0 line 113 (step S115). When judging that an acknowledge code is not received ("No" in step S110), the master 100 continues to transmit a directional control code until the master 100 receives an acknowledge code. Here, in the case of transmitting a K code such as a directional control code or an acknowledge code, each of the master 100 and the slave 101 generates a K code to be transmitted with use of the code generation unit 228 (1127, see FIG. 12), encodes the K code with use of the coding unit 224 (1123, see FIG. 12), and transmits the encoded K code to a device on the other end (i.e., the master 100 or the slave 101). Also, upon receipt of data including a K code from a device on the other end (i.e., the master 100 or the slave 101), each of the master 100 and the slave 101 detects the K code with use of the code detection unit 229 (1128, see FIG. 12) of the decoding unit 229 (1124, see FIG. 12). Hereinafter, it is assumed that each of the master 100 and the slave 101 performs the aforementioned operations when transmitting and receiving a K code.

When judging that it is not the half-duplex communication mode ("No" in step S100), the master 100 transmits an idle code (IDL) to the slave 101 via the DAT0 line 113 (step S115).

Figure 14B:
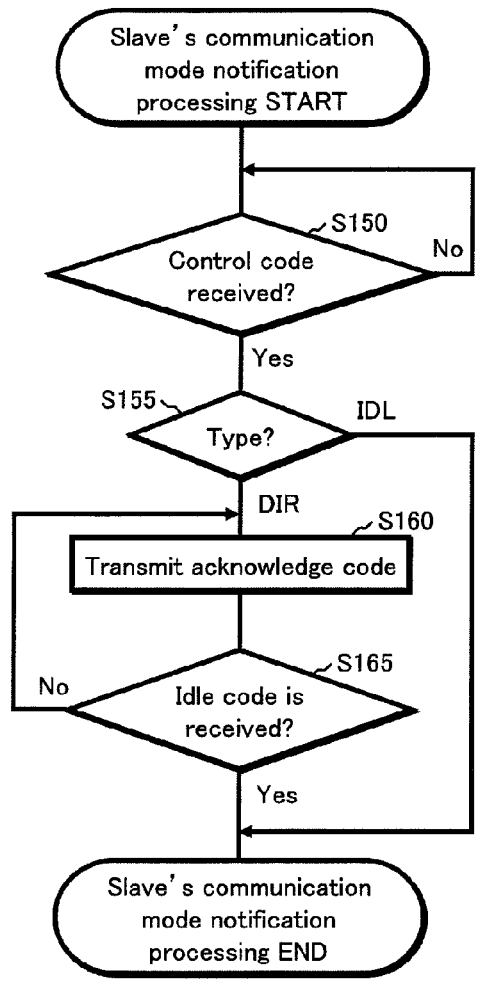
FIG. 14B is a flowchart showing communication mode notification processing performed by a slave 101.

FIG. 14B is a flowchart showing the processing flow of the slave 101.

The slave 101 judges whether or not a control code is received (step S150).

When judging that a control code is not received ("No" in step S150), the slave 101 continues to perform the judgment in step S150 until the slave 101 receives a control code.

When judging that a control code is received ("Yes" in step S150), the slave 101 judges the type of the control code (step S155).

When the received control code is a directional control code (DIR) ("DIR" in step S155), the slave 101 transmits an acknowledge code to the master 100 (step S160). Then, the slave 101 judges whether or not an idle code is received (step S165).

When judging that an idle code is received ("Yes" in step S165), the slave 101 ends the processing. When judging that an idle code is not received ("No" in step S165), the slave 101 continues to transmit an acknowledge code until the slave 101 receives an idle code.

When the control code received in step S150 is an idle code (IDL) ("IDL" in step S155), the slave 101 ends the processing.

In the aforementioned processing, a handshake using the control codes (directional control code and acknowledge code) in the link layer is established, enabling an instruction of switching to be given without fail.

(Data Communication in Full-Duplex Communication)

The following describes data communication in the full-duplex communication mode, with use of a specific example.

Figure 15:
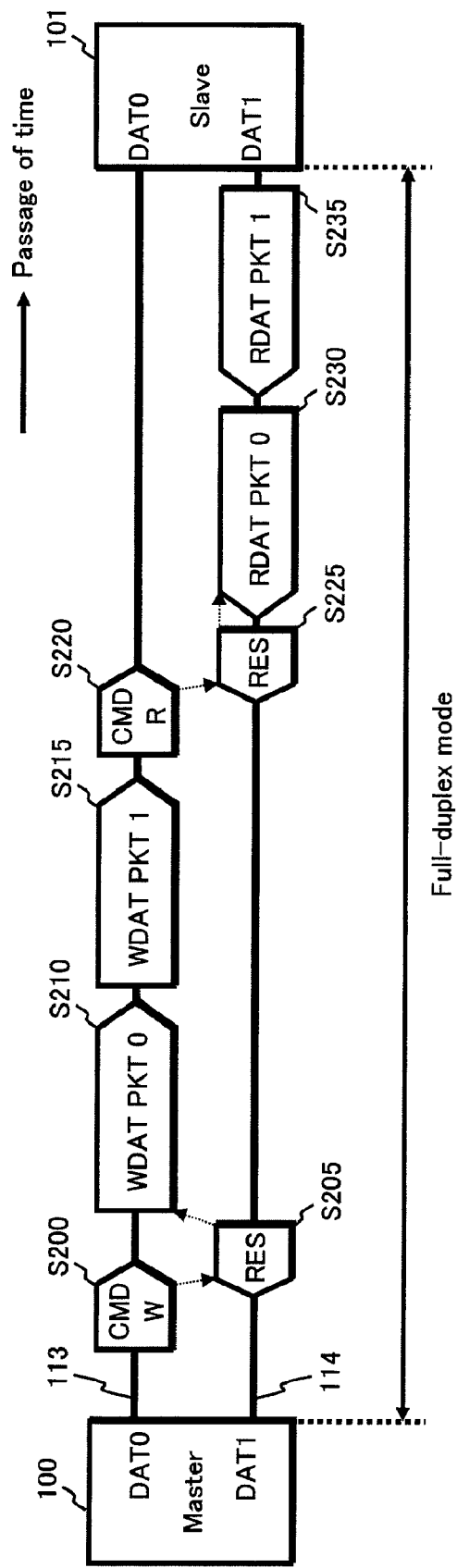
FIG. 15 is a flowchart showing a specific example of data communication in full-duplex communication.

As shown in FIG. 15, in data communication in the full-duplex communication mode, the master 100 and the slave 101 are connected to each other via the DAT0 line 113 in a downlink state and the DAT1 line 114 in an uplink state.

The master 100 transmits, to the slave 101, a transmission command packet indicating that the communication mode is set to the full-duplex communication mode (step S200). The slave 101 transmits a response packet to the master 100 when ready to receive data packets (step S205).

Upon receipt of the response packet, the master 100 transmits data packets (WDAT PKT 0 and WDAT PKT 1) by only using the DAT0 line 113 in a downlink state (steps S210 and S215). Provided that the block size of a data packet that is shared in the communication initialization in step S5 of FIG. 13 is 512 bytes, and a transfer size specified by the transmission command packet is 1K byte, two transmission data packets are transmitted.

Similarly, the master 100 transmits, to the slave 101, a reception command packet indicating that the communication mode is set to the full-duplex communication mode (step S220). The slave 101 transmits a response packet to the master 100 when ready to transmit data packets (step S225). Then, the master 100 receives data packets (RDAT PKT 0 and RDAT PKT 1) by only using the DAT1 line 114 in an uplink state (steps S230 and S235).

(Data Communication in Half-Duplex Communication Mode)

Figure 16:
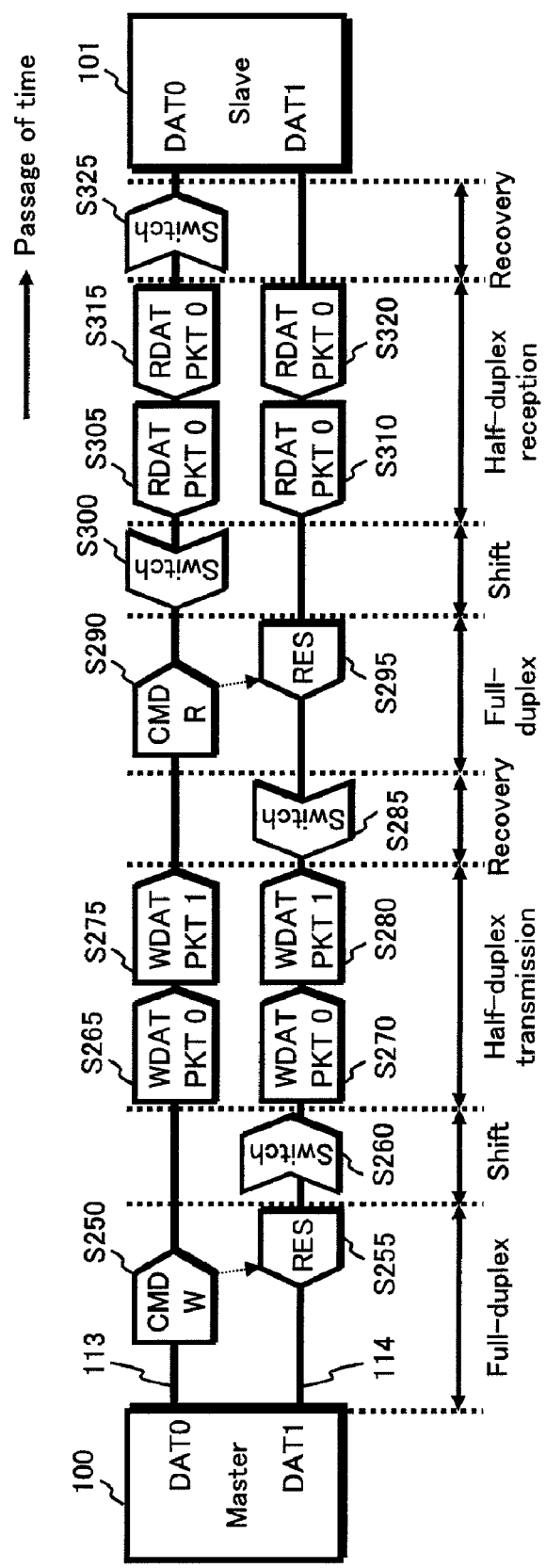
FIG. 16 is a flowchart showing a specific example of half-duplex communication including the shift and recovery of communication modes.

When the communication mode is set to the half-duplex communication mode in step S20 in FIG. 13, step S30 is performed so as to switch (shift) from the full-duplex communication mode to the half-duplex communication mode. Then, in step S35, data communication is performed in the half-duplex communication mode. When the half-duplex communication is completed, the communication mode is recovered, namely switched from the half-duplex communication mode back to the full-duplex communication mode in step S40. The following describes a specific example of half-duplex communication including the aforementioned shifting (i.e., full-duplex to half-duplex) and recovery (i.e., half-duplex to full-duplex) of the communication mode, with reference to FIG. 16.

First, the master 100 transmits, to the slave 101, a transmission command packet whose communication mode field indicates either the half-duplex communication mode or the arbitrary mode (step S250). The slave 101 transmits, to the master 100, a response packet whose mode field indicates the half-duplex communication mode, when ready to receive data packets in the half-duplex communication mode (step S255).

The master 100 and the slave 101 switch from the full-duplex communication mode to the half-duplex communication mode, by the handshake of a directional control code (DIR) and an acknowledge code (ACK) (step S260). In this case, switching is performed such that the DAT1 line 114 is switched from an uplink state to a downlink state.

Upon completion of the switching, the master 100 uses the two channels in a downlink state to transmit data packets (WDAT PKTs 0 and 1) in the half-duplex communication mode (steps S265 to S280). For example, the master 100 transmits even bytes via the DAT0 line 113 and odd bytes via the DAT1 114.

When the master 100 completes the transmission of data having a transfer size specified by the transmission command packet transmitted in step S250, the master 100 and the slave 101 switches the DAT1 line 114 from a downlink state to an uplink state, so as to return to the full-duplex communication mode (step S285).

Similarly, in a case where the master 100 receives data packets in the half-duplex communication mode, a handshake is performed by transmitting and receiving a command packet and a response packet (steps S290 and S295).

The master 100 and the slave 101 switch from the full-duplex communication mode to the half-duplex communication mode, by the handshake of a directional control code (DIR) and an acknowledge code (ACK) (step S300). In this case, switching is performed such that the DAT0 line 113 is switched from a downlink state to an uplink state.

Then, the master 100 receives data packets (RDAT PKTs 0 and 1) in half-duplex communication (steps S305 to S320). Subsequently, the DAT0 line 113 in an uplink state is switched to a downlink state so as to return to the full-duplex communication mode (step S325).

(3) Shift Processing of Communication Mode

The following describes the processing steps of shifting the communication mode performed in step S30 in FIG. 13. Here, the processing steps of the master 100 are described with reference to FIG. 17, and the processing steps of the slave 101 are described with reference to FIG. 18.

(Operation of Master 100)

Figure 17:
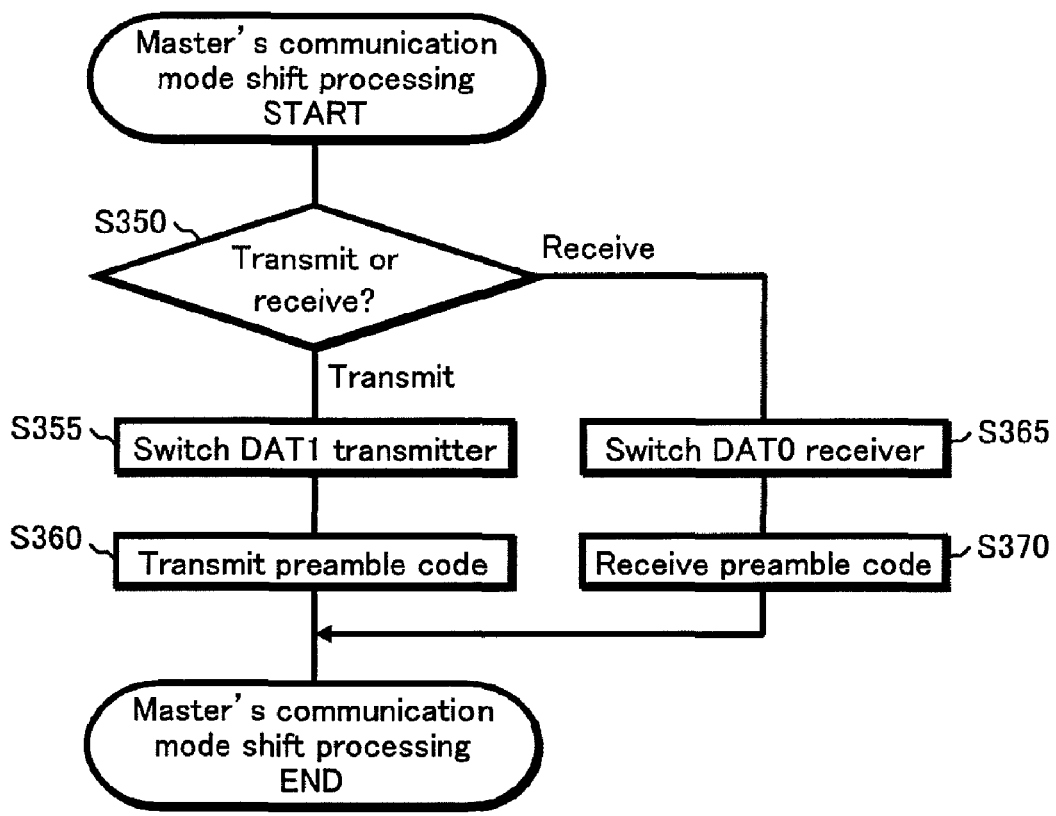
FIG. 17 is a flowchart showing communication mode shift processing performed by the master 100.

FIG. 17 is a flowchart showing the processing flow of the master 100.

Upon completion of the notification of the communication mode (notification that the communication mode is half-duplex communication), the master 100 judges whether to transmit or receive data (step S350). Specifically, the directional control unit 208 of the master 100 makes a judgment based on the type indicated by the R/W 412 (see FIG. 4) included in the transmitted command packet.

When judging that the master 100 transmits data, namely when the R/W 412 in the command packet indicates "Write" ("transmission" in step S350), the directional control unit 208 in the master 100 deactivates the differential receiver 220 that is currently active, and activates the differential transmitter 219 that is currently inactive, so as to cause the DAT1 line 114 to be in a downlink state (step S355). This causes the channel I/F unit 250 to transmit data via the DAT1 line 114 instead of receiving data. Subsequently, the master 100 transmits a preamble code (PRE) via the DAT1 line 114 to the slave 101, and thereafter performs bit synchronization and the extraction of a high-speed clock signal so as to enable communication (step S360).

When judging that the master 100 receives data, namely when the R/W 412 in the command packet indicates "Read" ("reception" in step S350), the directional control unit 208 in the master 100 deactivates the differential transmitter 217 that is currently active, and activates the differential receiver 218 that is currently inactive, so as to cause the DAT0 line 113 to be in an uplink state (step S365). This causes the channel I/F unit 250 to receive data via the DAT0 line 113 instead of transmitting data. Subsequently, the master 100 receives a preamble code (PRE) via the DAT0 line 113 from the slave 101, and thereafter performs bit synchronization and the extraction of a high-speed clock signal so as to enable communication (step S370).

(Operation of Slave 101)

Figure 18:
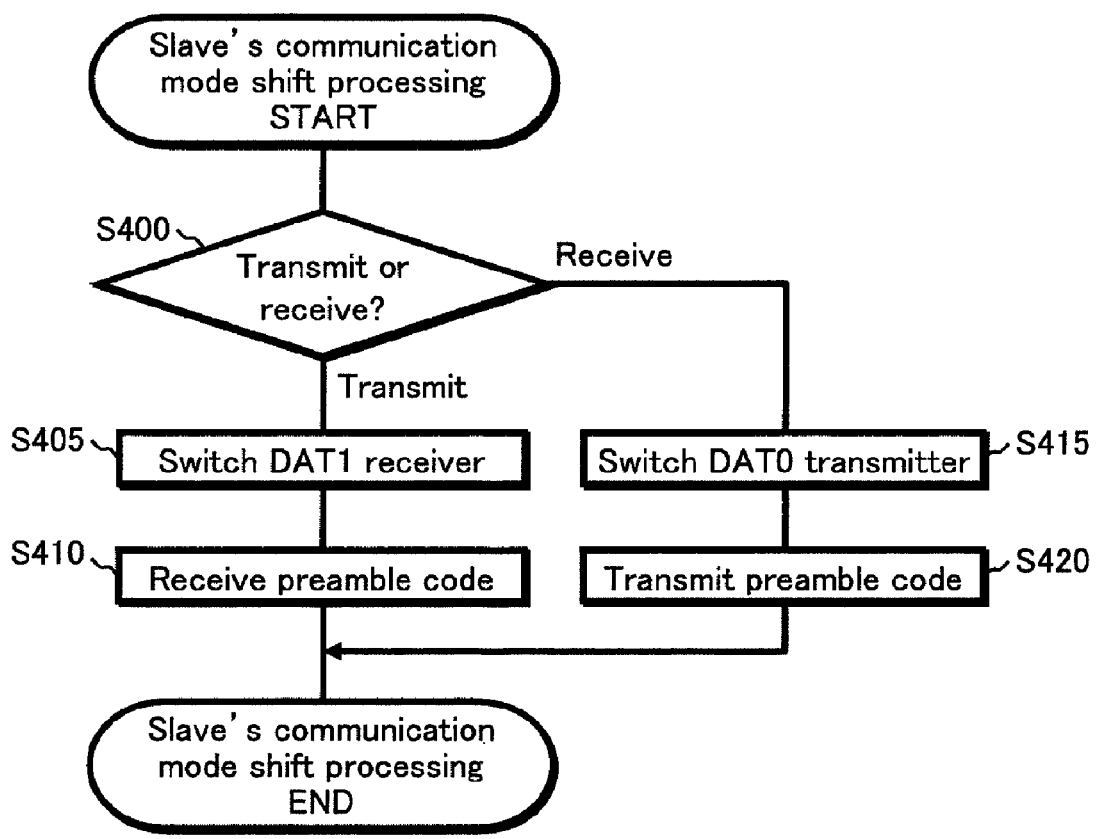
FIG. 18 is a flowchart showing communication mode shift processing performed by the slave 101.

FIG. 18 is a flowchart showing the processing flow of the slave 101.

Upon receipt of the notification of the communication mode (notification that the communication mode is half-duplex communication), the slave 101 judges whether to transmit or receive data (step S400). Specifically, the directional control unit 1108 of the slave 101 makes a judgment based on the type indicated by the R/W 412 (see FIG. 4) included in the received command packet.

When judging that the slave 101 receives data, namely when the R/W 412 in the received command packet indicates "Write" ("reception" in step S400), the directional control unit 1108 in the slave 101 deactivates the differential transmitter 1118 that is currently active, and activates the differential receiver 1119 that is currently inactive, so as to cause the DAT1 line 114 to be in a downlink state (step S405). This causes the channel I/F unit 1150 to receive data via the DAT1 line 114 instead of transmitting data. Subsequently, the slave 101 receives a preamble code (PRE) via the DAT1 line 114 from the master 100, and thereafter performs bit synchronization and the extraction of a high-speed clock signal so as to enable communication (step S410).

When judging that the slave 101 transmits data, namely when the R/W 412 in the received command packet indicates "Read" ("transmission" in step S400), the directional control unit 1108 in the slave 101 deactivates the differential receiver 1117 that is currently active, and activates the differential transmitter 1116 that is currently inactive, so as to cause the DAT0 line 113 to be in an uplink state (step S415). This causes the channel I/F unit 1150 to transmit data via the DAT0 line 113 instead of receiving data. Subsequently, the slave 101 transmits a preamble code (PRE) via the DAT0 line 113 to the master 100, and thereafter performs bit synchronization and the extraction of a high-speed clock signal so as to enable communication (step S420).

(Switching from Full-Duplex Communication to Half-Duplex Communication)

Figure 19:
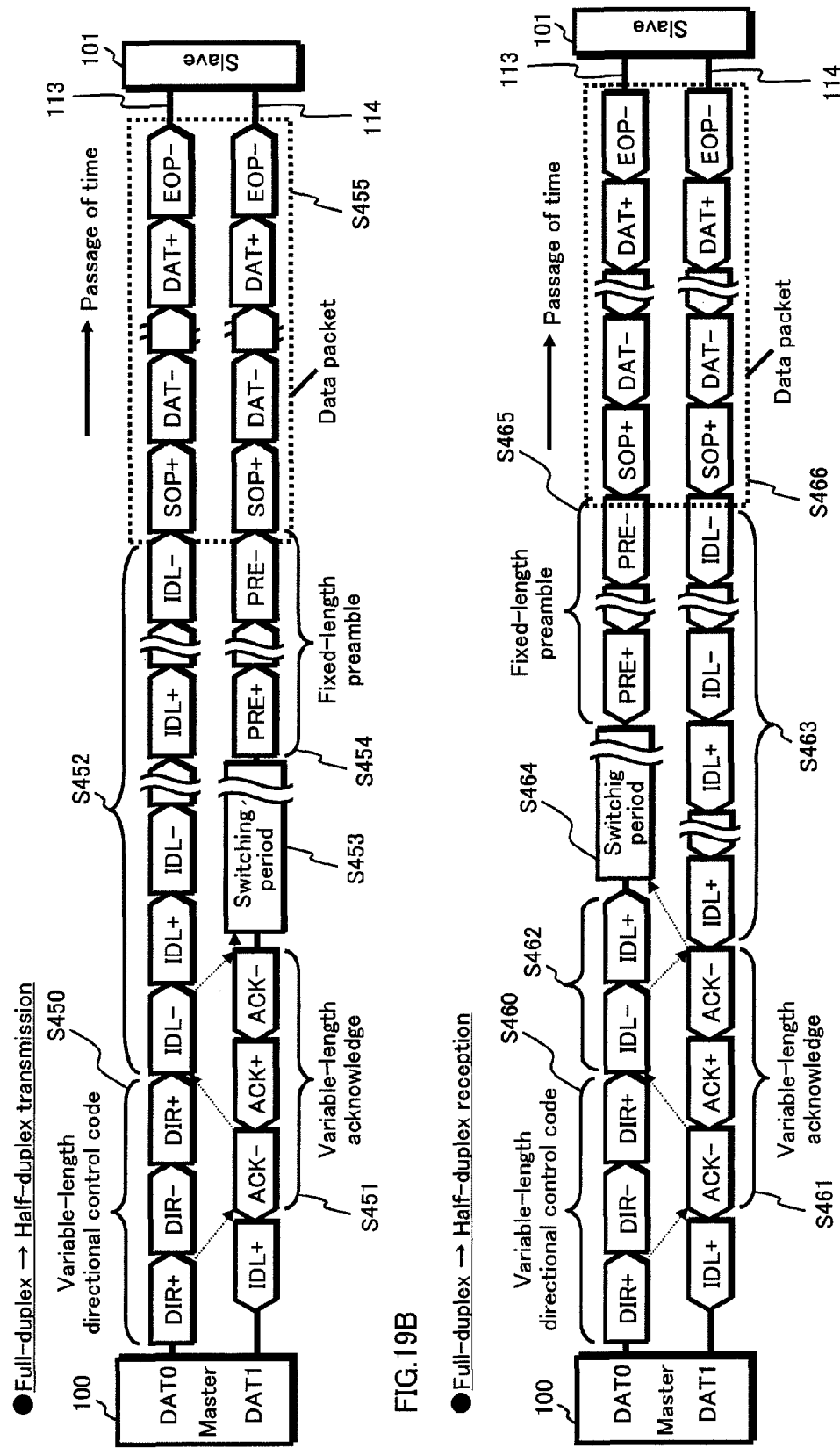
FIG. 19A shows the flow of transmission and reception of a control code, in a case where the master 100 is on a data transmitting end and full-duplex communication is switched to half-duplex communication.
FIG. 19B shows the flow of transmission and reception of a control code, in a case where the master 100 is on a data receiving end and full-duplex communication is switched to half-duplex communication.

FIG. 19A shows in detail the transmission and reception of a control code in a case where the full-duplex communication mode is switched to the half-duplex communication mode and the master 100 is on a data transmitting end.

The master 100 transmits a directional control code (DIR) to the slave 101 via the DAT0 line 113 so as to instruct the slave 101 to switch from the full-duplex communication mode to the half-duplex communication mode. At this time, the master 100 continues to transmit the directional control code until the master 100 receives, from the slave 101, an acknowledge code (ACK) via the DAT1 line 114 in response to the directional control code (step S450).

Upon receipt of the directional control code from the master 100 via the DAT0 line 113, the slave 101 transmits an acknowledge code to the master 100 via the DAT1 line 114. At this time, the slave 101 continues to transmit the acknowledge code until the slave 101 receives, from the master 100, an idle code (IDL) via the DAT0 line 113 in response to the acknowledge code (step S451).

Upon receipt of the acknowledge code from the slave 101 via the DAT1 line 114, the master 100 transmits an idle code to the slave 101 via the DAT0 line 113. The master 100 continues to transmit the idle code until the synchronization with the DAT1 line 114 is completed (step S452).

Upon start of the transmission of the idle code, the master 100 switches the connection of the DAT1 line 114 to the channel I/F unit 250, as shown in step S355 in FIG. 17, and, upon receipt of the idle code, the slave 101 switches the connection of the DAT1 line 114 to the channel I/F unit 1150, as shown in step 405 in FIG. 18 (step S453).

Upon completion of the switching of the connection of the DAT1 line 114, the master 100 transmits a preamble code (PRE) to the slave 101 via the DAT1 line 114. The master 100 continues to transmit the preamble code until the synchronization with the DAT0 line 113 is completed (step S454).

Upon completion of the synchronization, the master 100 and the slave 101 perform the transmission and reception of data packets in the half-duplex communication mode (step S455).

Here, the transmission and reception of the preamble code is performed for a fixed length of time, so that bit synchronization is securely performed between the master 100 and the slave 101. Upon completion of the transmission and reception of the preamble code, the transmission and reception of target data is performed. Here, each data packet of the data is provided with (i) a start-of-packet code (SOP) which is provided at the start of each data packet, and (ii) an end-of-packet code (EOP) which is provided at the end of each data packet. Note that control codes such as an idle code (IDL), a start-of-packet code and an end-of-packet code (SOP and EOP) are generated in the link control units 206 and 1106.

FIG. 19B shows in detail the transmission and reception of a control code in a case where the full-duplex communication mode is switched to the half-duplex communication mode and the master 100 is on a data receiving end.

The master 100 transmits a directional control code (DIR) to the slave 101 via the DAT0 line 113 so as to instruct the slave 101 to switch from the full-duplex communication mode to the half-duplex communication mode. At this time, the master 100 continues to transmit the directional control code until the master 100 receives, from the slave 101, an acknowledge code (ACK) via the DAT1 line 114 (step S460).

Upon receipt of the directional control code from the master 100 via the DAT0 line 113, the slave 101 transmits an acknowledge code to the master 100 via the DAT1 line 114. At this time, the slave 101 continues to transmit the acknowledge code until the slave 101 receives, from the master 100, an idle code (IDL) via the DAT0 line 113 (step S461).

Upon receipt of the acknowledge code from the slave 101 via the DAT1 line 114, the master 100 transmits an idle code to the slave 101 via the DAT0 line 113. At this time, the master 100 continues to transmit the idle code until the master 100 receives an idle code from the slave 101 via the DAT1 line 114 (step S462).

Upon receipt of the idle code from the master 100 in response to the acknowledge code, the slave 101 transmits an idle code. The slave 101 continues to transmit the idle code until the synchronization with the DAT0 line 113 is completed (step S463).

Upon receipt of the idle code from the slave 101, the master 100 switches the connection of the DAT0 line 113 to the channel I/F unit 250, as shown in step S365 in FIG. 17. Upon start of the transmission of the idle code, the slave 101 switches the connection of the DAT0 line 113 with respect to the channel I/F unit 1150, as shown in step 415 in FIG. 18 (step S464).

Upon completion of the switching of the connection of the DAT0 line 113, the slave 101 transmits a preamble code (PRE) to the master 100 via the DAT0 line 113. The slave 101 continues to transmit the preamble code until the synchronization with the DAT1 line 114 is completed (step S465). Here, the transmission and reception of the preamble code is performed for a fixed length of time in the same manner as above.

Upon completion of the synchronization, the master 100 and the slave 101 perform the transmission and reception of data packets in the half-duplex communication mode (step S466).

Here, in FIGS. 19A and 19B, a handshake as shown in FIG. 14 is performed with use of the directional control code (DIR) and the acknowledge code. Therefore, each of the directional control code and the acknowledge code has a variable length whose disparity is the repetition of the positive and negative K codes until the handshake is established. Note that a channel not targeted for a directional control is filled with idle codes (IDL).

(4) Recovery Processing of Communication Mode

The following describes the processing steps of recovering the communication mode performed in step S40 in FIG. 13. Here, the processing steps of the master 100 are described with reference to FIG. 20, and the processing steps of the slave 101 are described with reference to FIG. 21.

(Operation of Master 100)

Figure 20:
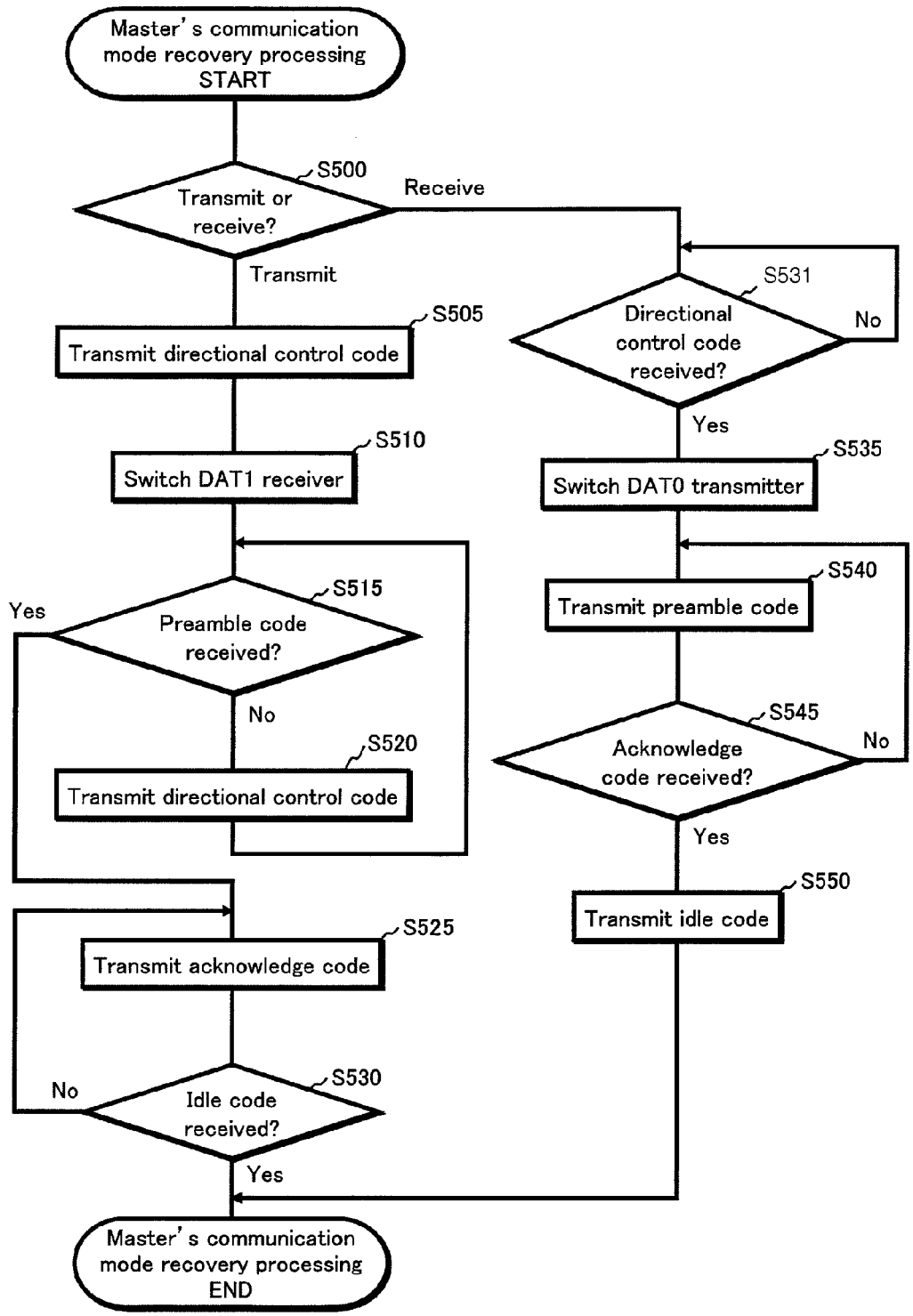
FIG. 20 is a flowchart showing communication mode recovery processing performed by the master 100.

FIG. 20 is a flowchart showing the processing flow of the master 100.

Upon completion of the communication of the target data, the master 100 judges whether the master 100 is on a data transmitting end or a data receiving end (step S500). Specifically, the directional control unit 208 of the master 100 makes a judgment based on the type indicated by the R/W 412 (see FIG. 4) in the command packet which is transmitted at the time of a communication request.

When judging that the master 100 is on a data transmitting end ("transmit" in step S500), the master 100 transmits a directional control code (DIR) to the slave 101 via the DAT0 line 113 (step S505). Subsequently, the directional control unit 208 in the master 100 deactivates the differential transmitter 219 that is currently active, and activates the differential receiver 220 that is currently inactive, so as to cause the DAT1 line 114 to be in an uplink state (step S510). This causes the channel I/F unit 250 to receive data via the DAT1 line 114 instead of transmitting data.

The master 100 judges whether or not a preamble code is received from the slave 101 via the DAT1 line 114 (step S515).

When judging that a preamble code is not received ("No" in step S515), the master 100 transmits a directional control code to the slave 101 via the DAT0 line 113 (step S520), and returns to step S515 of the processing. In other words, the master 100 continues to transmit a directional control code until the master 100 receives a preamble code. Note that the master 100 continues to transmit a directional control code and performs the switching of the DAT1 receiver in step S510 in parallel.

When judging that a preamble code is received ("Yes" in step S515), the master 100 transmits an acknowledge code (ACK) to the slave 101 via the DAT0 line 113 (step S525).

The master 100 judges whether or not an idle code (IDL) is received from the slave 101 via the DAT1 line 114 (step S530).

When judging that an idle code is not received ("No" in step S530), the master 100 returns to step S525 of the processing. In other words, the master 100 continues to transmit an acknowledge code until the master 100 receives an idle code.

When judging that an idle code is received ("Yes" in step 530), the master 100 ends the processing.

When judging that the master 100 is on a data receiving end ("receive" in step S500), the master 100 judges whether or not a directional control code is received from the slave 101 via the DAT1 line 114 (step S531).

When judging that a directional control code is not received ("No" in step S531), the processing returns to step S531.

When judging that a directional control code is received ("Yes" in step S531), the directional control unit 208 in the master 100 deactivates the differential receiver 218 that is currently active, and activates the transmitter 217 that is currently inactive, so as to cause the DAT0 line 113 to be in a downlink state (step S535). This causes the channel I/F unit 250 to transmit data via the DAT0 line 113 instead of receiving data.

The master 100 transmits a preamble code to the slave 101 via the DAT0 line 113 (step S540).

The master 100 judges whether or not an acknowledge code is received from the slave 101 via the DAT1 line 114 (step S545).

When judging that an acknowledge code is not received ("No" in step S545), the master 100 returns to step S540 of the processing. In other words, the master 100 continues to transmit a preamble code until the master 100 receives an acknowledge code.

When judging that the acknowledge code is received ("Yes" in step S545), the master 100 transmits the idle code (IDL) to the slave 101 via the DAT0 line 113 (step S550).

(Operation of Slave 101)

Figure 21:
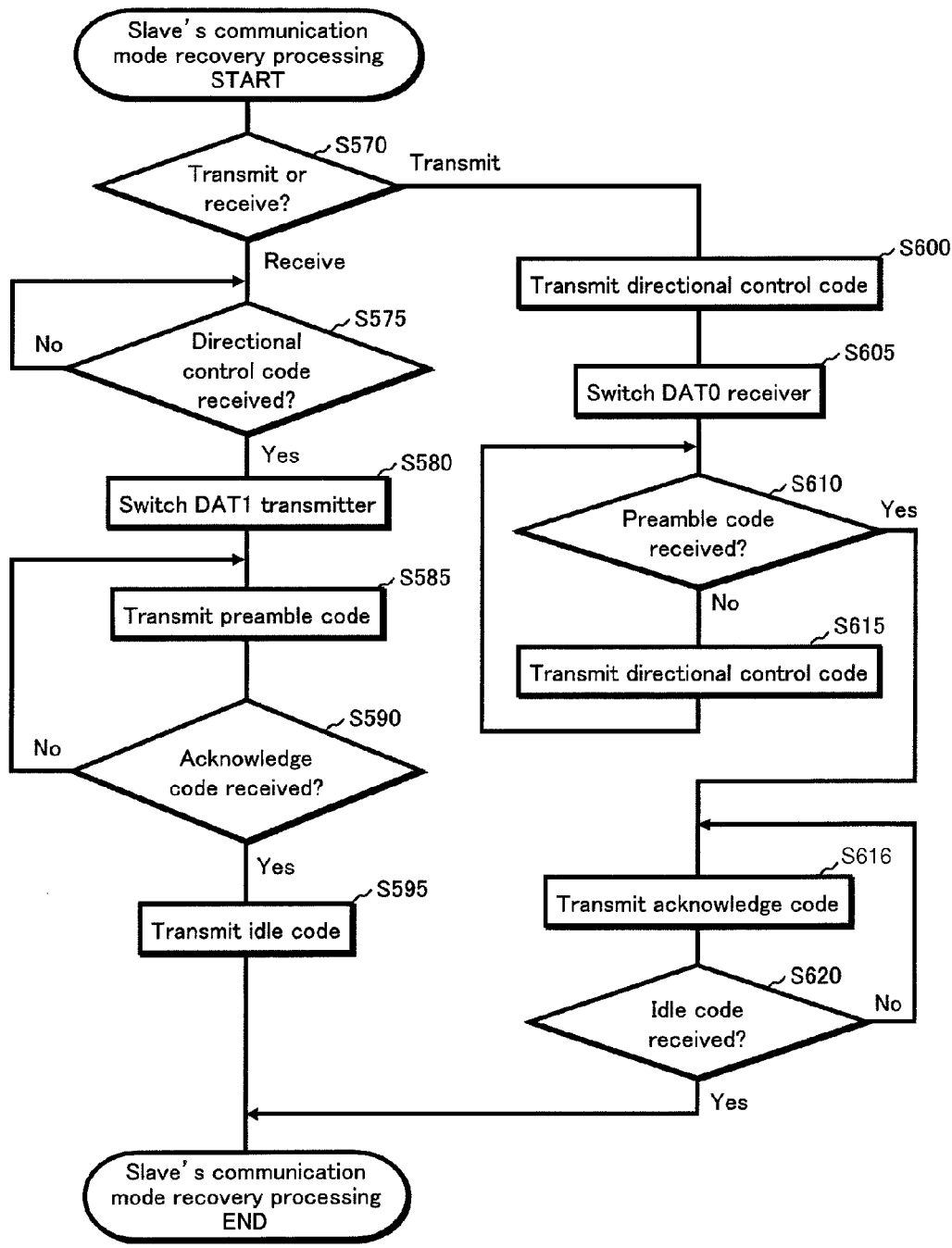
FIG. 21 is a flowchart showing communication mode recovery processing performed by the slave 101.

FIG. 21 is a flowchart showing the processing flow of the slave 101.

Upon completion of the communication of the target data, the slave 101 judges whether the slave 101 is on a data transmitting end or a data receiving end (step S570). Specifically, the slave 101 makes a judgment based on the type indicated by the R/W 412 (see FIG. 4) in the command packet which is received at the time of a communication request.

When judging that the slave 101 is on a data receiving end ("receive" in step S570), the slave 101 judges whether or not the directional control code is received from the master 100 via the DAT0 line 113 (step S575).

When judging that a directional control code is not received ("No" in step S575), the processing returns to step S575.

When judging that the directional control code is received ("Yes" in step S575), the directional control unit 1108 in the slave 101 deactivates the differential receiver 1119 that is currently active, and activates the transmitter 1118 that is currently inactive, so as to cause the DAT1 line 114 to be in an uplink state (step S580). This causes the channel I/F unit 1150 to transmit data via the DAT1 line 114 instead of receiving data.

The slave 101 transmits a preamble code to the master 100 via the DAT1 line 114 (step S585).

The slave 101 judges whether or not an acknowledge code is received from the master 100 via the DAT0 line 113 (step S590).

When judging that an acknowledge code is not received ("No" in step S590), the slave 101 returns to step S585 of the processing. In other words, the slave 101 continues to transmit a preamble code until the slave 101 receives an acknowledge code.

When judging that an acknowledge code is received ("Yes" in step S590), the slave 101 transmits an idle code (IDL) to the master 100 via the DAT1 line 114 (step S595).

When judging that the slave 101 is on a data transmitting end ("transmit" in step S570), the slave 101 transmits a directional control code (DIR) to the master 100 via the DAT1 line 114 (step S600). Subsequently, the directional control unit 1108 in the slave 101 deactivates the differential transmitter 1116 that is currently active, and activates the differential receiver 1117 that is currently inactive, so as to cause the DAT0 line 113 to be in a downlink state (step S605). This causes the channel I/F unit 1150 to receive data via the DAT0 line 113 instead of transmitting data.

The slave 101 judges whether or not a preamble code is received from the master 100 via the DAT0 line 113 (step S610).

When judging that a preamble code is not received ("No" in step S610), the slave 101 transmits a directional control code to the master 100 via the DAT1 line 114 (step S615), and returns to step S610 of the processing. In other words, the slave 101 continues to transmit a directional control code until the slave 101 receives a preamble code. Note that the slave 101 continues to transmit a directional control code and performs the switching of the DAT0 receiver in step S605 in parallel.

When judging that a preamble code is received ("Yes" in step S610), the slave 101 transmits an acknowledge code (ACK) to the master 100 via the DAT1 line 114 (step S161).

The slave 101 judges whether or not an idle code (IDL) is received from the master 100 via the DAT0 line 113 (step S620).

When judging that an idle code is not received ("No" in step S620), the slave 101 returns to step S616 of the processing. In other words, the slave 101 continues to transmit an acknowledge code until the slave 101 receives an idle code.

When judging that an idle code is received ("Yes" in step 620), the slave 101 ends the processing.

(Switching from Half-Duplex Communication to Full-Duplex Communication)

FIG. 22A shows in detail the transmission and reception of a control code, in a case where the master 100 is on a data transmitting end and the half-duplex communication is switched to the full-duplex communication.

The master 100 transmits a directional control code (DIR) to the slave 101 via the DAT0 line 113, so as to instruct switching from the half-duplex communication to the full-duplex communication. At this time, the master 100 continues to transmit the directional control code until the master 100 receives a preamble code (PRE) from the slave 101 via the DAT1 line 114 in response to the directional control code (step S650).

Upon transmission of a directional control code, the master 100 switches the connection of the DAT1 line 114 to the channel I/F unit 250, as shown in step S510 in FIG. 20. Upon receipt of a directional control code from the master 100 via the DAT0 line 113, the slave 101 switches the connection of the DAT1 line 114 to the channel I/F unit 1150, as shown in step S580 in FIG. 21 (step S651).

Upon completion of the switching of the connection of the DAT1 line 114, the slave 101 transmits a preamble code to the master 100 via the DAT1 line 114. At this time, the slave 101 continues to transmit the preamble code until the slave 101 receives an acknowledge code (ACK) in response to the preamble code (step S652).

Upon receipt of a preamble code from the slave 101 via the DAT1 line 114, the master 100 transmits an acknowledge code to the slave 101 via the DAT0 line 113. At this time, the master 100 continues to transmit the acknowledge code until the master 100 receives an idle code (IDL) in response to the acknowledge code (step S653).

Upon receipt of an acknowledge code, the slave 101 transmits an idle code to the master 100 via the DAT1 line 114 (step S654).

FIG. 22B shows in detail the transmission and reception of a control code, in a case where the master 100 is on a data receiving end and the half-duplex communication is switched to the full-duplex communication.

The slave 101 transmits a directional control code (DIR) to the master 100 via the DAT1 line 114, so as to instruct switching from the half-duplex communication to the full-duplex communication. At this time, the slave 101 continues to transmit the directional control code until the slave 101 receives a preamble code (PRE) from the master 100 via the DAT0 line 113 in response to the directional control code (step S660).

Upon transmission of a directional control code, the slave 101 switches the connection of the DAT0 line 113 to the channel I/F unit 1150, as shown in step S605 in FIG. 21. Upon receipt of a directional control code from the slave 101 via the DAT1 line 114, the master 100 switches the connection of the DAT0 line 113 to the channel I/F unit 250, as shown in step S535 in FIG. 20 (step S661).

Upon completion of the switching of the connection of the DAT0 line 113, the master 100 transmits a preamble code to the slave 101 via the DAT0 line 113. At this time, the master 100 continues to transmit the preamble code until the master 100 receives an acknowledge code (ACK) in response to the preamble code (step S662).

Upon receipt of a preamble code from the master 100 via the DAT0 line 113, the slave 101 transmits an acknowledge code to the master 100 via the DAT1 line 114. At this time, the slave 101 continues to transmit the acknowledge code until the slave 101 receives an idle code (IDL) in response to the acknowledge code (step S663).

Upon receipt of an acknowledge code, the master 100 transmits an idle code to the slave 101 via the DAT0 line 113 (step S664).

Here, it can be known from FIGS. 22A and 22B that (i) a handshake using a directional control code (DIR) and a preamble code (PRE) and (ii) a handshake using the preamble code and an acknowledge code (ACK) are continuously performed.

Here, a communication device on a data receiving end, such as the slave 101 in FIG. 22A or the master 100 in FIG. 22B, stores the number of times a preamble code has been transmitted (hereinafter, "number of transmissions of a preamble code") from the start of the transmission of the preamble code to the receipt of an acknowledge code. In this way, when the communication mode is shifted thereafter, the transmission of a preamble code (see step S360 in FIG. 17, and step S410 in FIG. 18) is performed for the same number of times as the aforementioned number of transmissions to realize the actual establishment of bit synchronization. In other words, by setting a fixed-length period to a period in which the preamble code is transmitted for the stored number of transmissions, the length of the fixed-length period is appropriately set.

Furthermore, the number of transmissions of a preamble code indicates the overhead of a directional control.

Therefore, if the number of transmissions of a preamble code is too large as compared to the transfer size included in a command packet, the half-duplex communication mode may not be selected in a processing step for determining a communication mode. Note that, in the case of recovering to the full-duplex communication mode after the transmission and reception of data having the transfer size in the command packet, the recovery to the full-duplex communication mode starts upon completion of the transmission and reception of the last packet of the data.

Therefore, the transmission and reception of a directional control code in FIGS. 20 and 21 is not always necessary. However, if, for example, a communication device on a data receiving end receives a series of data packets in the half-duplex communication mode, the communication device may suffer from an overflow of a reception buffer or a CRC error. In such a case, a communication device on a data transmitting end may temporarily recover to the full-duplex communication mode after completing the transmission of data packets, so as to receive a state notification (i.e., interrupt) from the communication device on a data receiving end. In this case, the communication device on a data transmitting end needs to transmit a directional control code to clearly notify the communication device on a data receiving end of switching between communication modes.

(Interrupt Operation by Communication Device on Data Receiving End in Half-Duplex Communication)

Figure 23:
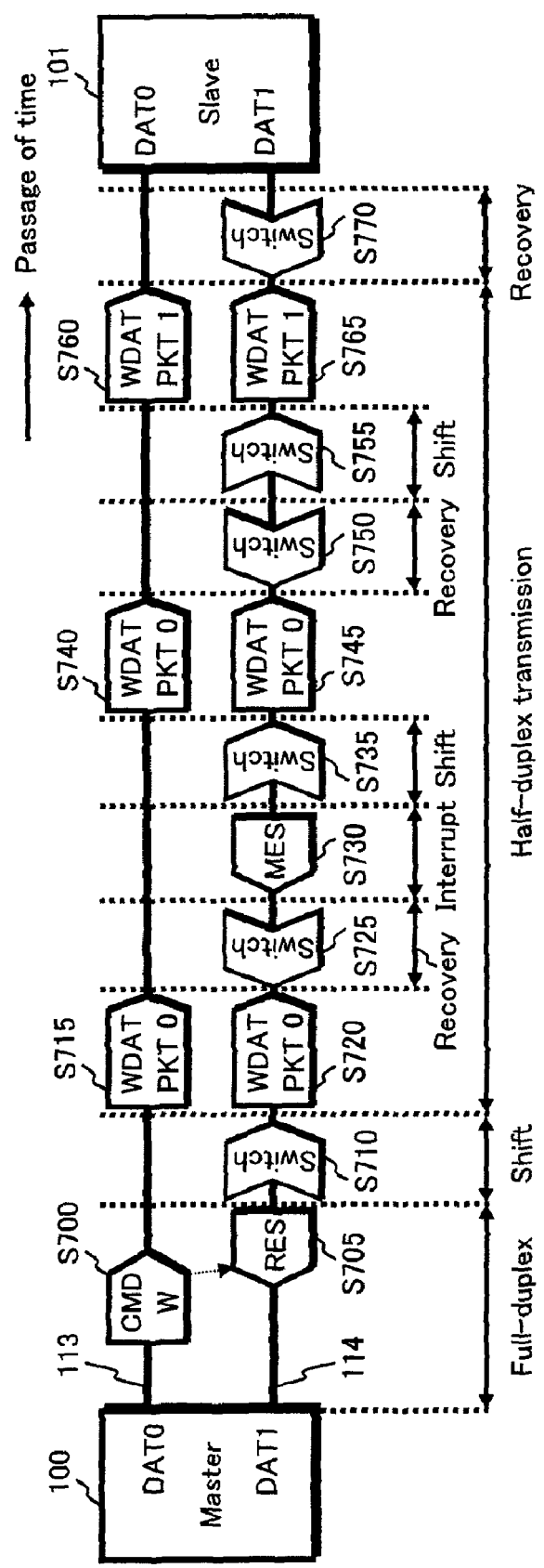
FIG. 23 shows operations for notifying an interrupt of a communication device on a data receiving end in half-duplex communication.

The following describes an operation for notifying an interrupt by a communication device on a data receiving end in the half-duplex communication, with reference to FIG. 23.

First, the master 100 and the slave 101 perform a handshake using a command packet and a response packet (steps S700 and S705), and then switch from the full-duplex communication to the half-duplex communication (step S710). Upon completion of the switching, the master 100 transmits a data packet (WDAT PKT0) in the half-duplex communication mode in the same manner as shown FIG. 16 (steps S715 and S720). Upon transmission of the data packet (WDAT PKT0), the master 100 and the slave 101 in the communication system 10 temporarily recover to the full-duplex communication mode, namely switch from the half-duplex communication to the full-duplex communication (step S725). This enables the master 100 to be ready for receiving an interrupt from the slave 101. For example, if a CRC error occurs at the time of receiving the data packet (WDAT PKT0), the slave 101 issues a message packet whose message category indicates a CRC error, and transmits the message packet to the master 100 via the DAT1 line 114 (step S730).

Upon receipt of the message packet, the master 100 switches back to the half-duplex communication mode again (step S735), and retransmits the data packet (WDAT PKT 0) (steps S740 and S745).

The master 100 and the slave 101 in the communication system 10 temporarily recover to the full-duplex communication mode again, namely switch from the half-duplex communication to the full-duplex communication (step S750).

If no CRC error is detected in the data packet received by the slave 101 and an interrupt is not necessary, the master 100 and the slave 101 in the communication system 10 switch back to the half-duplex communication mode (step S755).

Subsequently, the master 100 transmits a data packet (WDAT PKT1) in the half-duplex communication mode (steps S760 and S765). Upon completion of the transmission of the data packet (WDAT PKT1), the master 100 and the slave 101 in the communication system 10 switch from the half-duplex communication to the full-duplex communication (step S770).

Here, when the communication mode is switched to the full-duplex communication mode in step S750, the slave 101 can notify the master 100 that an interrupt is not necessary by transmitting, for example, a directional control code (DIR) instead of an idle code which is transmitted in step S595 of the recovery processing shown in FIG. 21. When notified that an interrupt is not necessary, the master 100 can immediately shift to the half-duplex communication mode. Similarly, when the communication mode is switched to the full-duplex communication mode in step S750, if the reception buffer of the slave 101 is not yet ready for storing data in the half-duplex communication mode, the slave 101 may transmit a busy code (BSY) to the master 100 instead of an idle code until the reception buffer is ready, so as to realize a flow control.

2. Variation 1

According to one variation, the transmission and reception of a directional control code and the switching of channels in the aforementioned embodiment 1 may be performed in combination with a flow control. Here, the flow control refers to a control for starting data communication after checking whether the master 100 and the slave 101 are ready to communicate with each other.

The following describes the processing steps of performing the switching of the communication modes in combination with the flow control.

2.1 When Reading Data

Figure 24:
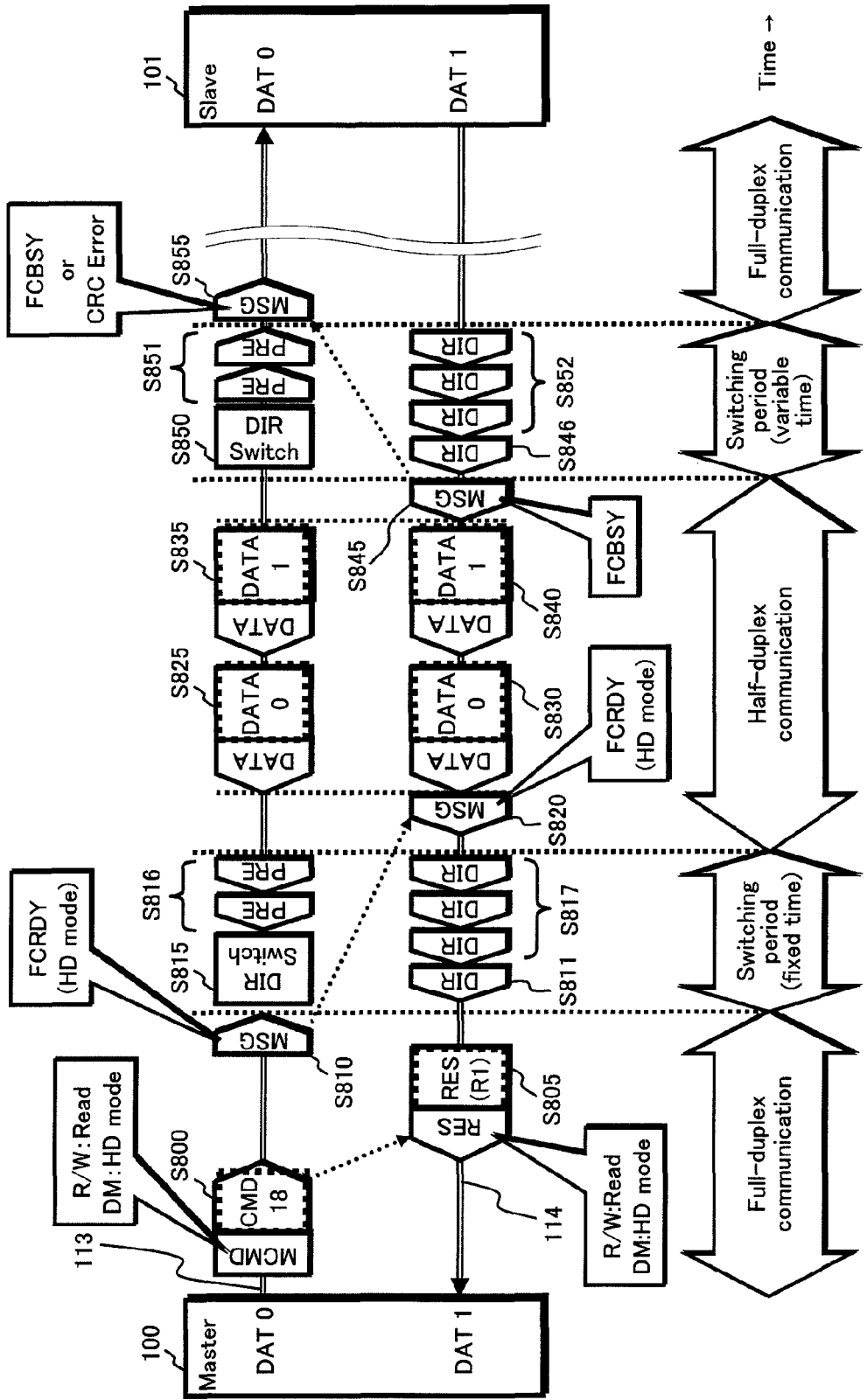
FIG. 24 shows operations in a case where switching between communication modes (when the master 100 receives data in half-duplex communication) is combined with a flow control.

The following describes a case where the switching of the communication modes is combined with the flow control, when the master 100 reads data from the slave 101, namely the slave 101 transmits data, with reference to FIG. 24. Note that, in the full-duplex communication, the DAT0 line 113 is in a downlink state and the DAT1 line 114 is in an uplink state, in the same manner as Embodiment 1.

The master 100 transmits a command packet to the slave 101 via the DAT0 line 113 (step S800). At this time, the R/W 412 (see FIG. 4) of the command packet has a value indicating "Read" stored therein, and the communication mode 420 (see FIG. 5) has a value indicating "half-duplex communication (HD mode)" stored therein.

Upon receipt of the command packet from the master 100, the slave 101 transmits a response packet to the master 100 via the DAT1 line 114 (step S805). At this time, the R/W 412 (see FIG. 4) of the response packet has a value indicating "Read" stored therein, and the communication mode 420 (see FIG. 5) has a value indicating "half-duplex communication (HD mode)" stored therein.

The master 100 on a data receiving end transmits, to the slave 101 via the DAT0 line 113, an FCRDY code that is one of the codes used in the flow control, and that indicates a preparation for communication (data reception) (step S810). Note that the FCRDY has a value indicating "half-duplex communication (HD mode)" stored therein.

Upon receipt of the FCRDY code from the master 100, the slave 101 transmits a directional control code (DIR) to the master 100 via the DAT1 line 114 (step S811). At this time, the slave 101 continues to transmit the directional control code for a predetermined time period (step S817). Note that, in the predetermined time period, a preparation for starting data communication by the flow control is completed.

Upon transmission of the FCRDY code, the master 100 switches the configuration of the channel I/F unit 250 so that the DAT0 line 113 is switched from a downlink state to an uplink state (step S815). Also, in step S815, upon receipt of the FCRDY code from the master 100, the slave 101 switches the configuration of the channel I/F unit 1150 so that the DAT0 line 113 is switched from a downlink state to an uplink state. In other words, the configurations of the channel I/F units 250 and 1150 are switched in step S815. Since this switching operation is described in detail in Embodiment 1, a description thereof is omitted here.

Upon completion of the switching of the configuration of the channel I/F unit 1150, the slave 101 transmits a preamble code to the master 100 via the DAT0 line 113 (step S816).

After (i) a lapse of a predetermined time period from the start of the transmission of a directional control code and (ii) the completion of a preparation for starting data communication, the slave 101 suspends the transmission of the directional control code and the preamble code, and transmits an FCRDY code to the master 100 via the DAT1 line 114 in response to the FCRDY code received from the master 100 (step S820). Note that the FCRDY code transmitted by the slave 101 also has a value indicating the half-duplex communication (HD mode) stored therein, in the same manner as the FCRDY code transmitted by the master 100.

The slave 101 transmits the FCRDY code, and thereafter transmits data in the half-duplex communication (steps S825, S830, S835, and S840).

Subsequently, the slave 101 transmits, to the master 100 via the DAT1 line 114, an FCBSY code that is one of the codes used in the flow control, and that indicates infeasibility of data communication (step S845).

Upon receipt of the FCBSY code, the master 100 switches the configuration of the channel I/F unit 250 so that the DAT0 line 113 is switched from an uplink state to a downlink state (step S850). Also, in step S850, upon transmission of the FCBSY code to the master 100, the slave 101 switches the configuration of the channel I/F unit 1150 so that the DAT0 line 113 is switched from an uplink state to a downlink state, in parallel with the transmission of a directional control code (steps S846 and S852). In other words, the configurations of the channel I/F units 250 and 1150 are switched in step S850. Since this switching operation is described in detail in Embodiment 1, a description thereof is omitted here.

Upon completion of the transmission of the FCBSY code, the slave 101 transmits a directional control code (DIR) to the master 100 via the DAT1 line 114 (step S846). At this time, the slave 101 continues to transmit the directional control code until the slave 101 receives a response to the FCBSY code from the master 100 (step S852).

Upon completion of the switching of the configuration of the channel I/F unit 250 in step S850, the master 100 transmits a preamble code to the slave 101 via the DAT0 line 113 until a preparation for a response to the received FCBSY code is completed (step S851).

The master 100 transmits a response to the FCBSY code to the slave 101 via the DAT0 line 113 (step S855). Note that, in response to the FCBSY code, the master 100 transmits an FCBSY code when the data communication from the slave 101 is normal, and transmits a CRC error code when there is an error in the data communication.

2.2 When Writing Data

Figure 25:
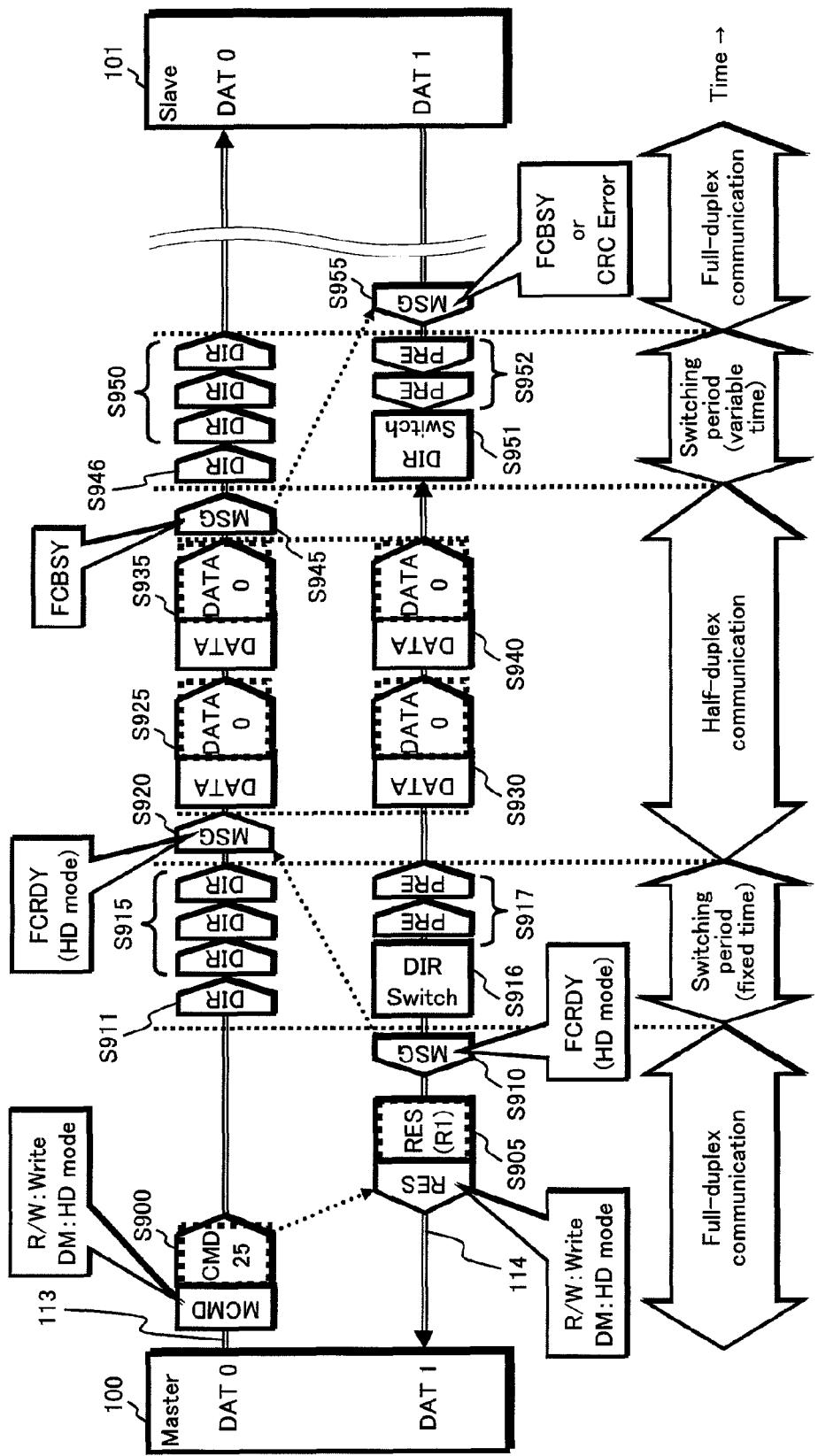
FIG. 25 shows operations in a case where switching between communication modes (when the master 100 transmits data in half-duplex communication) is combined with flow control.

The following describes a case where the switching of the communication modes is combined with the flow control, when the master 100 writes data into the slave 101, namely when the master 100 transmits data, with reference to FIG. 25. Note that, in the full-duplex communication, the DAT0 line 113 is in a downlink state and the DAT1 line 114 is in an uplink state, as described above.

The master 100 transmits a command packet to the slave 101 via the DAT0 line 113 (step S900). At this time, the R/W 412 (see FIG. 4) of the command packet has a value indicating "Write" stored therein, and the communication mode 420 (see FIG. 5) has a value indicating "half-duplex communication (HD mode)" stored therein.

Upon receipt of the command packet from the master 100, the slave 101 transmits a response packet to the master 100 via the DAT1 line 114 (step S905). At this time, the R/W 412 of the response packet has a value indicating "Write", and the communication mode 420 (see FIG. 5) has a value indicating "half-duplex communication (HD mode)" stored therein.

The slave 101 on a data receiving end transmits, to the master 100 via the DAT1 line 114, an FCRDY code indicating a preparation for communication (data reception) (step S910). Note that the FCRDY has a value indicating "half-duplex communication (HD mode)" stored therein.

Upon receipt of the FCRDY code from the slave 101, the master 100 transmits a directional control code (DIR) to the slave 101 via the DAT0 line 113 (step S911). At this time, the master 100 continues to transmit the directional control code for a predetermined time period (step S915). Note that, in the predetermined time period, a preparation for starting data communication by the flow control is completed.

Upon transmission of the FCRDY code, the slave 101 switches the configuration of the channel I/F unit 1150 so that the DAT1 line 114 is switched from an uplink state to a downlink state (step S916). Also, in step S916, upon receipt of the FCRDY code from the slave 101, the master 100 switches the configuration of the channel I/F unit 250 so that the DAT1 line 114 is switched from an uplink state to a downlink state, in parallel with the transmission of the directional control code (steps S911 and S915). In other words, the configurations of the channel I/F units 250 and 1150 are switched in step S916. Since this switching operation is described in detail in Embodiment 1, a description thereof is omitted here.

Upon completion of the switching of the configuration of the channel I/F unit 250, the master 100 transmits a preamble code to the slave 101 via the DAT1 line 114 (step S917).

After a lapse of a predetermined time period from the start of the transmission of the directional control code, the master 100 suspends the transmission of the directional control code and the preamble code, and transmits an FCRDY code to the slave 101 via the DAT0 line 113 in response to the FCRDY code received from the slave 101 (step S920). Note that the FCRDY code transmitted by the master 100 also has a value indicating the half-duplex communication (HD mode) stored therein, in the same manner as the FCRDY code transmitted by the slave 101.

The master 100 transmits the FCRDY code, and thereafter transmits data in the half-duplex communication (steps S925, S930, S935, and S940).

Subsequently, the master 100 transmits the FCBSY code to the slave 101 via the DAT0 line 113 (step S945).

Upon receipt of the FCBSY code, the slave 101 switches the configuration of the channel I/F unit 1150 so that the DAT1 line 114 is switched from a downlink state to an uplink state (step S951). Also, in step S951, upon transmission of the FCBSY code to the slave 101, the master 100 switches the configuration of the channel I/F unit 250 so that the DAT1 line 114 is switched from a downlink state to an uplink state. In other words, the configurations of the channel I/F units 250 and 1150 are switched in step S951. Since this switching operation is described in detail in Embodiment 1, a description thereof is omitted here.

Upon completion of transmission of the FCBSY code, the master 100 transmits a directional control code (DIR) to the slave 101 via the DAT0 line 113 (step S946). At this time, the master 100 continues to transmit the directional control code until the master 100 receives a response to the FCBSY code from the slave 101 (step S950).

Upon completion of the switching of the configuration of the channel I/F unit 1150 in step S951, the slave 101 transmits a preamble code to the master 100 via the DAT1 line 114 until a preparation for a response to the received FCBSY code is completed (step S952).

The slave 101 transmits a response to the FCBSY code to the master 100 via the DAT1 line 114 (step S955). Note that, in response to the FCBSY code, the slave 101 transmits an FCBSY code, a CRC error code, etc., as described above.

2.3 Conclusion

As shown in FIGS. 24 and 25, in a case where the half-duplex communication is switched to the full-duplex communication, a device that is currently on a data transmitting end transmits an FCBSY code, via a channel used for the device to transmit data in the full-duplex communication. Meanwhile, another device that is currently on a data receiving end switches the configuration of the interface of the channel that is different from the channel used to receive the FCBSY code. For example, in FIG. 24, the slave 101 is on a data transmitting end in the half-duplex communication, and uses the DAT1 line 114 to transmit data in the full-duplex communication. The slave 101 transmits an FCBSY code via the DAT1 line 114, whereby the other channel, namely the DAT0 line 113 in this example, is targeted for the switching of directions.

In other words, in the half-duplex communication, a device on a data transmitting end transmits a code (FCBSY code in this example) that triggers the switching of directions, via a channel not targeted for the switching, thereby enabling both devices on the transmitting and receiving ends of data to specify a channel targeted for the switching.

This applies not only to the aforementioned variation 1 but also to the case in Embodiment 1 where the half-duplex communication is switched to the full-duplex communication as shown in FIGS. 22A and 22B.

According to the aforementioned structure, it is determined in advance that a device on a data transmitting end transmits a code that triggers the switching of directions, via a channel not targeted for the switching. This eliminates the necessity of the transmission/reception judgment shown in FIGS. 20 and 21.

3. Variation 2

When the full-duplex communication is switched to the half-duplex communication mode in the aforementioned variation 1, the transmission and reception of the FCRDY code is set as a trigger for the switching. However, it is not limited to such.

A directional control code (DIR), which is transmitted and received subsequent to the FCRDY code, may be set as a trigger for the switching of the direction of a channel.

For example, in FIG. 24, upon receipt of the directional control code from the slave 101 via the DAT1 line 114 in step S811, the master 100 switches the configuration of the channel I/F unit 250 in step S815. Also, upon transmitting the directional control code in step S811, the slave 101 switches the configuration of the channel I/F unit 1150 in step S815.

In FIG. 25, upon receipt of the directional control code from the master 100 via the DAT0 line 113 in step S911, the slave 101 switches the configuration of the channel I/F unit 1150 in step S916. Also, upon transmitting the directional control code in step S911, the master 100 switches the configuration of the channel I/F unit 250 in step S916.

As described above, a directional control code (DIR), which is transmitted and received subsequent to the FCRDY code, may be set as a trigger for the switching of the direction of a channel. Then, as described in "2.3 Conclusion", a device on a data transmitting end transmits a code (directional control code (DIR) in this example) that triggers the switching, via a channel not targeted for the switching when the full-duplex communication is switched to the half-duplex communication. This enables both devices on the transmitting and receiving ends of data to specify a channel targeted for the switching.

<Supplementary Remarks>

(1) In the aforementioned variation 2, the switching of directions is triggered upon transmission and reception of a symbol of directional control code (i.e., one directional control code). However, it is not limited to such.

For example, the transmission and reception of two symbols of directional control code may be set as a trigger for the switching. In other words, a predetermined number of directional control codes may be transmitted and received to trigger the switching of directions.

(2) When the full-duplex communication is switched to the half-duplex communication in Embodiment 1, the master 100 transmits a directional control code as shown in FIGS. 19A and 19B. However, it is not limited to such.

As described above, a device on a data transmitting end in the half-duplex communication may transmit a code (FCRDY code in this example) that triggers the switching of directions, via a channel not targeted for the switching.

In this case, a device on a data transmitting end is specified by a command packet transmitted by the master 100. For example, when the R/W 412 of the command packet has a value indicating "Write" stored therein, the device on a data transmitting end is the master 100. When the R/W 412 of the command packet has a value indicating "Read" stored therein, the device on a data transmitting end is the slave 101. Then, a device specified as a data transmitting end transmits a directional control code via a channel not targeted for the switching of directions.

According to the aforementioned structure, it is determined in advance that a device on a data transmitting end transmits a code that triggers the switching of directions, via a channel not targeted for the switching of directions. This eliminates the necessity of the transmission/reception judgment shown in FIGS. 17 and 18.

(3) When the half-duplex communication is switched to the full-duplex communication in the aforementioned variation 1, the transmission and reception of the FCBSY code is set as a trigger for the switching. However, it is not limited to such.

Even when the half-duplex communication is switched to the full-duplex communication, the directional control code (DIR), which is transmitted and received subsequent to the FCBSY code, may be set as a trigger for the switching of the direction of a channel, in the same manner as Variation 2.

This enables the transmission and reception of the directional control code to be a trigger for the switching of directions, in the same manner as Embodiment 1 and Variation 2.

Also, the switching of directions is triggered upon transmission and reception of a symbol of directional control code (i.e., one directional control code). However, a predetermined number of directional control codes may be transmitted and received to trigger the switching of directions, as described above.

4. Other Variations

While the present invention has been described in accordance with the aforementioned embodiment, it is evident that the present invention is not limited to such. The following cases are also included in the present invention.

(1) In the aforementioned embodiment 1, the coding unit 224 and the decoding unit 225 support the 8b/10b scheme. However, it is not limited to such. The coding unit 224 and the decoding unit 225 may support an encoding scheme other than 8b/10b, such as 4b/5b or 64b/66b.

(2) In the aforementioned embodiment 1, a communication mode is set to each of the command packet issued by the master 100 and the response packet issued by the slave 101. However, it is not limited to such.

A communication mode may be set only to the command packet issued by the master 100. In this way, when the master 100 makes a communication request by transmitting the command packet in step S10 shown in FIG. 13, the communication mode is uniquely determined. As a result, the communication mode notification processing in FIG. 14 can be omitted.

(3) Here, a slave may be a memory card or an I/O card that is removable from the master 100. For example, the memory card is an SD card, and the I/O card is a wireless LAN card for a wireless communication with another device.

The following describes a case where a slave is an SD card.

Figure 26:
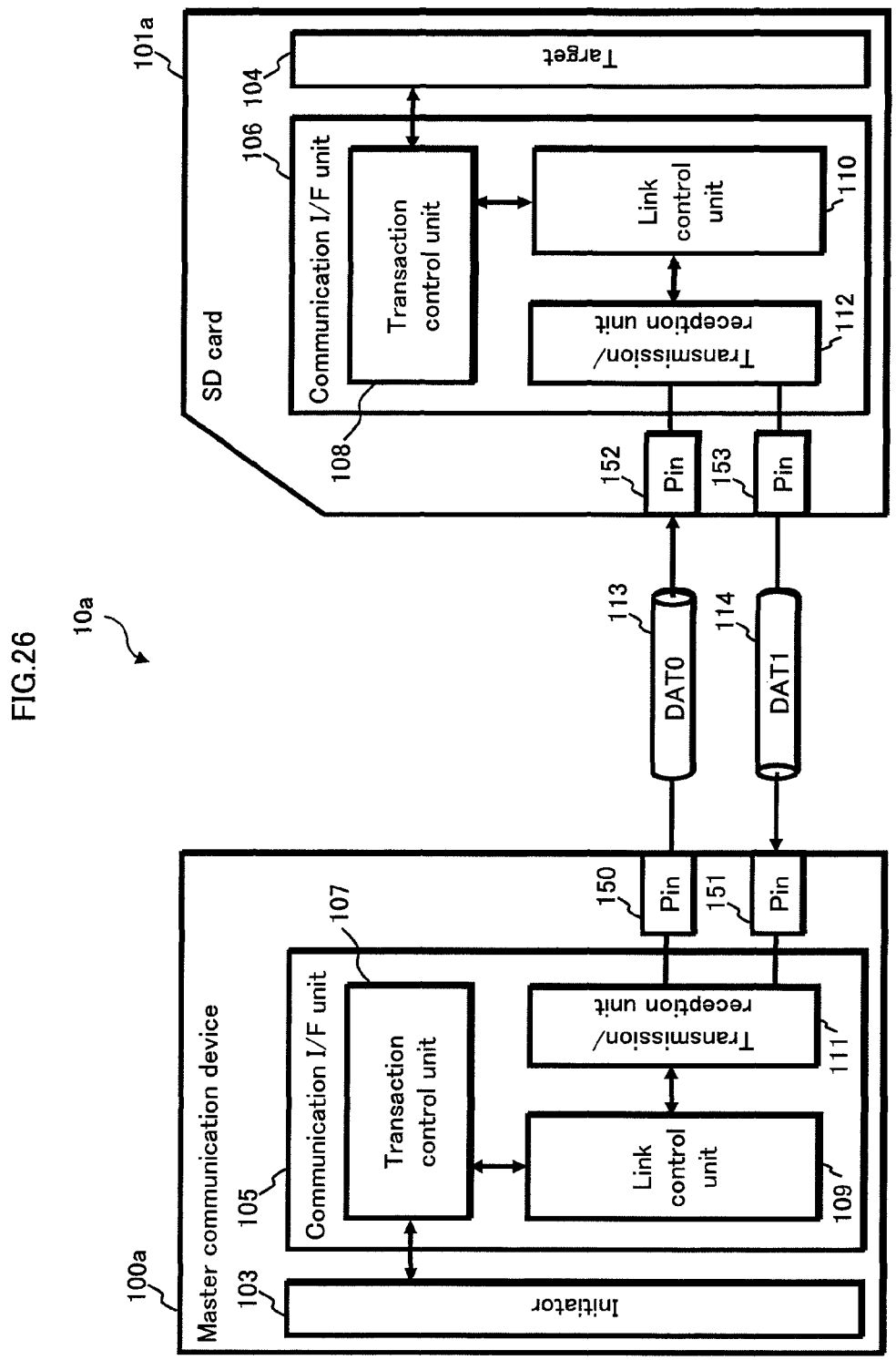
FIG. 26 is a block diagram showing the structure of a communication system 10*a*.

FIG. 26 shows the structure of a communication system 10a in a case where the slave 101 in the aforementioned embodiment 1 is an SD card 101a. As shown in FIG. 26, the communication system 10a includes a master 100a and an SD card 101a. Note that, in the following descriptions, the components that are identical with those of the master 100 and the slave 101 in the aforementioned embodiment 1 are provided with the same reference numbers, and descriptions thereof are omitted.

As shown in FIG. 26, the master 100a includes the initiator 103, the communication I/F unit 105, and pins 150 and 151. The communication I/F unit 105 includes the transaction control unit 107, the link control unit 109, and the transmission/reception unit 111, in the same manner as Embodiment 1.

The pins 150 and 151 are used to be connected to the SD card 101a. An end of each of the pins 150 and 151 is connected to the channel I/F unit 250 shown in FIG. 2. Specifically, the pin 150 is connected to the differential transmitter 217 and the differential receiver 218, and the pin 151 is connected to the differential transmitter 219 and the differential receiver 220.

As shown in FIG. 26, the SD card 101a includes pins 152 and 153, in addition to the components of the slave 101.

The pins 152 and 153 are connected to the pins 150 and 151 of the master 100a, when the SD card 101a is attached to the master 100a. Also, an end of each of the pins 152 and 153 is connected to the channel I/F unit 1150 shown in FIG. 12. Specifically, the pin 152 is connected to the differential transmitter 1116 and the differential receiver 1117, and the pin 153 is connected to the differential transmitter 1118 and the differential receiver 1119.

In other words, the pin 150 is connected to the pin 152, thereby forming the aforementioned channel 113. Also, the pin 151 is connected to the pin 153, thereby forming the aforementioned channel 114.

These connections enable the master 100a and the SD card 101a to perform data communication via the channels 113 and 114 in the full-duplex communication and the half-duplex communication, in the same manner as the aforementioned embodiment 1. Note that, although not shown in FIG. 26, the master 100a includes a pin (referred to as a pin 155 here) that is different from the pins 150 and 151, and the SD card 101a includes a pin (referred to as a pin 156 here) that is different from the pins 152 and 153. The pin 155 is connected to the pin 156, thereby forming the clock line 115 shown in FIG. 1.

Since an I/O card can realize the same structure as the aforementioned SD card, a description thereof is omitted here.

(4) In the aforementioned embodiment 1, only one type of code (DIR) is allocated to a K code, as a directional control code for a switching instruction. However, it is not limited to such.

For example, a code (FDX) indicating the switching from the half-duplex communication to the full-duplex communication may be allocated to a K code, and a code (HDX) indicating the switching from the full-duplex communication to the half-duplex communication may be allocated to another K code.

FIG. 27 shows one example of a K code table T201 where the codes FDX and HDX are allocated to K codes. In FIG. 27, "FDX" is allocated to a K code "K28.0" and "HDX" is allocated to a K code "K28.1".

In this case, the transmission and reception of "DIR" in FIGS. 19A and 19B may be replaced by the transmission and reception of "HDX". Also, the transmission and reception of "DIR" in FIGS. 22A and 22B may be replaced by the transmission and reception of "FDX".

This enables each device to reliably specify which communication mode to be switched to.

(5) In the aforementioned embodiment 1, when the half-duplex communication is switched to the full-duplex communication, the transmission and reception of a directional control code (DIR) is used as a trigger for switching. However, it is not limited to such.

The transmission and reception of a directional control code (DIR) may be used as a trigger for the transmission and reception of a preamble code (PRE) that is performed after the switching.

Figure 28A:
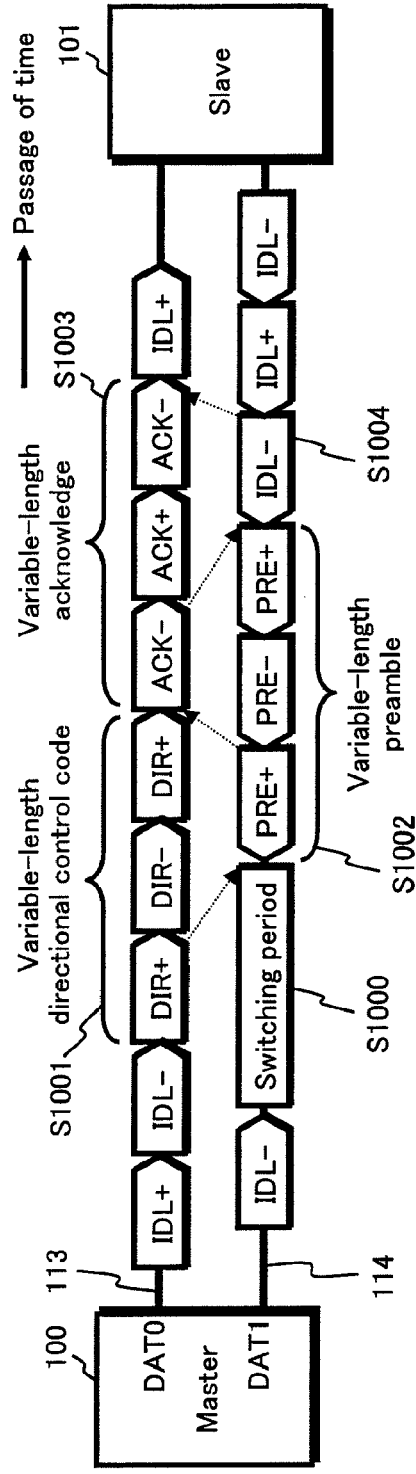
FIGS. 28A and 28B each show the flow of transmission and reception of a control code, in a case where transmission and reception of a directional control code is used as a trigger of transmission and reception of a preamble code upon completion of switching.
Figure 28B:
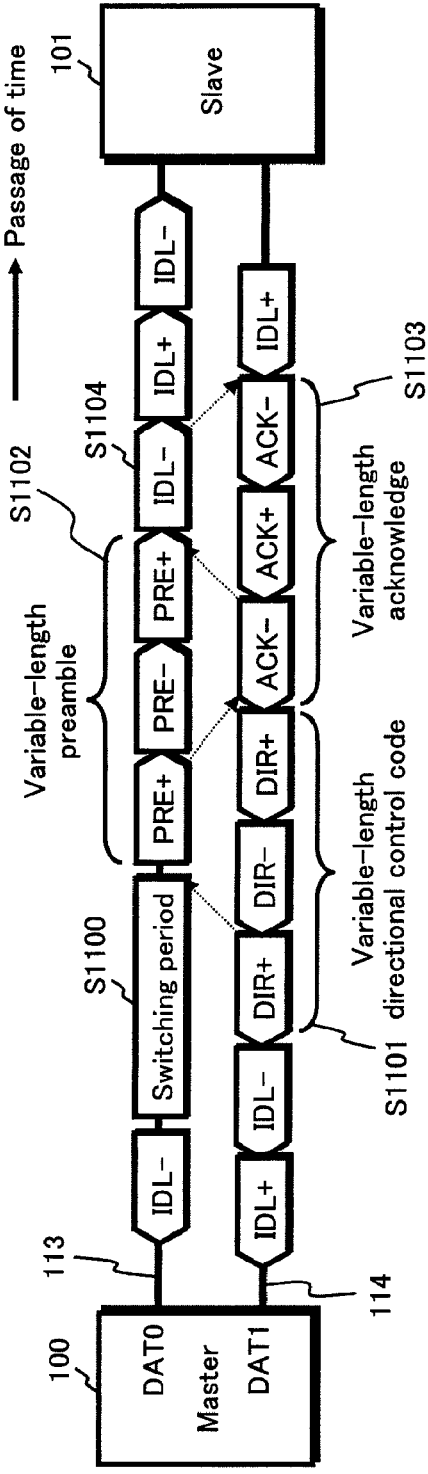

FIGS. 28A and 28B each show a detail of the transmission and reception of a control code in this case.

FIG. 28A shows a detail of the transmission and reception of a control code when the master 100 is on a data transmitting end and the half-duplex communication is switched to the full-duplex communication.

When the switching to the full-duplex communication occurs while the master 100 is transmitting idle codes (IDL) via the DAT0 line 113 and the DAT1 line 114, the master 100 and the slave 101 switch the direction of the DAT1 line 114 (step S1000).

While the switching of the direction of the DAT1 line 114 is being performed, the master 100 continues to transmit a directional control code (DIR) to the slave 101 via the DAT0 line 113 until the master 100 receives a response to the directional control code (step S1001).

Upon completion of the switching of the direction of the DAT1 line 114 and reception of a directional control code from the master 100, the slave 101 continues to transmit a preamble code (PRE) via the DAT1 line 114 in response to the directional control code, until the slave 101 receives a response to the preamble code (step S1002).

Upon receipt of a preamble code, the master 100 continues to transmit an acknowledge code (ACK) to the slave 101 via the DAT0 line 113 until the master 100 receives a response to the acknowledge code (step S1003).

Upon receipt of an acknowledge code, the slave 101 transmits an idle code (IDL) to the master 100 via the DAT1 line 114 (step S1004).

Thereafter, the master 100 and the slave 101 transmit and receive target data in the full-duplex communication.

FIG. 28B shows a detail of the transmission and reception of a control code when the master 100 is on a data receiving end and the half-duplex communication is switched to the full-duplex communication.

When the switching to the full-duplex communication occurs, the master 100 and the slave 101 switch the direction of the DAT0 line 113 (step S1100).

While the switching of the direction of the DAT0 line 113 is being performed, the slave 101 continues to transmit a directional control code (DIR) to the master 100 via the DAT1 line 114 until the slave 101 receives a response to the directional control code (step S1101).

Upon completion of the switching of the direction of the DAT0 line 113 and receipt of a directional control code from the slave 101, the master 100 continues to transmit a preamble code (PRE) via the DAT0 line 113 in response to the directional control code, until the master 100 receives a response to the preamble code (step S1102).

Upon completion of the switching of the direction of the DAT0 line 113 and receipt of a preamble code, the slave 101 continues to transmit an acknowledge code (ACK) to the master 100 via the DAT1 line 114 in response to the preamble code, until the slave 101 receives a response to the acknowledge code (step S1103).

Upon receipt of an acknowledge code, the master 100 transmits an idle code (IDL) to the slave 101 via the DAT0 line 113 (step S1104).

Thereafter, the master 100 and the slave 101 transmit and receive target data in the full-duplex communication.

Here, it can be known from FIGS. 28A and 28B that (i) a handshake using a directional control code (DIR) and a preamble code (PRE) and (ii) a handshake using the preamble code and an acknowledge code (ACK) are continuously performed.

(6) In the aforementioned embodiment 1, the master 100 and the slave 101 have a fixed relationship. However, it is not limited to such. Each of the devices may include an initiator and a target. According to the structure, the roles of a master and a slave may be dynamically switched around. For example, a master and a slave may be switched to each other every time one communication processing is completed.

(7) In the aforementioned embodiment 1, when the full-duplex communication is switched to the half-duplex communication, a time period from the start of switching to the completion of the transmission of a preamble code may be a period required for the switching from the half-duplex communication to the full-duplex communication.

In this case, the following operations are performed.

When the half-duplex communication is switched to the full-duplex communication, a communication device on a data receiving end in the half-duplex communication (e.g., the slave 101 in FIG. 22A or the master 100 in FIG. 22B) performs the following operations. That is, a device on a data receiving end measures a time period from the receipt of a directional control code (DIR) to the completion of the transmission of a preamble code (i.e., to the receipt of an acknowledge code from an opposite device that is on a data transmitting end), and stores the measured time period. Thereafter, in a case where the device on a data receiving end acts as a transmitting device in the half-duplex communication, the device performs steps S453 and S454 in FIG. 19A or steps S464 and S465 in FIG. 19B for a length of the measured time period, at the time of switching from the full-duplex communication to the half-duplex communication.

Alternatively, when the half-duplex communication is switched to the full-duplex communication, a communication device on a data transmitting end in the half-duplex communication (e.g., the master 100 in FIG. 22A or the slave 101 in FIG. 22B) performs the following operations. That is, a device on a data transmitting end measures a time period required for steps S650 and S653 in FIG. 22A, and stores the measured time period. Thereafter, in a case where the device acts as a transmitting device in the half-duplex communication, the device performs steps S453 and S454 in FIG. 19A or steps S464 and S465 in FIG. 19B for a length of the measured time period, at the time of switching from the full-duplex communication to the half-duplex communication.

Although a period required for the switching is set to the measured time period in the aforementioned example, it may be measured by the number of control codes that have been transmitted and received.

In this case, the following operations are performed.

When the half-duplex communication is switched to the full-duplex communication, a communication device on a data receiving end in the half-duplex communication stores the number of directional control codes received from an opposite device that is on a data transmitting end. Thereafter, in a case where the device on a data receiving end acts as a transmitting device in the half-duplex communication, and when the full-duplex communication is switched to the half-duplex communication, the device may start transmitting target data after transmitting, in step S452 in FIG. 19A or in step S463 in FIG. 19B, the same number of idle codes as the number of directional control codes that has been stored. Also, the device on a data receiving end may store the total of the number of received directional control codes and the number of received acknowledge codes from the opposite device, and apply the total number to the number of idle codes transmitted in step S463.

Alternatively, when the half-duplex communication is switched to the full-duplex communication, a communication device on a data transmitting end in the half-duplex communication stores the number of directional control codes transmitted in steps S650 and S653 in FIG. 22A. Thereafter, in a case where the device on a data transmitting end acts as a transmitting device in the half-duplex communication, and when the full-duplex communication is switched to the half-duplex communication, the device may start transmitting target data after transmitting the same number of idle codes as the number of directional control codes that has been stored. Also, the device on a data transmitting end may store the total of the number of transmitted directional control codes and the number of transmitted acknowledge codes, and apply the total number to the number of idle codes transmitted in step S463.

(8) In the aforementioned embodiment, the switching between a differential transmitter and a differential receiver is realized by supplying or not supplying electric power. However, it is not limited to such.

For example, it is possible to provide a switch for a path between the bifurcation of the DAT0+ line included in the DAT0 line 113 shown in FIG. 2 and the differential transmitter 217, and to provide a switch for a path between the bifurcation of the DAT0+ line and the differential receiver 218. Similarly, it is possible to provide a switch for a path between the bifurcation of the DAT0− line included in the DAT0 line 113 shown in FIG. 2 and the differential transmitter 217, and to provide a switch for a path between the bifurcation of the DAT0− line and the differential receiver 218. Then, in the case of activating the differential transmitter 217 and deactivating the differential receiver 218, the switch provided between the bifurcation of DAT0+ line and the differential transmitter 217 is turned on, and the switch provided between the bifurcation of the DAT0+ line and the differential receiver 218 is turned off. Furthermore, the switch provided between the bifurcation of the DAT0− line and the differential transmitter 217 is turned on, and the switch provided between the DAT0− line and the differential receiver 218 is turned off.

In the same manner as above, it is possible to provide (i) a switch for a path between the bifurcation of the DAT1+ line included in the DAT1 line 114 and the differential transmitter 219, (ii) a switch for a path between the bifurcation of the DAT1+ line included in the DAT1 line 114 and the differential receiver 220, (iii) a switch for a path between the bifurcation of the DAT1− line included in the DAT1 line 114 and the differential transmitter 219, and (iv) a switch for a path between the bifurcation of the DAT1− line included in the DAT1 line 114 and the differential receiver 220.

As for the slave 101, switches may be provided in the same manner as above. That is, switches may be provided (i) between the bifurcation of the DAT0+ line included in the DAT0 line 113 and the differential transmitter 1116, (ii) between the bifurcation of the DAT0+ line included in the DAT0 line 113 and the differential receiver 1117, (iii) between the bifurcation of the DAT0− line included in the DAT0 line 113 and the differential transmitter 1116, and (iv) between the bifurcation of the DAT0− line included in the DAT0 line 113 and the differential receiver 1117. Also, switches may be provided (i) between the bifurcation of the DAT1+ line included in the DAT1 line 114 and the differential transmitter 1118, (ii) between the bifurcation of the DAT1+ line included in the DAT1 line 114 and the differential receiver 1119, (iii) between the bifurcation of the DAT1− line included in the DAT1 line 114 and the differential transmitter 1118, and (iv) between the bifurcation of the DAT1− line included in the DAT1 line 114 and the differential receiver 1119.

(9) In the aforementioned embodiment, when the half-duplex communication is switched to the full-duplex communication (see FIGS. 22A and 22B), an acknowledge code (ACK) is used as a response code indicating the receipt of a preamble code (PRE). However, it is not limited to such. Instead of an acknowledge code, an idle code (IDL) may be used as a response code. In this case, (i) a handshake using the directional control code (DIR) and the preamble code (PRE) and (ii) a handshake using the preamble code and the idle code (IDL) are continuously performed. Furthermore, the idle code (IDL) does not need to be an 8b/10b code indicating a logical idle state. Instead, the idle code may indicate an electrical idle state where the transmission from a differential transmitter is stopped. Upon detection of the electrical idle state, a differential receiver on an opposite end recognizes that a response code to a transmitted preamble code is received.

(10) The present invention may be the methods described above. Also, the present invention may be computer programs for causing computers to realize the methods, or may be digital signals representing the computer programs.

The present invention may be a computer-readable recording medium on which the computer programs or the digital signals are recorded, such as a flexible disk, a hard disk, a CD-ROM, an MO, a DVD, a DVD-ROM, a DVD-RAM, a BD (Blu-ray Disc), or a semiconductor memory. The present invention may be the digital signals which are recorded on the above-described recording media.

Also, the present invention may be the computer programs or digital signals which are transmitted via an electronic communication circuit, a wireless or fixed-line communication circuit, a network acting as the Internet, a data broadcast and the like.

Also, the present invention may be a computer system including a microprocessor and a memory, whereby the memory stores the computer program, and the microprocessor operates in accordance with the computer program.

Also, the present invention may be carried out by another independent computer system by transferring the programs or the digital signals which have been recorded on the recording media, or by transferring the programs or the digital signals via the network and the like.

(11) The above-described embodiments and modifications may be combined.

INDUSTRIAL APPLICABILITY

The present invention has characteristics in which (i) a master and a slave can select, for each communication, a communication mode between a full-duplex communication mode and a half-duplex communication mode and (ii) the directional control of a channel and bit synchronization at the time of switching between the communication modes are reliably performed at high speed. Therefore, the present invention is applicable to a communication system provided to effectively perform data transfer between devices or function blocks in the devices, and is thus useful.

A master communication device and a slave communication device according to the present invention can be managerially, namely repetitively and continuously used in an industry that manufactures and markets devices.

REFERENCE SIGNS LIST 10 communication system
100 master communication device (master)
101 slave communication device (slave)
102 serial communication network
103 initiator
104 target
105, 106 communication interface (I/F) unit
107, 108 transaction control unit 109, 110 link control unit
111, 112 transmission/reception unit
113 first channel (DAT0 line)
114 second channel (DAT1 line)
115 clock line

The invention claimed is:

1. A data communication system including first and second devices that transmit and receive target data for processing via first and second channels connecting the first and second devices, the transmission and reception being performed by switching between full-duplex communication and half-duplex communication, wherein
the first device includes:
a first interface unit connected to the first and second channels;
a first transmission unit operable to transmit an instruction code to the second device via the first channel when the first device is on a data transmitting end in the half-duplex communication, the instruction code indicating switching from the half-duplex communication to the full-duplex communication;
a first switch control unit operable to switch a configuration of the first interface unit from a configuration for transmitting data via the second channel to a configuration for receiving data via the second channel; and
a first communication control unit operable to start transmitting and receiving the target data in the full-duplex communication, after the switching by the first switch control unit is completed and a response code indicating completion of switching to the full-duplex communication is received from the second device via the second channel, and
the second device includes:
a second interface unit connected to the first and second channels;
a second switch control unit operable to switch a configuration of the second interface unit from the configuration for receiving data via the second channel to the configuration for transmitting data via the second channel, upon receipt of the instruction code from the first device via the first channel;
a second transmission unit operable to transmit the response code to the first device via the second channel, upon completion of the switching by the second switch control unit; and
a second communication control unit operable to start transmitting and receiving the target data in the full-duplex communication, upon transmission of the response code by the second transmission unit.

2. The data communication system of claim 1 wherein
the first transmission unit further transmits a response reception code to the second device prior to the start of the transmission and reception of the target data by the first communication control unit, the response reception code indicating receipt of the response code and a standby state for receiving the target data from the second device,
the first communication control unit starts transmitting and receiving the target data upon the transmission of the response reception code by the first transmission unit, and
the second communication control unit starts transmitting and receiving the target data upon receipt of the response reception code.

3. The data communication system of claim 2 wherein
data communication between the first and second devices is performed by a flow control in which (i) a transmitting device transmits a suspension code to a receiving device, the suspension code indicating suspension of data transmission and (ii) a receiving device transmits a message code to the transmitting device, the message code indicating receipt of the suspension code,
the first transmission unit transmits the suspension code prior to the instruction code, to the second device via the first channel,
the second transmission unit transmits the message code instead of the response code to the first device, upon completion of the switching by the second switching control unit, and
the first communication control unit receives, from the second device, the message code as the response code.

4. The data communication system of claim 1 wherein
data communication between the first and second devices is performed by a flow control in which (i) a transmitting device transmits a suspension code to a receiving device, the suspension code indicating suspension of data transmission and (ii) a receiving device transmits a message code to the transmitting device, the message code indicating receipt of the suspension code,
the first transmission unit transmits the suspension code instead of the instruction code to the second device, in data communication in the half-duplex communication,
the second switch control unit receives the suspension code from the first device as the instruction code,
the second transmission unit transmits the message code instead of the response code to the first device, upon completion of the switching by the second switch control unit, and
the first communication control unit receives, from the second device, the message code as the response code.

5. The data communication system of claim 1 wherein
in the full-duplex communication, the first channel is used to transmit data from the first device to the second device, and the second channel is used to transmit data from the second device to the first device,
the first transmission unit transmits a transmission request code to the second device via the first channel in the full-duplex communication, the transmission request code including (i) a code indicating that the target data is to be transmitted to the second device and (ii) a code indicating that data communication is to be performed in the half-duplex communication,
the second transmission unit transmits a request reception code to the first device via the second channel upon receipt of the transmission request code via the first channel, the request reception code indicating the reception of the transmission request code,
the first switch control unit switches the configuration of the first interface unit from the configuration for receiving data via the second channel to the configuration for transmitting data via the second channel, upon receipt of the request reception code via the second channel,
the second switch control unit switches the configuration of the second interface unit from the configuration for transmitting data via the second channel to the configuration for receiving data via the second channel, upon transmission of the request reception code, and
the first communication control unit starts transmitting the target data in the half-duplex communication, after a lapse of a predetermined time period from receipt of the request reception code.

6. The data communication system of claim 5 wherein
when the first device transmits the transmission request code, data communication between the first and second devices is performed by a flow control in which (i) the second device transmits a standby code to the first device, the standby code indicating that the second device is in a standby state for receiving the target data and (ii) the first device transmits a message code to the second device, the message code indicating that the standby code is received,
the second transmission unit transmits the standby code to the first device via the second channel, prior to the switching by the second switch control unit from the configuration for transmitting data via the second channel to the configuration for receiving data via the second channel,
the first transmission unit transmits, to the second device via the first channel, an instruction code indicating switching from the full-duplex communication to the half-duplex communication, after receiving the request reception code and subsequently receiving the standby code via the second channel,
the first switch control unit switches the configuration of the first interface unit from the configuration for receiving data to the configuration for transmitting data via the second channel, upon receipt of the standby code,
the second switch control unit switches the configuration of the second interface unit from the configuration for transmitting data via the second channel to the configuration for receiving data via the second channel, upon receipt of the instruction code indicating the switching from the full-duplex communication to the half-duplex communication via the first channel,
the first transmission unit transmits the message code to the second device via the first channel (i) after a lapse of the predetermined time period from receipt of the standby code and (ii) prior to the start of the transmission of the target data by the first communication control unit, and
the first communication control unit starts transmitting the target data in the half-duplex communication, upon transmission of the message code by the first transmission unit.

7. The data communication system in claim 5 wherein
when the first device transmits the transmission request code, data communication between the first and second devices is performed by a flow control in which (i) the second device transmits a standby code to the first device, the standby code indicating that the second device is in a standby state for receiving the target data and (ii) the first device transmits a message code to the second device, the message code indicating that the standby code is received,
the second transmission unit transmits the standby code to the first device via the second channel, prior to the switching of the configuration of the second interface unit from the configuration for transmitting data via the second channel to the configuration for receiving data via the second channel,
the second switch control unit switches the configuration of the second interface unit from the configuration for transmitting data via the second channel to the configuration for receiving data via the second channel, upon transmission of the standby code by the second transmission unit,
the first transmission unit transmits the message code to the second device via the first channel (i) after receiving the request reception code and subsequently receiving the standby code via the second channel and (ii) prior to the start of the transmission of the target data by the first communication control unit, and
the first communication control unit starts transmitting the target data in the half-duplex communication, upon transmission of the message code by the first transmission unit.

8. The data communication system of claim 5 wherein
when the first device transmits the reception request code, data communication between the first and second devices is performed by a flow control in which (i) the first device transmits a standby code to the second device, the standby code indicating that the first device is in a standby state for receiving the target data and (ii) the second device transmits a message code to the first device, the message code indicating that the standby code is received,
the first transmission unit transmits the standby code to the second device via the first channel upon receipt of the request reception code, prior to the switching of the configuration of the first interface unit from a configuration for transmitting data via the first channel to a configuration for receiving data via the first channel,
the first switch control unit switches the configuration of the first interface unit from the configuration for transmitting data via the first channel to the configuration for receiving data via the first channel, upon transmission of the standby code by the first transmission unit,
the second transmission unit transmits the message code to the first device via the second channel (i) after transmitting the request reception code and subsequently receiving the standby code via the first channel, (ii) after a lapse of the predetermined time period from receipt of the standby code, and (iii) prior to the start of the transmission of the target data by the second communication control unit, and
the second communication control unit starts transmitting the target data in the half-duplex communication, upon transmission of the message code by the second transmission unit.

9. The data communication system of claim 1 wherein
in the full-duplex communication, the first channel is used to transmit data from the first device to the second device, and the second channel is used to transmit data from the second device to the first device,
the first transmission unit transmits, to the second device, a reception request code via the first channel in the full-duplex communication, the reception request code including (i) a code indicating that the target data is to be received from the second device and (ii) a code indicating that data communication is to be performed in the half-duplex communication,
the second transmission unit transmits a request reception code to the first device via the second channel upon receipt of the reception request code via the first channel, the request reception code indicating that the reception request code is received,
the first switch control unit switches the configuration of the first interface unit from a configuration for transmitting data via the first channel to a configuration for receiving data via the first channel, upon receipt of the request reception code via the second channel,
the second switch control unit switches the configuration of the second interface unit from the configuration for receiving data via the first channel to the configuration for transmitting data via the first channel, upon transmission of the request reception code, and the second communication control unit starts transmitting the target data in the half-duplex communication, after a lapse of a predetermined time period from the transmission of the request reception code.

10. The data communication system of claim 9 wherein when the first device transmits the reception request code, data communication between the first and second devices is performed by a flow control in which (i) the first device transmits a standby code to the second device, the standby code indicating that the first device is in a standby state for receiving the target data and (ii) the second device transmits a message code to the first device, the message code indicating that the standby code is received, the first transmission unit transmits the standby code to the second device via the first channel upon receipt of the request reception code, prior to the switching of the configuration of the first interface unit from the configuration for transmitting data via the first channel to the configuration for receiving data via the first channel, the second transmission unit transmits, to the first device via the second channel, an instruction code indicating switching from the full-duplex communication to the half-duplex communication, after transmitting the request reception code and subsequently receiving the standby code via the first channel, the first switch control unit switches the configuration of the first interface unit from the configuration for transmitting data via the first channel to the configuration for receiving data via the first channel, after receiving the request reception code and subsequently receiving the instruction code indicating the switching from the full-duplex communication to the half-duplex communication, the second transmission unit transmits the message code to the first device via the second channel (i) after a lapse of the predetermined time period from receipt of the standby code and (ii) prior to the start of the transmission of the target data by the second communication control unit, and the second communication control unit starts transmitting the target data in the half-duplex communication, upon transmission of the message code.

11. The data communication system of claim 9 wherein a predetermined time period in switching from the full-duplex communication to the half-duplex communication is a time period required from when the second switch control unit starts switching from the half-duplex communication to the full-duplex communication to when the second device is ready to start transmitting and receiving the target data to/from the first device.

12. The data communication system of claim 9 wherein, when the first device receives the target data in the half-duplex communication, the second transmission unit transmits an instruction code to the first device via the second channel, the instruction code indicating switching from the half-duplex communication to the full-duplex communication, the second switch control unit switches the configuration of the second interface unit from the configuration for transmitting data via the first channel to the configuration for receiving data via the first channel, the first switch control unit switches the configuration of the first interface unit from the configuration for receiving data via the first channel to the configuration for transmitting data via the first channel, upon receipt of the instruction code indicating the switching from the half-duplex communication to the full-duplex communication via the second channel, the first transmission unit transmits, to the second device via the first channel, the response code indicating the completion of switching to the full-duplex communication, upon completion of the switching by the first switch control unit, the first communication control unit starts transmitting and receiving the target data in the full-duplex communication, upon transmission of the response code by the first transmission unit, and the second communication control unit starts transmitting and receiving the target data in the full-duplex communication, upon receipt of the response code from the first device via the first channel.

13. The data communication system of claim 1 wherein the first channel used by the first device to transmit the instruction code is a channel used by the first device to transmit data to the second device in the full-duplex communication.

14. A data communication device for transmitting and receiving target data for processing via first and second channels connecting the data communication device and another device, the transmission and reception being performed by switching between full-duplex communication and half-duplex communication, the data communication device comprising:

an interface unit connected to the first and second channels;

a transmission unit operable to transmit an instruction code to the other device via the first channel when the data communication device is on a data transmitting end in the half-duplex communication, the instruction code indicating switching from the half-duplex communication to the full-duplex communication;

a switch control unit operable to switch a configuration of the interface unit from a configuration for transmitting data via the second channel to a configuration for receiving data via the second channel; and a communication control unit operable to start transmitting and receiving the target data in the full-duplex communication, after the switching by the switch control unit is completed and a response code indicating completion of switching to the full-duplex communication is received from the other device via the second channel.

15. The data communication device of claim 14 wherein when the data communication device is on a data receiving end in the half-duplex communication, the switch control unit switches the configuration of the interface unit from a configuration for receiving data via the first channel to a configuration for transmitting data via the first channel, upon receipt of the instruction code from the other device via the second channel, the transmission unit transmits, to the other device via the first channel, the response code indicating completion of switching to the full-duplex communication, upon completion of the switching of the configuration of the interface unit by the switch control unit, and the communication control starts transmitting and receiving the target data in the full-duplex communication, upon transmission of the response code by the transmission unit.

16. The data communication device of claim 15 wherein the other device includes first and second terminals used for data communication, the data communication device is either a memory card or an I/O card that includes third and fourth terminals used for data communication, and that is removable from the other device, and when the data communication device is attached to the other device, the first terminal is connected to the third terminal to create the first channel, and the second terminal is connected to the fourth terminal to create the second channel.

17. A communication method used in a data communication system including first and second devices that transmit and receive target data for processing via first and second channels connecting the first and second devices, the transmission and reception being performed by switching between full-duplex communication and half-duplex communication, the communication method comprising:

in the first device:
transmitting an instruction code to the second device via the first channel when the first device is on a data transmitting end in the half-duplex communication, the instruction code indicating switching from the half-duplex communication to the full-duplex communication;

switching a configuration of a first interface unit from a configuration for transmitting data via the second channel to a configuration for receiving data via the second channel, the first interface unit being connected to the first and second channels; and starting transmitting and receiving the target data in the full-duplex communication, after the switching of the first interface unit is completed and a response code indicating completion of switching to the full-duplex communication is received from the second device via the second channel; and in the second device:
switching a configuration of a second interface unit from the configuration for receiving data via the second channel to the configuration for transmitting data via the second channel, upon receipt of the instruction code from the first device via the first channel, the second interface unit being connected to the first and second channels;

transmitting the response code to the first device via the second channel, upon completion of the switching of the configuration of the second interface unit; and starting transmitting and receiving the target data in the full-duplex communication, upon transmission of the response code.

* * * * *